(12) United States Patent
Flinchem et al.

(10) Patent No.: US 6,307,548 B1
(45) Date of Patent: Oct. 23, 2001

(54) REDUCED KEYBOARD DISAMBIGUATING SYSTEM

(75) Inventors: Edward P. Flinchem, Seattle, WA (US); Dale Grover, Lansing, MI (US); Cheryl Grunbock; Martin T. King, both of Vashon, WA (US); Clifford A. Kushler, Lynnwood, WA (US)

(73) Assignee: Tegic Communications, Inc., Seattle, WA (US)

( * ) Notice: Subject to any disclaimer, the term of this patent is extended or adjusted under 35 U.S.C. 154(b) by 0 days.

(21) Appl. No.: 09/160,433

(22) Filed: Sep. 24, 1998

Related U.S. Application Data

(60) Provisional application No. 60/060,223, filed on Sep. 25, 1997.

(51) Int. Cl.[7] ..................................................... G06F 13/00
(52) U.S. Cl. ............................ 345/352; 345/353; 345/168; 704/10; 707/532; 707/533; 341/22; 710/67; 710/73
(58) Field of Search ........................................... 345/168, 169, 345/171, 173, 179, 352, 353, 354; 704/2–4, 8, 9, 10; 707/532, 533, 534, 535, 536; 341/20, 22, 28; 710/67, 68, 73; 400/110, 484

(56) References Cited

U.S. PATENT DOCUMENTS

| | | | |
|---|---|---|---|
| 5,911,485 | * | 6/1999 | Rossmann ................................ 34/22 |
| 5,952,942 | * | 9/1999 | Balakrishnan et al. ................ 341/20 |
| 5,953,541 | * | 9/1999 | King et al. .............................. 710/67 |
| 5,960,385 | * | 9/1999 | Skiena et al. ............................. 704/9 |
| 6,005,495 | * | 12/1999 | Connolly et al. ....................... 341/22 |

* cited by examiner

*Primary Examiner*—Ba Huynh
(74) *Attorney, Agent, or Firm*—Christensen O'Connor, Johnson, Kindness PLLC

(57) ABSTRACT

A reduced keyboard disambiguating system. The keyboard has twelve to sixteen keys, nine of them labeled with numerous letters and other symbols, and those nine plus one more are associated each with one of the ten digits. Textual entry keystrokes are ambiguous. The user strikes a delimiting "Select" key, or a key with an unambiguous character interpretation, at the end of each word, delimiting a keystroke sequence that could match any of a plurality of words associated with the same keystroke sequence. Each input keystroke sequence is processed with a complete vocabulary, and words which match the sequence of keystrokes are presented to the user in order of decreasing frequency of use. The vocabulary is stored in a special format that supports significant data compression without requiring additional processing. In addition, stems of longer words whose initial letters match the sequence of keystrokes are also presented to the user in order of decreasing frequency of use. If the frequency of the words associated with a stem is high enough, that stem is displayed as the default word object. Activations of an ambiguous key associated with a plurality of punctuation characters are disambiguated from the context of the surrounding keystrokes.

90 Claims, 35 Drawing Sheets

PHYSICAL KEY

LOGICAL KEY
(FRENCH LANGUAGE)

A LOGICAL SYMBOL INDEX TABLE FOR FRENCH

|   | 1 | 2 | 3 | 4 | 5 | 6 | 7 |
|---|---|---|---|---|---|---|---|
| 1 | . | - | ' |   |   |   |   |
| 2 | a | c | b | â | ç | à |   |
| 3 | e | é | d | f | è | ê | ë |
| 4 | i | g | h | î | ï |   |   |
| 5 | l | j | k |   |   |   |   |
| 6 | n | o | m | ô | œ |   |   |
| 7 | r | s | p | q |   |   |   |
| 8 | t | u | v | û | ú | ù | ü |
| 9 | x | z | y | w |   |   |   |

*Figure 7*

REDUCED KEYBOARD DISAMBIGUATING SYSTEM

RELATIONSHIP TO OTHER APPLICATIONS

This application claims the benefit of U.S. Provisional Application Ser. No. 60/060,223 filed Sep. 25, 1997 pending. The subject matter of Provisional Application Ser. No. 60/060,223 is incorporated herein by reference.

FIELD OF THE INVENTION

The invention relates generally to reduced keyboard systems, and more specifically to reduced keyboard systems using word-level disambiguation to resolve ambiguous keystrokes.

BACKGROUND OF THE INVENTION

For many years, portable computers have been getting smaller and smaller. The principal size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated by a user.

Incorporating a full-size keyboard in a portable computer also hinders true portable use of the computer. Most portable computers cannot be operated without placing the computer on a flat work surface to allow the user to type with both hands. A user cannot easily use a portable computer while standing or moving. In the latest generation of small portable computers, called Personal Digital Assistants (PDAs), companies have attempted to address this problem by incorporating handwriting recognition software in the PDA. A user may directly enter text by writing on a touch-sensitive panel or screen. This handwritten text is then converted by the recognition software into digital data. Unfortunately, in addition to the fact that printing or writing with a pen is in general slower than typing, the accuracy and speed of the handwriting recognition software has to date been less than satisfactory. To make matters worse, today's handheld computing devices which require text input are becoming smaller still. Recent advances in two-way paging, cellular telephones, and other portable wireless technologies has led to a demand for small and portable two-way messaging systems, and especially for systems which can both send and receive electronic mail ("e-mail").

It would therefore be advantageous to develop a keyboard for entry of text into a computer that is both small and operable with one hand while the user is holding the computer with the other hand. Prior development work has considered use of a keyboard that has a reduced number of keys. As suggested by the keypad layout of a touch-tone telephone, many of the reduced keyboards have used a 3-by-4 array of keys. Each key in the array of keys contains multiple characters. There is therefore ambiguity as a user enters a sequence of keys, since each keystroke may indicate one of several letters. Several approaches have been suggested for resolving the ambiguity of the keystroke sequence.

One suggested approach for unambiguously specifying characters entered on a reduced keyboard requires the user to enter two or more keystrokes to specify each letter. The keystrokes may be entered either simultaneously (chording) or in sequence (multiple-stroke specification). Neither chording nor multiple-stroke specification has produced a keyboard having adequate simplicity and efficiency of use. Multiple-stroke specification is inefficient, and chording is complicated to learn and use.

Other suggested approaches for determining the correct character sequence that corresponds to an ambiguous keystroke sequence are summarized in the article "Probabilistic Character Disambiguation for Reduced Keyboards Using Small Text Samples," published in the Journal of the International Society for Augmentative and Alternative Communication by John L. Arnott and Muhammad Y. Javad (hereinafter the "Arnott article"). The Arnott article notes that the majority of disambiguation approaches employ known statistics of character sequences in the relevant language to resolve character ambiguity in a given context. That is, existing disambiguating systems statistically analyze ambiguous keystroke groupings as they are being entered by a user to determine the appropriate interpretation of the keystrokes. The Arnott article also notes that several disambiguating systems have attempted to use word-level disambiguation to decode text from a reduced keyboard. Word-level disambiguation disambiguates entire words by comparing the sequence of received keystrokes with possible matches in a dictionary after the receipt of an unambiguous character signifying the end of the word. The Arnott article discusses many of the disadvantages of word-level disambiguation. For example, word-level disambiguation oftentimes fails to decode a word correctly, because of the limitations in identifying unusual words and the inability to decode words that are not contained in the dictionary. Because of the decoding limitations, word-level disambiguation does not give error-free decoding of unconstrained English text with an efficiency of one keystroke per character. The Arnott article therefore concentrates on character level disambiguation rather than word-level disambiguation, and indicates that character level disambiguation appears to be the most promising disambiguation technique.

One suggested approach based on word-level disambiguation is disclosed in a textbook entitled *Principles of Computer Speech,* authored by I. H. Witten, and published by Academic Press in 1982 (hereinafter the "Witten approach"). Witten discusses a system for reducing ambiguity from text entered using a telephone touch pad. Witten recognizes that for approximately 92% of the words in a 24,500 word dictionary, no ambiguity will arise when comparing the keystroke sequence with the dictionary. When ambiguities do arise, however, Witten notes that they must be resolved interactively by the system presenting the ambiguity to the user and asking the user to make a selection between the number of ambiguous entries. A user must therefore respond to the system's prediction at the end of each word. Such a response slows the efficiency of the system and increases the number of keystrokes required to enter a given segment of text.

Disambiguating an ambiguous keystroke sequence continues to be a challenging problem. As noted in the discussion above, satisfactory solutions that minimize the number of keystrokes required to enter a segment of text have failed to achieve the necessary efficiencies for a reduced, disambiguating keyboard to be acceptable for use in a portable computer. One significant challenge facing any application of word-level disambiguation is successfully implementing it on the kinds of hardware platforms on which its use is most advantageous. As mentioned above, such devices include two-way pagers, cellular telephones, and other handheld wireless communications devices. These systems are battery powered, and consequently are designed to be as frugal as possible in hardware design and resource utilization. Applications designed to run on such systems must minimize both processor bandwidth utilization and memory requirements. These two factors tend in general to be inversely related. Since word-level disambiguation systems require a large database of words to function, and must respond quickly to input keystrokes to provide a satisfactory user interface, it would be a great advantage to be able to compress the required database without significantly impacting the processing time required to utilize it.

Another challenge facing any application of word-level disambiguation is providing sufficient feedback to the user about the keystrokes being input. With an ordinary typewriter or word processor, each keystroke represents a unique character which can be displayed to the user as soon as it is entered. But with word-level disambiguation this is often not possible, since each keystroke represents multiple characters, and any sequence of keystrokes may match multiple words or word stems. This is especially a problem when the user makes a spelling or keystroke error, since the user cannot be certain that an error has occurred until the complete key sequence has been entered and the desired word fails to appear. Previous systems utilizing word-level disambiguation fail to provide any feedback until a key is selected that is recognized by the system as a word termination key such as a space. Moreover, recent publications have taught away from using word-level disambiguation and have focused on character level disambiguating techniques. It would therefore be desirable to develop a disambiguating system that minimizes the ambiguity of entered keystrokes, and also maximizes the efficiency with which the user can resolve any ambiguity which does arise during text entry.

SUMMARY OF THE INVENTION

The present invention provides a reduced keyboard which uses word-level disambiguation to resolve ambiguities in keystrokes. In one embodiment, the system includes a display panel which is touch sensitive, wherein contact with the surface of the display generates input signals to the system corresponding to the location of contact. Alternatively, the keyboard can be constructed with full-size mechanical keys.

In one preferred embodiment, nine symbol and letter keys are grouped in a three by-three-array along with three to six additional special function keys. A plurality of letters and symbols are assigned to some of the keys, so that keystrokes on these keys (hereinafter the "data keys") are ambiguous. A user may enter a keystroke sequence wherein each keystroke corresponds to the entry of one letter of a word. Because individual keystrokes are ambiguous, the keystroke sequence can potentially match more than one word with the same number of letters. The keystroke sequence is processed by vocabulary modules which match the sequence to corresponding stored words or other interpretations. Words and word stems that match the sequence of keystrokes are presented to the user in a selection list on the display as each keystroke is received.

In accordance with one aspect of the invention, one of the keys is assigned a plurality of punctuation characters. In one preferred embodiment, the period '.', hyphen '-', and apostrophe '3' are assigned to one of the keys. The user may type one of the characters on the key by a single activation of the key at the point where the punctuation character is desired. Because a plurality of punctuation characters is assigned to the key, the keystroke is ambiguous. The system of the present invention determines from the preceding and following keystrokes which punctuation character was intended and generates it automatically. The alternative interpretations of the keystroke sequence can also be provided to the user in the selection list.

In accordance with another aspect of the invention, the word interpretations are presented in order of decreasing frequency of use, with the most commonly used words presented first. Items in the selection list are selected by pressing the Select key one or more times. Keystrokes can be "undone" by pressing a BackSpace key.

In accordance with yet another aspect of the invention, the user presses a Select key to delimit an entered keystroke sequence. After receiving the Select key, the disambiguating system selects the most frequently used word and adds the word to the sentence being constructed. The Select key is used to delimit an entered keystroke sequence. A separate explicit Space key is used to generate a space character, and also serves to delimit an entered keystroke sequence. In another preferred embodiment, the Select key is "overloaded" with a second function in that it also serves to generate a space following the selected word, i.e., the reduced keyboard disambiguating system automatically inserts the appropriate spacing between words.

In accordance with another aspect of the invention, the Select key is also used to select less commonly used words from the selection list presented to the user. If the word presented to the user at the top of the selection list is not the desired word, the user presses the Select key again to advance from the most frequently used word to the second most frequently used word, and again to advance to the third most frequently used word, and so on. This embodiment of the reduced keyboard disambiguating system has no dedicated "execute" or "accept" key to act on an entry once it has been selected. Once the desired word is selected by the user, it is automatically "accepted" for output and is added to the sentence being composed upon receipt of the next symbol or character keystroke.

In accordance with another aspect of the invention, the linguistic database which is used to disambiguate keystrokes includes information which allows the system to present as the first object a word or word stem object which, although not the most frequent word associated with the node corresponding to the current keystroke sequence, forms the stem of a longer word or plurality of words whose total frequency is greater than that of the most frequent word associated with the current node. This "stem promotion" feature is especially useful in systems with limited display area such that the selection list can not be actually displayed on the screen, where the user is only able to see the word displayed at the insertion point, which is the first object from the selection list. The result is that the object as whole tends to change much less frequently from keystroke to keystroke, presenting a less "jumpy" and consequently less distracting and confusing interface.

In accordance with yet another aspect of the invention, multiple interpretations of the keystroke sequence are provided to the user in the selection list. The keystroke sequence may be interpreted as forming one or more words, and these corresponding words are displayed in the selection list. Simultaneously, the keystroke sequence may be interpreted as a number, and this number is also displayed as one of the items in the selection list. Additionally, a keystroke sequence can be interpreted as a word entered using an unambiguous spelling method, as the stem of an incomplete word, and as a system command. These multiple interpretations are simultaneously presented to the user upon receipt of each keystroke entered by the user. The user may select from the alternate interpretations by pressing the Select key a number of times, or by directly touching the desired interpretation in the selection list presented on a touchscreen.

In accordance with still another aspect of the invention, words are stored in a vocabulary module using a tree data structure. Words corresponding to a particular keystroke sequence are constructed using the set of words and word stems associated with the immediately preceding keystroke sequence (i.e., the particular keystroke sequence without the last keystroke). Constructing words in this manner reduces the storage space of the vocabulary module, since word stems are stored only once, at the top of the tree structure, and are shared by all words constructed from them. The tree structure also greatly reduces processing requirements, since no searching is required to locate stored objects. The words and word stems stored in the tree data structure may contain frequency or other ranking information which indicates which item is to be displayed first to the user, thus further reducing processing requirements. Furthermore, this tree data structure is modified using a special algorithm which further compresses the total size required for the database without engendering an additional processing burden when it is utilized to retrieve objects associated with keystroke sequences. A further aspect of the modified tree structure is the automatic identification of generalized rules for associating objects to keystroke sequences. With such rules, the vocabulary module can with a high probability of success, associate keystroke sequences to word and word stem objects which were not initially used in creating it.

The internal, logical representation of the keys in the preferred embodiment need not mirror the physical arrangement represented by the labels on the actual keys. For example, in a database constructed to represent a French vocabulary module, three additional symbols (ÂçÀ) may also be associated with the key ABC that is associated with the unaccented versions of the characters. This allows the user to recall and type words containing special accented characters, performing only one key activation per character, simply by activating the logically associated physical key for the associated accented character.

The combined effects of the assignment of multiple letters to keys, the delimiting of words using a Select key, the presentation of the most commonly occurring word or word stem as the first word in the selection list, the inclusion of multiple interpretations in the selection list, the automatic addition of a selected word to a sentence by the first keystroke of the following word, the automatic addition of spaces, the ability to compress a large database for disambiguation without incurring any significant processing penalties, the ability to generate words with embedded special accented characters by typing the key associated with the unaccented version of the letter, and the ability to automatically disambiguate among multiple punctuation characters assigned to a single key based on the context of the keystroke produces a surprising result: for many languages, well over 99% of words found in a representative corpus of text material can be typed on the system with extremely high efficiency. For approximately 95% of these words, the same number of keystrokes is required to enter a word with the reduced key disambiguating system as for word entry with a conventional keyboard. When words include accented characters, word entry can often be achieved with fewer keystrokes than with a conventional keyboard. When the words are presented in frequency of use order, the desired word is most often the first word presented and is frequently the only word presented. The user can then proceed to enter the next word with no more than the usual number of keystrokes. High speed entry of text is therefore achieved using a keyboard having a small number of full-size keys.

The reduced keyboard disambiguation system disclosed herein reduces the size of the computer or other device that incorporates the system. The reduced number of keys allows a device to be constructed to be held by the user in one hand, while being operated with the other hand. The disclosed system is particularly advantageous for use with PDAs, two-way pagers, or other small electronic devices that benefit from accurate, high-speed text entry. The system efficiently compresses a large database for disambiguating keystroke sequences without requiring additional processing bandwidth when utilizing the compressed database. The system can provide both efficiency and simplicity when implemented on a touchscreen based device or a device with a limited number of mechanical keys that may also have limited display screen area.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 5A through 5C show the processing performed upon the initial receipt of a keystroke, and 5D shows the processing performed all other processing of a keystroke has been completed;

FIG. 7 is an example of a table associating logical symbols to key indices;

DETAILED DESCRIPTION OF THE PREFERRED EMBODIMENT

I. System Construction and Basic Operation

Figure 1:
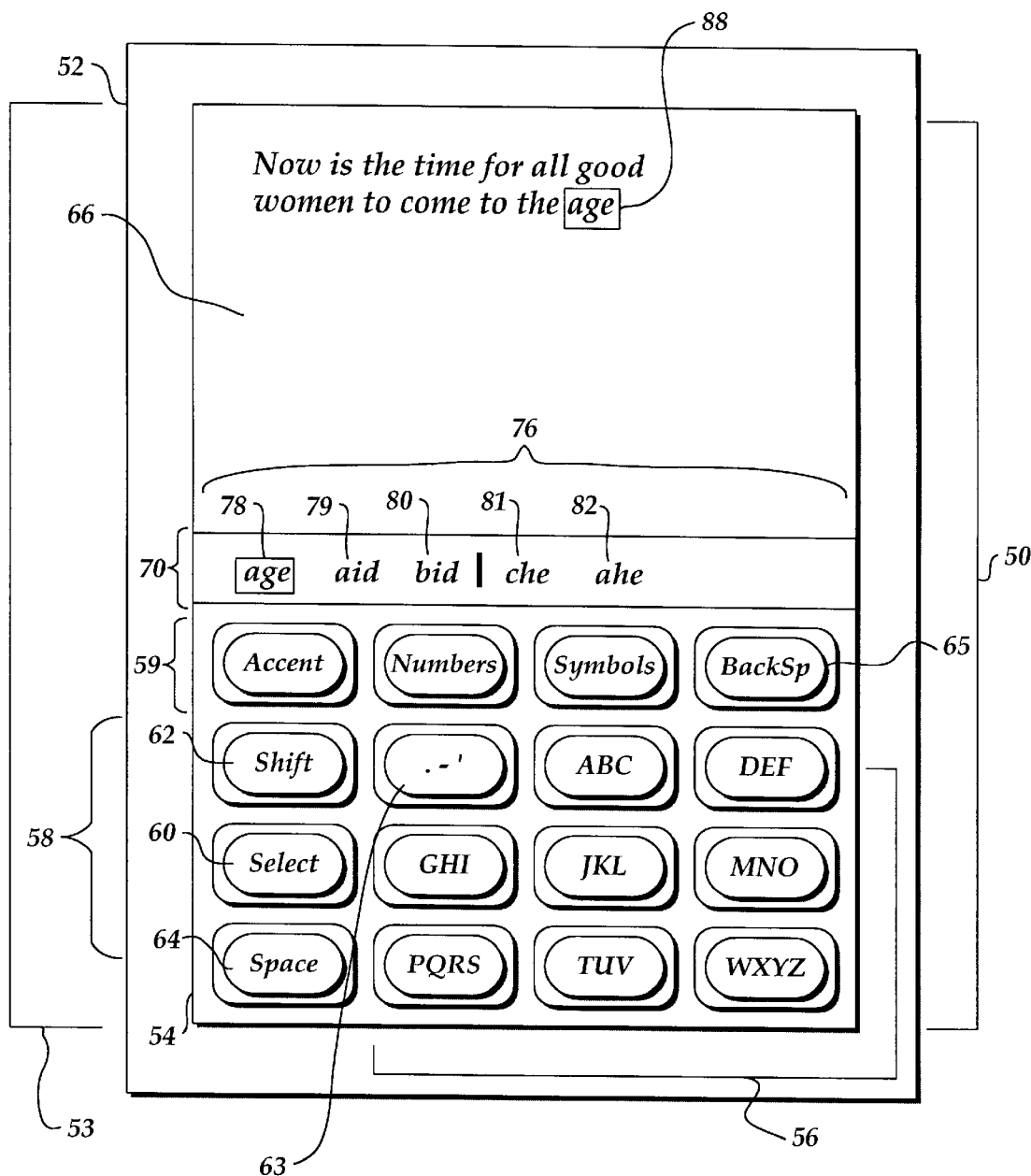
FIG. 1 is a schematic view of a preferred embodiment of a portable computer incorporating a reduced keyboard disambiguating system of the present invention.

With reference to FIG. 1 a reduced keyboard disambiguating system 50 formed in accordance with the present invention is depicted incorporated in a palmtop portable computer 52. Portable computer 52 contains a reduced keyboard 54 implemented on a touchscreen display 53. For purposes of this application, the term "keyboard" is defined broadly to include any input device having defined areas including a touch screen having defined areas for keys, discrete mechanical keys, membrane keys, etc. Keyboard 54 has a reduced number of data entry keys from a standard QWERTY keyboard. In one preferred embodiment, the keyboard contains sixteen standard full-sized keys arranged in four columns and four rows. More specifically, the preferred keyboard contains nine data keys 56 arranged in a 3-by-3 array including a punctuation key 63, a left-hand column of three system keys 58, including a Select key 60, a Shift key 62, and a Space key 64, and a BackSpace key 65 in the upper row 59 to delete previous keystrokes. The upper row of system keys 59 also includes three MODE keys labeled Accent, Numbers and Symbols for entering modes to type accented characters, numbers, and symbols respectively.

A preferred arrangement of the letters on each key in the keyboard 54 is depicted in FIG. 1. FIG. 1 also shows a preferred arrangement of the punctuation characters associated with the ambiguous data key 63 in the keyboard 54 for the English language.

Data is input into the disambiguation system via keystrokes on the reduced keyboard 54. As a user enters a keystroke sequence using the keyboard, text is displayed on the computer display 53. Two regions are defined on the display to display information to the user. An upper text region 66 displays the text entered by the user and serves as a buffer for text input and editing. A selection list region 70, located below the text region, provides a list of words and other interpretations corresponding to the keystroke sequence entered by a user. As will be described in additional detail below, the selection list region 70 aids the user in resolving the ambiguity in the entered keystrokes. In another preferred embodiment, the system may be implemented on a device with limited display space, and display only the currently selected or most likely word object at the insertion point 88 in the text being generated.

Figure 2:
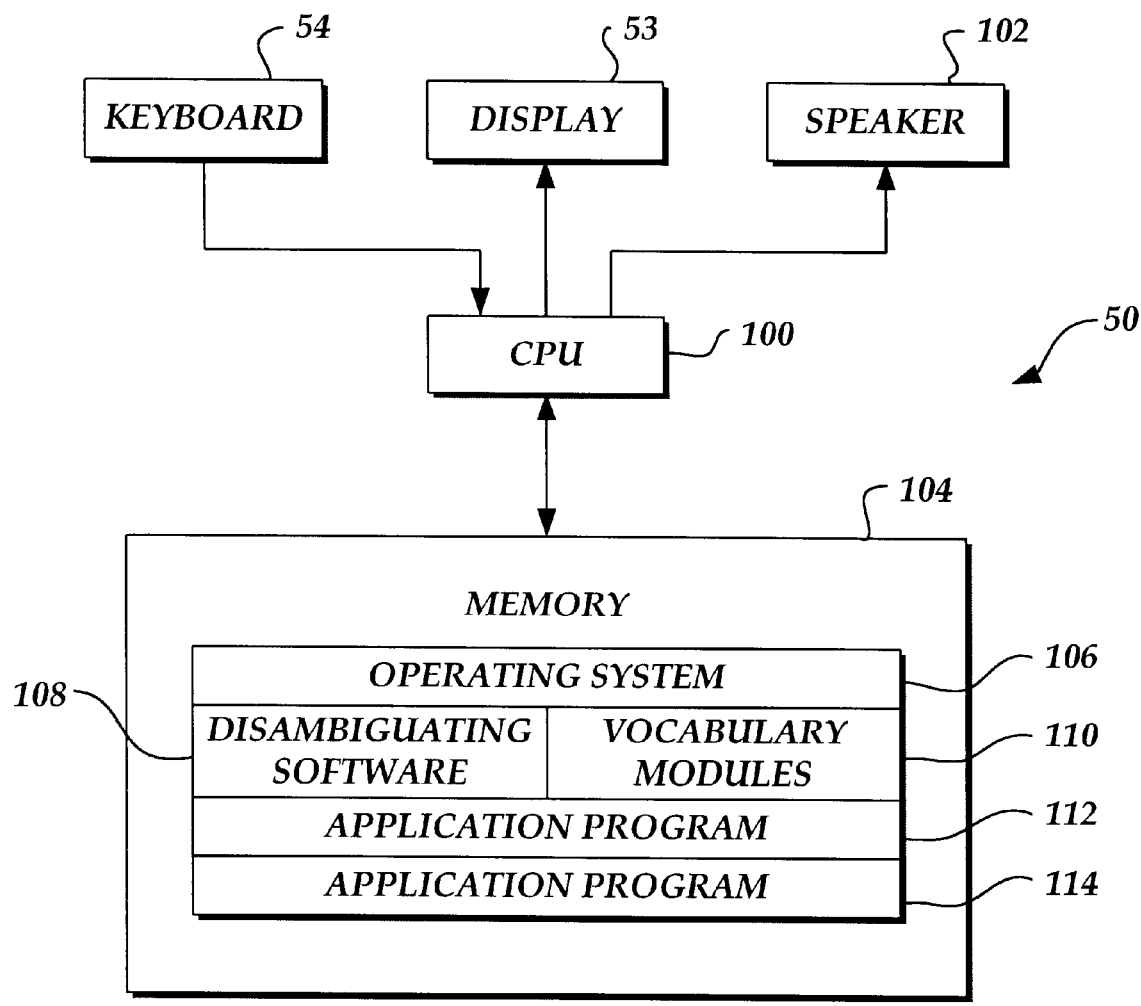
FIG. 2 is a hardware block diagram of the reduced keyboard disambiguating system of FIG. 1.

A block diagram of the reduced keyboard disambiguating system hardware is provided in FIG. 2. The keyboard 54 and the display 53 are coupled to a processor 100 through appropriate interfacing circuitry. Optionally, a speaker 102 is also coupled to the processor. The processor 100 receives input from the keyboard, and manages all output to the display and speaker. Processor 100 is coupled to a memory 104. The memory includes a combination of temporary storage media, such as random access memory (RAM), and permanent storage media, such as read-only memory (ROM), floppy disks, hard disks, or CD-ROMs. Memory 104 contains all software routines to govern system operation. Preferably, the memory contains an operating system 106, disambiguating software 108, and associated vocabulary modules 110 that are discussed in additional detail below. Optionally, the memory may contain one or more application programs 112, 114. Examples of application programs include word processors, software dictionaries, and foreign language translators. Speech synthesis software may also be provided as an application program, allowing the reduced keyboard disambiguating system to function as a communication aid.

Returning to FIG. 1, the reduced keyboard disambiguating system 50 allows a user to quickly enter text or other data using only a single hand. Data is entered using the data keys 56. Each of the data keys has multiple meanings, represented on the top of the key by multiple letters, numbers, and other symbols. (For the purposes of this disclosure, each data key will be identified by the symbols in the center row of the data key, e.g., DEF to identify the upper right data key.) Since individual keys have multiple meanings, keystroke sequences are ambiguous as to their meaning. As the user enters data, the various keystroke interpretations are therefore displayed in multiple regions on the display to aid the user in resolving any ambiguity. In systems with sufficient display area available, a selection list 76 of possible interpretations of the entered keystrokes is provided to the user in the selection list region 70. The first entry 78 in the selection list is selected as a default interpretation and displayed in the text region 66 at an insertion point 88. In the preferred embodiment, this entry is displayed with a solid-line box drawn around it both in the selection list 76 and at the insertion point 88. The formatting establishes a visual relationship between the insertion point object and the selection list, and signifies that this object is implicitly selected by virtue of being the most frequently occurring object in the current selection list. Alternatively, no selection list is provided, and only the default object (the object that would be displayed first in the selection list prior to any activation of the Select key), or the currently selected object if one has been explicitly selected, is displayed at the insertion point 88.

The selection list 76 of the possible interpretations of the entered keystrokes may be ordered in a number of ways. In a normal mode of operation, the keystrokes are initially interpreted as the entry of letters to spell a word (hereinafter the "word interpretation"). Entries 78, 79, and 80 in the selection list are therefore words that correspond to the entered keystroke sequence, with the entries ordered so that the most common word corresponding to the keystroke sequence is listed first. For example, as shown in FIG. 1, a keystroke sequence ABC, GHI, and DEF has been entered by a user. As keys are entered, a vocabulary module look-up is simultaneously performed to locate words that have matching keystroke sequences. The words identified from the vocabulary module are displayed to the user in the selection list 76. The words are sorted according to frequency of use, with the most commonly used word listed first. Using the example keystroke sequence, the words "age," "aid" and "bid" were identified from the vocabulary module as being the most probable words corresponding to the keystroke sequence. Of the three identified words, "age" is more frequently used than "aid" or "bid," so it is listed first in the selection list. The first word is also taken as the default interpretation and provisionally posted as text at the insertion point 88. Prior to pressing the Select key 60, this first word taken as the default interpretation is posted at the insertion point 88 and in the selection list 76 using identical formatting. For example, as in FIG. 1, the word appears as text within a box drawn with solid lines that is just large enough to contain the word. In systems without sufficient display area to show the actual selection list on the screen, the list of potential matching words is kept in memory, sorted according to the relative frequency of the matching text objects.

In the preferred embodiment, following entry of the keystroke sequence corresponding to the desired word, the user simply presses the Space key 64. The default word (the first word in the selection list) is immediately output at the insertion point, the selection list is cleared, and a space is immediately output to the text area at the insertion point 88. Alternatively, any other means which explicitly generates an unambiguous character (such as entering Symbols mode and pressing a key that is unambiguously associated with a single specific character in Symbols mode) can be used to achieve the same result, with the exception that the specific unambiguous character (rather than a space) is appended to the output word at the insertion point 88. Alternatively, the punctuation key 63 may be pressed to generate a period, hyphen or apostrophe as explained below.

If the first entry in the selection list is not the desired interpretation of the keystroke sequence, the user may step through the items in the selection list by repeatedly pressing the Select key 60. Pressing the Select key redisplays the first entry in the selection list 76 with a box around it drawn with dotted lines, and also redisplays the first entry at the insertion point 88 with an identically formatted box drawn around it. Conceptually, the change from a solid-line box to a dotted-line box indicates that the text is closer to having been accepted into the text being generated, having been explicitly selected by virtue of the user pressing the Select key. If the first entry in the selection list is the desired interpretation of the keystroke sequence, the user continues to enter the next word using the data keys 56. If the Select key is overloaded with a space generation function, then a space is generated prior to inserting the text for the next word. Otherwise, the start of the next word will be concatenated with end of the current word with no intervening space. For each press of the Select key, the next entry in the selection list is boxed with dotted lines, and a copy of the entry provisionally posted to the insertion point (replacing the previously provisionally posted word) and boxed with dotted lines. Provisionally posting the next entry to the text region allows the user to maintain their attention on the text region without having to refer to the selection list. At the user's option, the system can also be configured such that, upon receipt of the first press of the Select key, the word provisionally posted at the insertion point can expand (vertically or horizontally) to display a copy of the current selection list. The user may select the maximum number of words to be displayed in this copy of the selection list. Alternatively, the user may elect to have the selection list always displayed at the insertion point, even prior to the first activation of the Select key. The disambiguating system interprets the start of the next word (signaled by the activation of an ambiguous data key 56 or the generation of an explicit unambiguous character) as an affirmation that the currently selected entry is the desired entry. The selected word therefore remains at the insertion point as the choice of the user, the surrounding box disappears completely and the word is redisplayed in normal text without special formatting.

If the second entry in the selection list is the desired word, the user proceeds to enter the next word after two presses of the Select key and the disambiguating system automatically posts the second entry to the text region as normal text. If the second entry is not the desired word, the user may examine the selection list and press the Select key a desired number of times to select the desired entry before proceeding to enter the next word. When the end of the selection list is reached, additional presses of the Select key causes the selection list to scroll and new entries to be added to the end of the selection list. Those entries at the top of the selection list are removed from the list displayed to the user. The entry selected by multiple presses of the Select key is automatically posted to the text region when the user presses any data key 56 to continue to enter text. Alternatively, following entry of the keystroke sequence corresponding to the desired word, the user may select the desired word from the selection list simply by touching it. The selected word is immediately output at the insertion point without adding a space, and the selection list is cleared. The user may then press the Space key to generate a space that is immediately output to the text area at the insertion point 88.

In the majority of text entry, keystroke sequences are intended by the user as letters forming a word. It will be appreciated, however, that the multiple characters and symbols associated with each key allow the individual keystrokes and keystroke sequences to have several interpretations. In the preferred reduced keyboard disambiguating system, various different interpretations are automatically determined and displayed to the user at the same time as the keystroke sequence is interpreted and displayed to the user as a list of words.

For example, the keystroke sequence is interpreted in terms of the word stems corresponding to possible valid sequences of letters that a user may be entering (hereinafter the "stem interpretation"). Unlike word interpretations, word stems are incomplete words. By indicating the possible interpretations of the last keystrokes, the word stems allow the user to easily confirm that the correct keystrokes have been entered, or to resume typing when his or her attention has been diverted in the middle of the word. As shown in FIG. 1, the keystroke sequence ABC GHI DEF has been interpreted as forming the valid stems "che" (leading to the words "check", "cheer", etc.) and "ahe" (leading to the words "ahead", "ahem", etc.). The stem interpretations are therefore provided as entries 81 and 82 in the selection list. Preferably, the stem interpretations are sorted according to the composite frequency of the set of all possible words that can be generated from each stem by additional keystrokes on the data keys. The maximum number and the minimum composite frequency of such entries to be displayed may be selected by the user or configured in the system, so that some stem interpretations may not be displayed. In the current example, the stems "bif" (leading to the word "bifocals"), "cid" (leading to the word "cider"), and "bie" leading to the word "biennial") are not shown. When listing a stem interpretation in the selection list, the stem is omitted if a stem interpretation duplicates a word that is shown in the selection list. When the stem is omitted, however, the word corresponding to the omitted stem may be marked with a symbol to show that there are also longer words which have this word as their stem. Stem interpretations provide feedback to the user by confirming that the correct keystrokes have been entered to lead to the entry of a desired word.

The operation of the reduced keyboard disambiguating system is governed by the disambiguation software 108. In one preferred embodiment of the system, the Select key is "overloaded" such that it performs both the function of selecting the desired object from the selection list, and also generates an explicit space character when appropriate. In such systems, the flag "OverloadSelect" (referenced in blocks 164 and 174A) is set TRUE. In systems with a separate Space key defined to generate an explicit space character, the flag "OverloadSelect" is set FALSE.

Figure 3A:
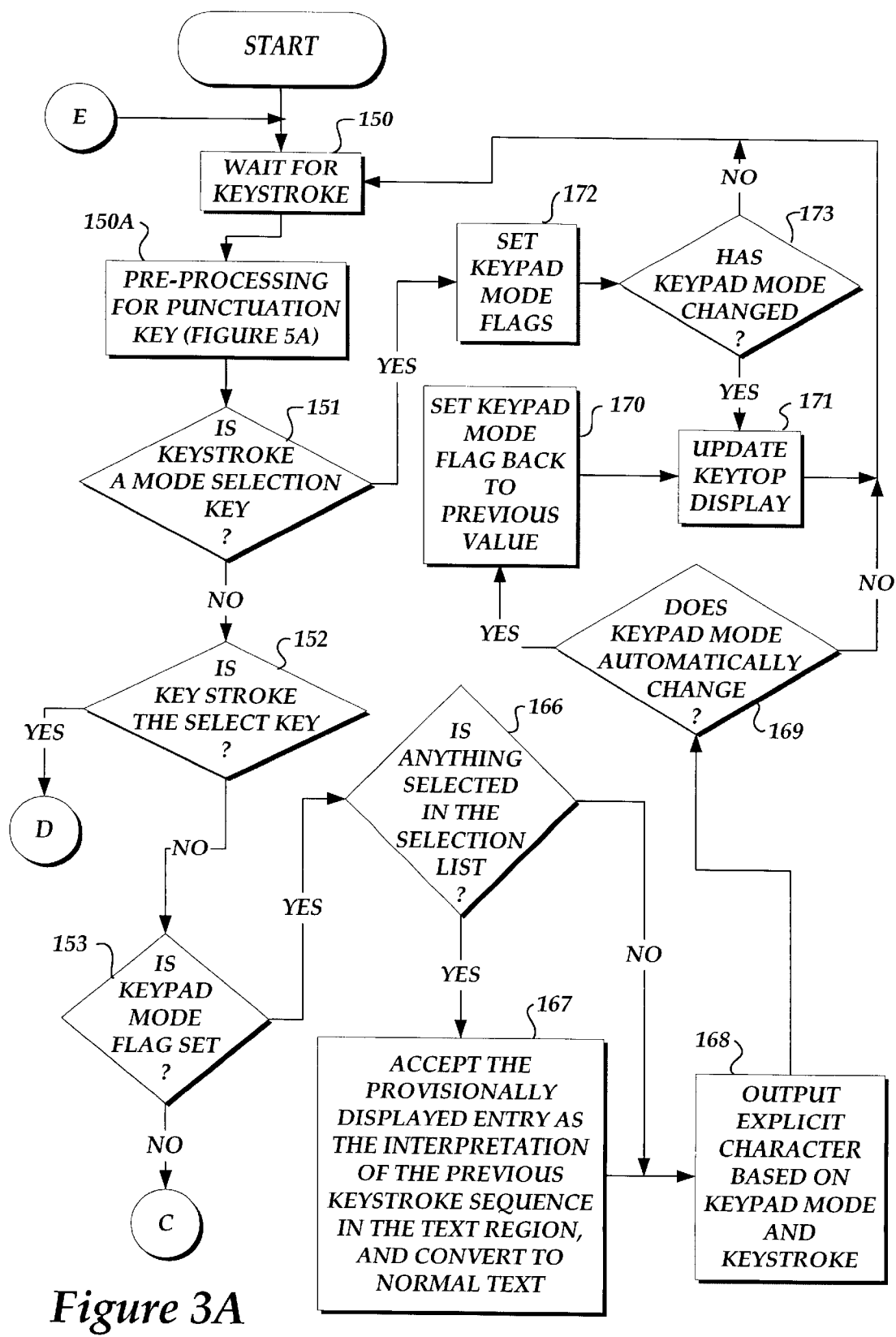
FIGS. 3A–3C collectively depict a flow chart of a preferred embodiment of disambiguating software for a reduced keyboard disambiguating system.
Figure 3B:
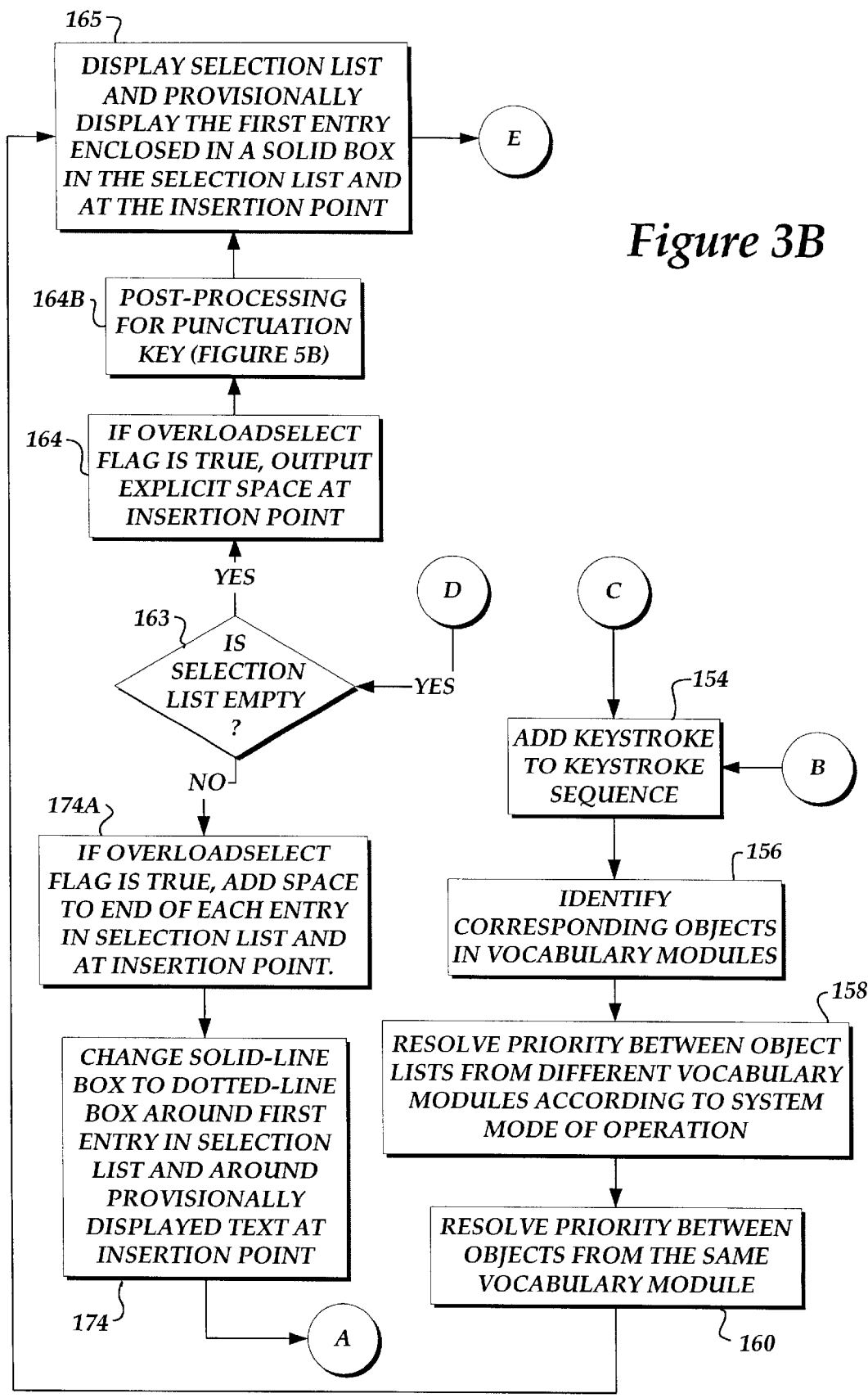
Figure 3C:
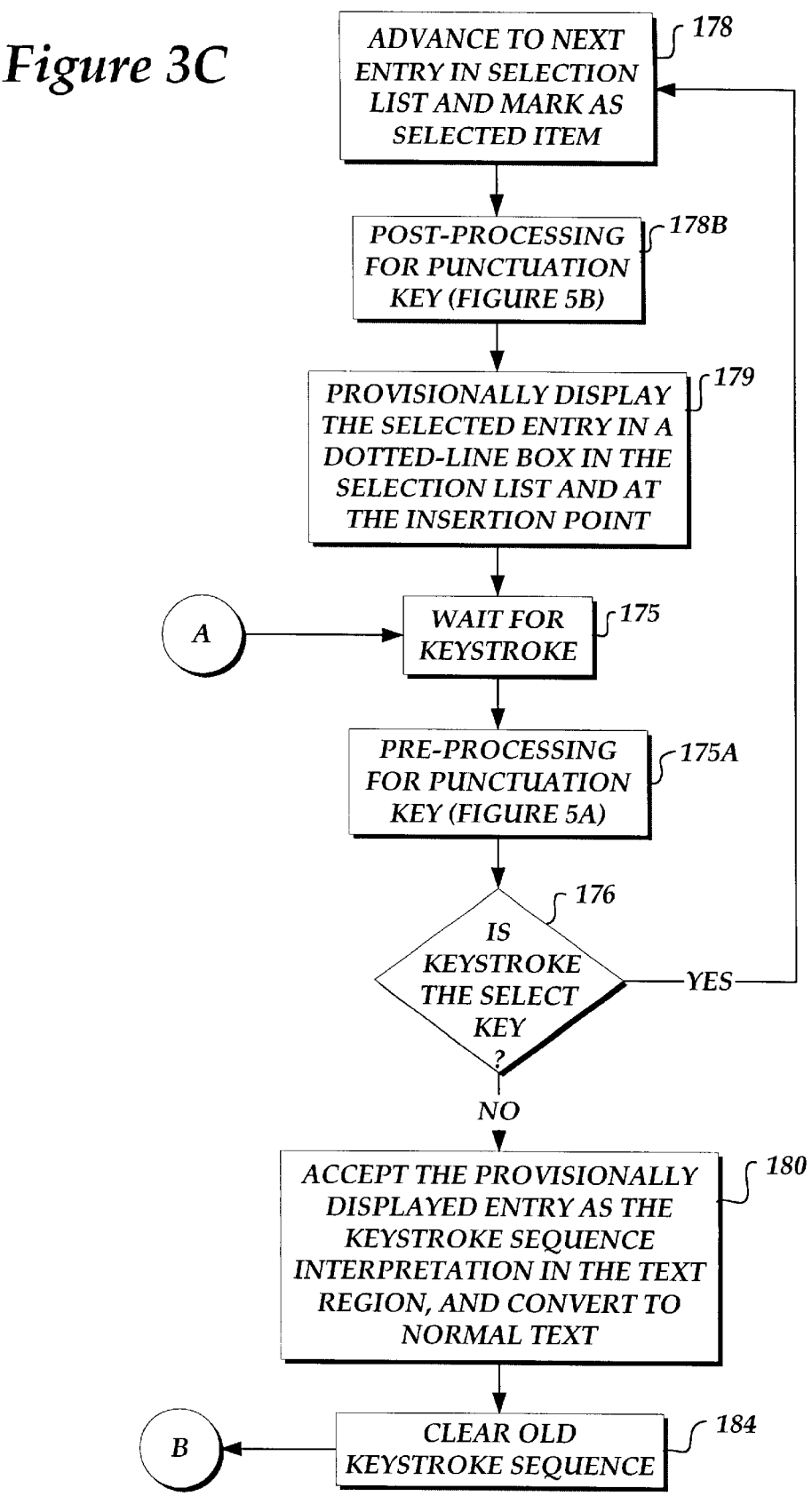

FIG. 3 is a flow chart of a main routine of the disambiguation software that generates a selection list to aid the user in disambiguating ambiguous keystroke sequences. At a block 150, the system waits to receive a keystroke from the keyboard 54. Upon receipt of a keystroke, at block 150A the system performs pre-processing required for the punctuation key 63 shown in FIG. 5A, and discussed in detail below. At a decision block 151, a test is made to determine if the received keystroke is a mode selection key. If so, at a block 172 the system sets a flag to indicate the current system mode. At a decision block 173, a test is made to determine if the system mode has changed. If so, at a block 171 the keytops are redrawn as needed to reflect the current system mode. If the system mode has not changed, or it has changed and the keytops subsequently redrawn, the main routine returns to block 150 and waits for another keystroke.

On the other hand, if block 151 determines the keystroke is not a mode selection key, then at a decision block 152, a test is made to determine if the received keystroke is the Select key. If the keystroke is not the Select key, then at decision block 153, a test is made to determine if the system is in a special explicit character mode such as the explicit Numeric mode. If so, at decision block 166 a test is performed to determine if any provisionally selected item is present in the selection list. If so, at a block 167 the item is accepted and is output as normal text. If a provisionally accepted item is not in the selection list, or if it is and has already been accepted, then, at a block 168, the explicit character corresponding to the keystroke is output to the text area. Next, at decision block 169, a test is made to determine if the system mode should be automatically changed, as in the case of Symbols mode. If so, execution proceeds to blocks 170 and 171 where the system mode is returned to the previously active mode and the keytops redrawn accordingly. Execution then returns to block 150.

If at block 153 no explicit character mode is active, at a block 154 the keystroke is added to a stored keystroke sequence. At a block 156, objects corresponding to the keystroke sequence are identified from the vocabulary modules in the system. Vocabulary modules are libraries of objects that are associated with keystroke sequences. An object is any piece of stored data that is to be retrieved based on the received keystroke sequence. For example, objects within the vocabulary modules may include numbers, letters, words, stems, phrases, or system functions and macros. Each of these objects is briefly described in the table below:

| Object | Corresponding data |
|---|---|
| Numbers | A number, each digit of which corresponds to a single keystroke, e.g., the two-digit sequence "42". |
| Letters | A letter or sequence of letters corresponding to pairs of keystrokes, e.g., the three letter sequence "str". Each pair of keystrokes is used to disambiguate using the two-stroke specification method of inputting individual letters. |
| Word | A word corresponding to single or multiple keystrokes, e.g., the four letter word "done". |
| Stem | A sequence of letters representing a valid portion of a longer sequence of letters forming a word, e.g., "albe" as a stem of the word "albeit." |
| Phrase | A user-defined or system-defined phrase corresponding to single or multiple keystrokes, e.g., "To Whom it May Concern:". |
| System Macro | A word and associated code describing a system or user-defined function, e.g., "<clear>" to clear the current text region. In addition to the descriptive word, in the vocabulary module the system macro object is associated with the executable code necessary for performing the specified function. |

While the preferred vocabulary objects are discussed above, it will be appreciated that other objects may be contemplated. For example, a graphic object may be associated with a stored graphic image, or a speech object may be associated with a stored segment of speech. A spelling object may also be envisioned that would link the keystroke sequence of commonly misspelled words and typing errors with the correct spelling of the word. For example, words that include the letter sequence "ie" or "ei" will appear in the list of words even if the keystrokes for these letters are accidentally reversed from their proper sequence. To simplify processing, each vocabulary module preferably contains similar objects. It will be appreciated, however, that various objects may be mixed within a vocabulary module.

Figure 6:
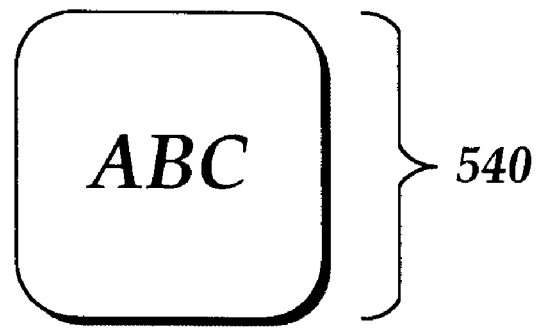
FIG. 6 compares the physical association of symbols to keys with an instance of a logical association including additional accented variations of the characters appearing on the physical key.
Figure 6:
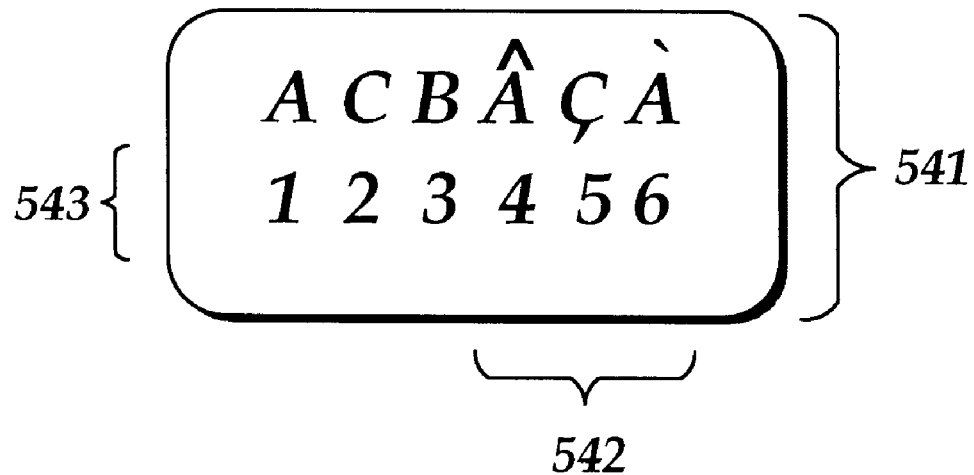

A representative diagram of a single key 540 is depicted in FIG. 6. The internal, logical representation of the keys in the preferred embodiment need not mirror the physical arrangement. For example 541 is a preferred logical description of a key associated with a French vocabulary module. Three additional symbols 542 (ÂçÀ) are required in the French alphabet. Also, the symbols are preferably indexed 543 by order of their decreasing frequency of use in a French lexicon. By extension, FIG. 7 is a preferred table relating the indices of logical symbols to key indices to be used in disambiguation of key presses into French words.

Figure 10:
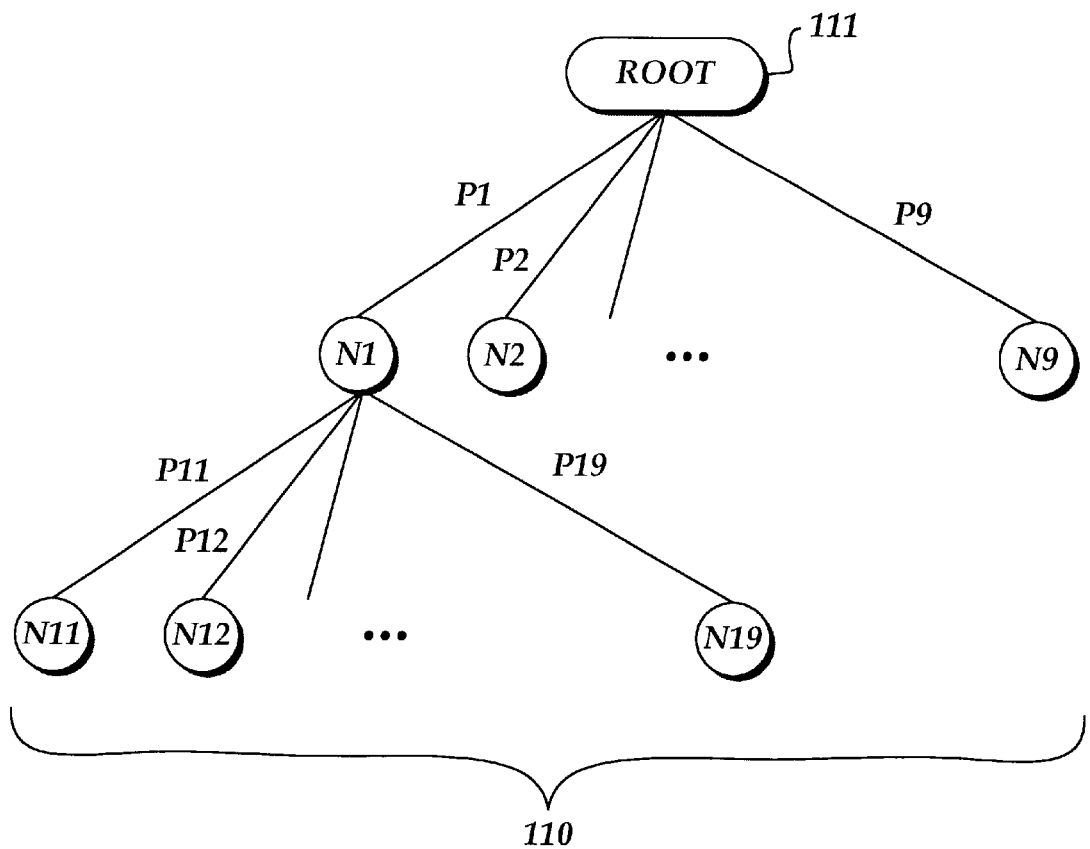
FIG. 10 depicts the preferred tree structure of an uncompressed vocabulary module.

A representative diagram of a word object vocabulary module 110 is depicted in FIG. 10. A tree data structure is used to organize the objects in a vocabulary module based on a corresponding keystroke sequence. As shown in FIG. 10, each node N1, N2, . . . N9 in the vocabulary module tree represents a particular keystroke sequence. The nodes in the tree are connected by paths P1, P2, . . . P9. Since there are nine ambiguous data keys in the preferred embodiment of the disambiguating system, each parent node in the vocabulary module tree may be connected with nine children nodes. Nodes connected by paths indicate valid keystroke sequences, while the lack of a path from a node indicates an invalid keystroke sequence, i.e., one which does not correspond to any stored word.

The vocabulary module tree is traversed based on a received keystroke sequence. For example, pressing the first data key from the root node 111 causes data associated with the first key to be fetched from inside the root node 111 and evaluated, then the path P1 to node N1 is traversed. Pressing the ninth data key after pressing the first data key causes data associated with the ninth key to be fetched from node N1 and evaluated, then the path P19 to node N19 is traversed. As will be described in greater detail below, each node is associated with a number of objects corresponding to the keystroke sequence. As each keystroke is received and the corresponding node is processed, an object list is generated of the objects corresponding to the keystroke sequence. The object list from each vocabulary module is used by the main routine of the disambiguating system to generate a selection list 76.

Figure 8A:
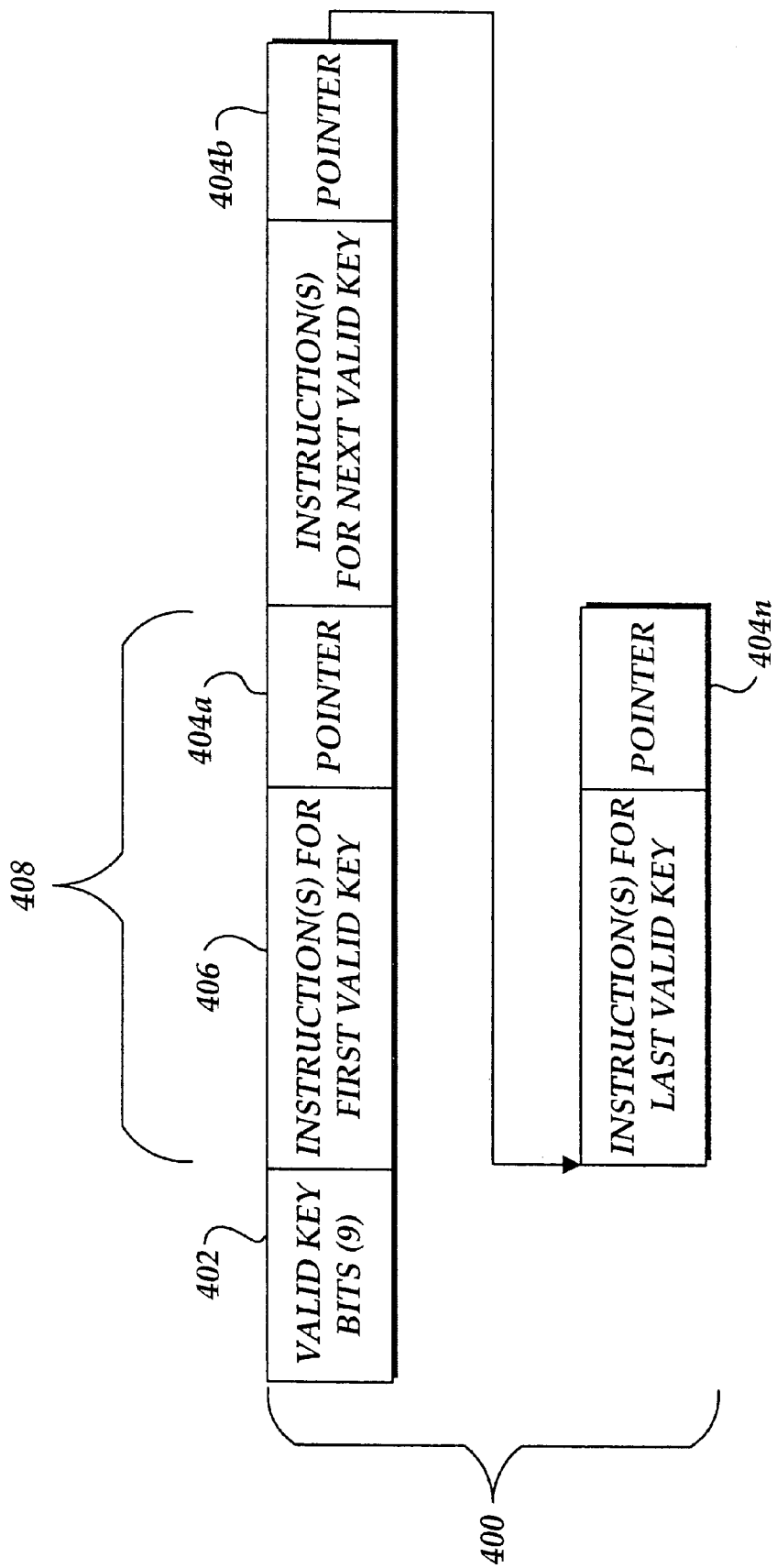
FIG. 8A depicts a preferred internal arrangement of data in a node of a tree of a vocabulary module.

FIG. 8A is a block diagram of a preferred data structure 400 associated with each node. The data structure contains information that links each parent node to children nodes in the vocabulary module tree. The data structure also contains information (instructions) to identify the objects associated with the particular keystroke sequences represented by the node.

The first field in the node data structure 400 is a valid keys bits field 402 that indicates the number and identity of children nodes that are connected to the parent node and which of the nine possible keys are associated with information (instructions) to identify the objects associated with the particular keystroke sequences represented by the node. Since there are nine data keys in the preferred embodiment, at most nine children nodes may be connected to any parent node, and nine valid keys bits are therefore provided in the valid keys bits field to indicate the presence or absence of child nodes. Each valid keys bit is associated with a pointer field 404a, 404b, . . . 404n that contains a pointer to the respective child node data structure in the vocabulary module. Since a child node is only present if the keystroke associated with the child node is a valid continuation of the keystroke sequence associated with the parent node, the number of pointer fields varies for each node. For example, valid keys bits field 402 may indicate that only six of the possible nine keystrokes lead to a valid child node. Because there are only six valid paths, only six pointer fields are included in the data structure for the parent node. The valid keys bits field 402 is used to ascertain the identity of the pointer fields contained within the node data structure. If a keystroke does not lead to a valid child node, the associated pointer field is omitted from the node data structure in order to conserve the amount of memory space required to store the vocabulary module.

Associated with each node are a number of objects that correspond to the keystroke sequence represented by the node. Each of the objects is described by an instruction in 406 in a packet 408 attached to a particular valid key as indicated by the pattern of bits in the valid keys bits field 402 contained in the node data structure.

Figure 11:
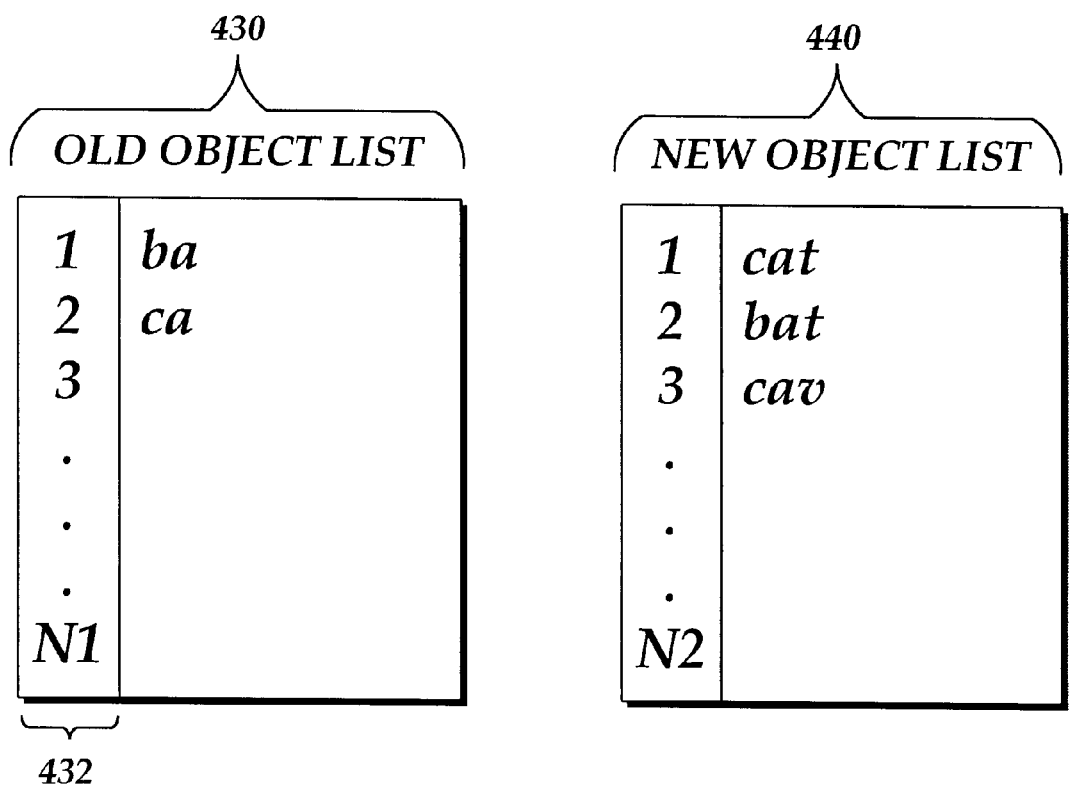
FIG. 11 depicts an example state of the object lists which are the preferred embodiment for intermediate storage of objects in the process of being retrieved from the vocabulary modules.

Each instruction in each packet 406 describes one of the objects corresponding to the keystroke sequence represented by each node. Describing an object requires maintaining two object lists. FIG. 11 depicts representative object lists created dynamically by the disambiguating software process from a parent and a child in a vocabulary module tree. Object list 430 is an object list containing objects 1-N₁ associated with a node representing two keystrokes. Object list 440 is an object list containing objects 1-N₂ associated with a node representing three keystrokes. Each object list contains a list of all objects that are associated with each node. Object list 430 is associated with a parent node representing the keystroke sequence ABC ABC from the keyboard of FIG. 1. Object list 440 is associated with a child node representing the keystroke sequence ABC ABC TUV. It will be appreciated that the size of the object list is varied to account for the actual number of objects associated with each node.

Figure 8B:
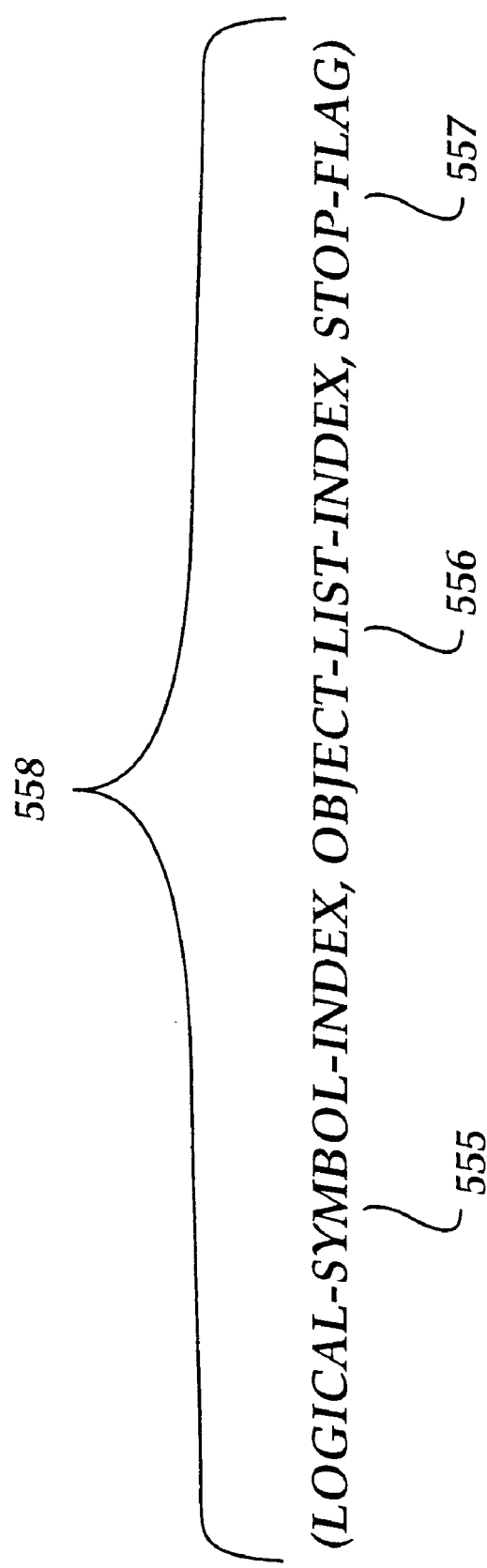
FIG. 8B depicts the semantic components of a preferred embodiment of an instruction.

Each object associated with a child node is constructed by adding a character sequence onto an object that was constructed for the parent node. The instruction packet 406 in FIG. 8A therefore contains an instruction 558 with an OBJECT-LIST-INDEX field 556 shown in FIG. 8B that identifies from a parent node object list an object that is used to construct the child node object. For example, with reference to FIG. 11, the first object "ba" in the old object list 430 is used to construct the second object "bat" in the new object list 440. The previous object identifier field OBJECT-LIST-INDEX 556 therefore provides a link to the entries in the old object list to identify the old object used to construct the new object.

The instruction 558 also contains a LOGICAL-SYMBOL-INDEX field 555 to indicate the symbol to add to the identified object in order to construct the new object. The LOGICAL-SYMBOL-INDEX fields therefore specify the letters from final key in the node's key sequence which will be appended to construct the new objects. The letter is specified by a table such as that depicted in FIG. 7 wherein the LOGICAL-SYMBOL-INDEX fields correspond the logical symbol indices 552 in the first row of table 550 and the row in which the specified key appears is identified by the given key index in the first column of the table. For example, with reference to FIG. 11, the first object "CAT" in the new object list 440 is constructed by using the second object "CA" in the old object list 430 and adding an additional keystroke to specify the T. In the logical symbol index table of FIG. 7, "T" is the first logical letter on the TUV key, therefore the LOGICAL-SYMBOL-INDEX field of the instruction which generated the object "CAT" is set to 1 to indicate the first letter in the table. Encoding the objects in this manner makes use of the known key sequence associated with each node and the known association of letters to keys to greatly reduce the amount of storage space required for each vocabulary module.

The vocabulary encoding technique also allows access to vocabulary module entries without searching. On receipt of each new valid keystroke the system executes the instructions associated with the key at the current node to construct a new object list from the old, then follows a single pointer to the appropriate child node. Also, rather than having to store every object in the vocabulary module, a new object is defined using the logical-symbol-index field to add onto an old interpretation. Thus a word stem that is shared by a plurality of objects in the vocabulary module is only stored once and is used to create all of the objects derived from it. The disclosed storage method requires maintaining an object list from a parent node in the vocabulary module tree in order to construct an object list of the child node.

The entries in the logical symbol index table such as that depicted in FIG. 7 need not be single characters—arbitrary sequences may occupy a single entry. For example, the ASCII string "tlike" might be added to the second object "ca" from the old object list to form the word "catlike". In this manner, the length of an entered keystroke sequence does not necessarily directly correspond to the length of an associated object. An ASCII sequence stored at an entry in the symbol index table would allow a vocabulary object to be identified by an arbitrary key sequence, i.e., stored at an arbitrary location within the vocabulary module tree.

The capability of storing objects with an arbitrary keystroke sequence is used to speed system processing of abbreviations and contractions. Abbreviations and contractions can be identified by a keystroke sequence that corresponds to their pure alphabetic content, ignoring punctuation. The result is that abbreviations and contractions are easily accessed by the user without entering punctuation, resulting in a significant savings in keystrokes. For example, the user can enter the keystroke sequence for "didn't" without typing an apostrophe between the "n" and the "t". The instruction in the vocabulary module that corresponds to the keystroke sequence "didnt" references an ASCII sequence with an apostrophe between the "n" and the "t" as a single symbol in a table. The disambiguating system will therefore automatically display to the user the correct word "didn't", without requiring the user to enter the punctuation mark. The disambiguating system uses the same table to properly display foreign words having unique characters (such as "Ü", which may be entered as a single keystroke on the TUV key). Capitalization may be handled in a similar manner. Words that should always be used in all capital letters, with an initial capital letter, or with a capital letter in the middle may be associated with keystroke sequences which omit keystrokes indicating capitals, eliminating the need for the user to enter such capitalization. An object type field may also be included in each instruction 558 to specify additional information about the object being constructed. The object type field may contain a code to specify whether the generated object is a word, a word stem, or any other object. The object type field therefore allows different types of objects to be mixed within a given vocabulary module. Moreover, the object type field may also include information regarding the part of speech of the word, information about how the object is capitalized, or information needed to construct various inflections and endings. A reduced keyboard disambiguating system using a vocabulary module having the part of speech information may use the additional information to implement syntactical analysis to improve the disambiguation process. The object type field may also contain a unique code to allow transmission of text in a compressed form. The unique code would be transmitted to a remote terminal instead of transmitting the entered keystroke sequence or the associated disambiguated characters.

One of the key features of the preferred vocabulary module tree data structure is that the objects associated with each node are stored in the node data structure 400 according to their frequency of use. That is, the object constructed by the first instruction in packet 406 has a higher frequency of use than that constructed by the second instruction (if present) in 406, which has a higher frequency of use than the third instruction (if present). In this manner, the objects are automatically placed in the object list so that they are sorted according to decreasing frequency of use. For purposes of this description, frequency of use of a word object refers to the likelihood of using a given word within a representative corpus of use, which is proportional to the number of times that each word occurs in the corpus. In the case of word stem objects, frequency of use is determined by summing the frequencies of all words which share the same stem.

Storing frequency of use or other rank information at each node avoids the need to determine and sort on the rank of each object when the system is in use. This has important implications in the word object vocabulary, since the stored objects may include shared stems common to a very large number of longer words. Determining the relative rank of these stems dynamically would require traversing the entire tree of children nodes and accumulate information about each stem, adding significant processing overhead for a portable computing device. Determining this information in advance and storing it in the vocabulary data thus reduces the processing overhead. Moreover, when the frequency of use or rank is represented implicitly by the ordering of objects 406 in the node, no additional storage space is required for this information.

While preferably the objects are stored within the node data structure 400 in order according to their frequency of use, it will be appreciated that a frequency of use field could also be associated with each instruction. The frequency of use field would contain a representative number that corresponds with the frequency of use of the associated object. The frequency of use between different objects would be determined by comparing the frequency of use field of each object. The advantage of using the latter construction that associates a frequency of use field with each object packet is that the frequency of use field could be changed by the disambiguating system. For example, the system could change a frequency of use field to reflect the frequency with which a user used certain objects within the vocabulary module during representative text entry.

Figure 12:
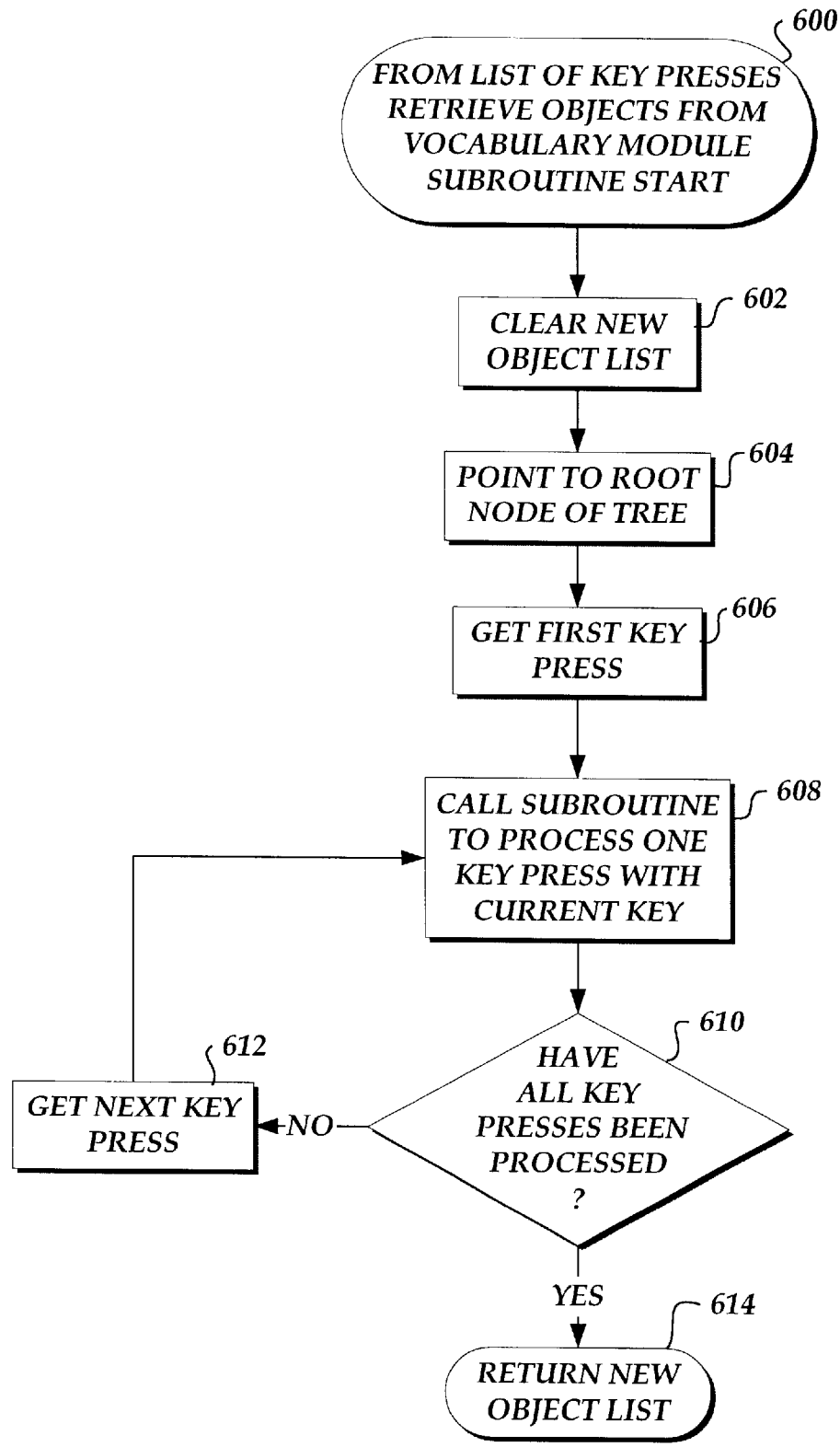
FIG. 12 is a flowchart of a preferred embodiment of a software process for retrieving text objects from a vocabulary module given a list of key presses.

Returning to FIG. 3, at block 156 those objects that correspond to the received keystroke sequence are identified in each vocabulary module. FIG. 12 is a flow chart of a subroutine 600 for analyzing the received keystroke sequence to identify corresponding objects in a particular vocabulary module. The subroutine 600 constructs an object list for a particular keystroke sequence. Block 602 clears the new object list. Block 604 initiates the traversal of the tree 110 at its root node 111. Block 604 gets the first key press. Blocks 608 to 612 form a loop to process all available key presses. Block 608 calls subroutine 620 in FIG. 13. Decision block 610 determines whether all available key presses have been processed. If any key presses remain unprocessed, block 612 advances to the next available one. If all key presses have been processed, block 614 returns the completed object list. It will be appreciated that if the main routine calls subroutine 600 repeatedly with new keystroke sequences, each with one more key than the last and all keys but the last being the same as in the previous invocation, then the initialization blocks 602 and 604 may be bypassed if subroutine 620 is called directly to process only the most recent key press.

Figure 13:
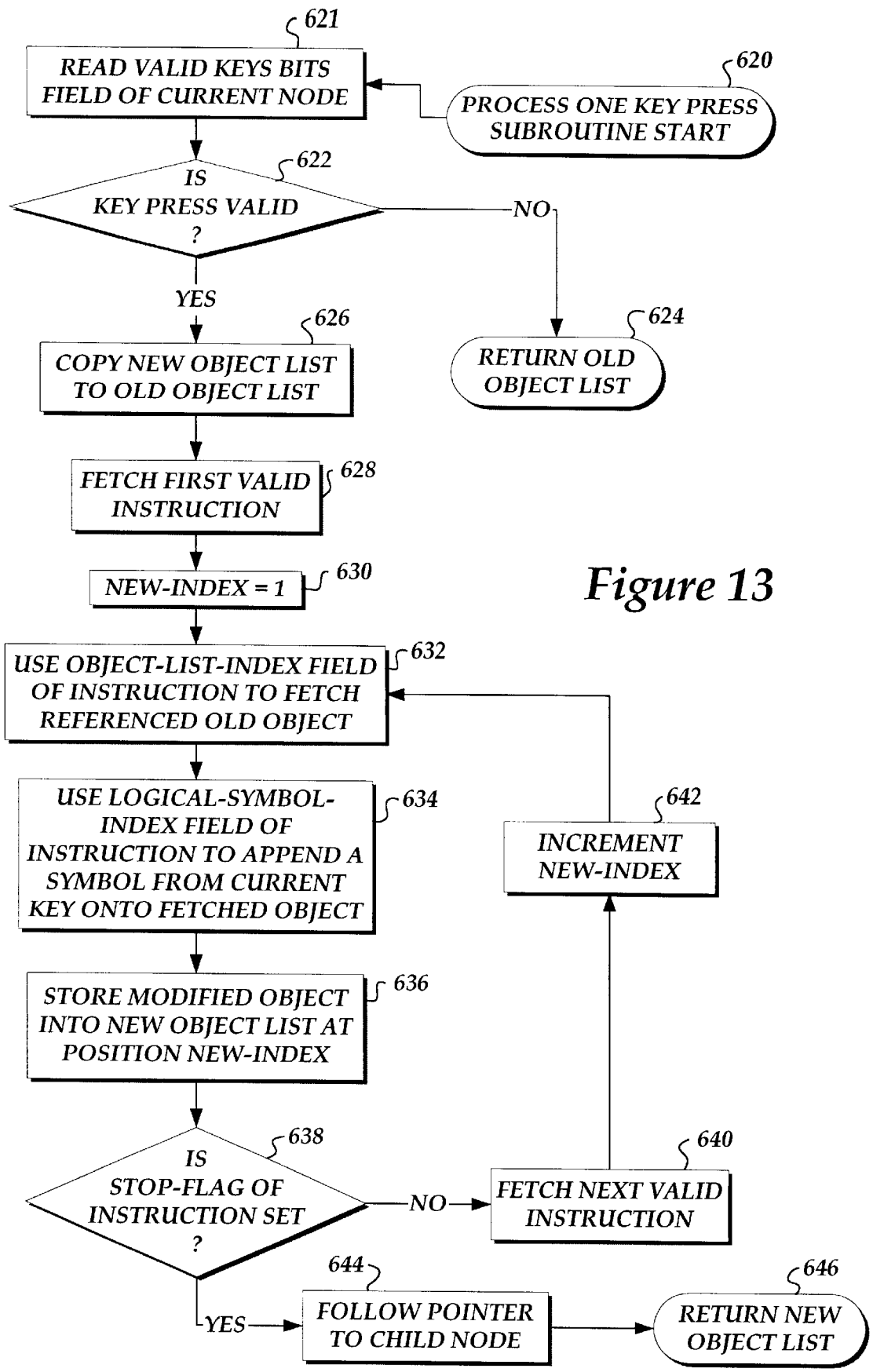
FIG. 13 is a flowchart of a preferred embodiment of a software process for traversing the tree structure of the vocabulary module given a single key press and altering the state of the object lists.

FIG. 13 is a flowchart of a subroutine 620 called from subroutine 600. In the main routine shown in FIG. 3, a keystroke was detected by the system at block 150. The receipt of a new keystroke causes a downward traversal in the vocabulary module tree, if a valid path exists to a child corresponding to the keystroke. At a block 621 in FIG. 13, the valid keys bits field of the node 400 data structure is therefore examined to determine if valid instructions and a pointer correspond to the received keystroke. At a decision block 622, a test is made of the valid keys bits field to determine if a valid packet 408 consisting of instructions 406 and a pointer field such as 404a exists corresponding to the entered keystroke. If no valid packet corresponds to the keystroke, at a block 624 the old object list is returned to the main routine to generate the selection list because the received keystroke is part of an invalid keystroke sequence that does not correspond to any object within the vocabulary module. The branch of the subroutine 620 that comprises blocks 622 and 624 therefore ignores any invalid keystroke sequences and returns the object list generated at the parent node for possible inclusion in the selection list generated by the disambiguating system.

If a valid packet exists corresponding to the received keystroke at decision block 622, the subroutine proceeds to a block 626 where the new object list is copied to the old object list. As noted above, to construct a new object list the disambiguating system starts with a copy of the old object list. At a block 626, the object list from the prior node is therefore stored so that it may be used to construct the new object list.

Block 628 fetches the first valid instruction associated with the given key. Block 630 initializes the iterator NEW-INDEX to 1 so that the first instruction will generate the first item in the new object list. The subroutine then enters the loop comprised of blocks 632 through 642 to construct the object list associated with the valid instructions. At block 632 the OBJECT-LIST-INDEX field 556 is examined and the corresponding object loaded from the old object list. At block 634, the LOGICAL-SYMBOL-INDEX field 555 is examined and the appropriate symbol (associated with the received keystroke through a logical symbol index table like 550 shown in FIG. 7) is appended to the end of the identified object. It will be appreciated that an ASCII sequence of length greater than one may be appended to the identified object at block 634 if the entry in the symbol table 550 at the given key 551 and logical symbol index 552 holds a character sequence. At a block 636, the combined object and symbol are stored as a new object in the new object list. At a block 638, a test is made to determine if the subroutine has processed the last valid instruction associated with the given key at the given node. If the last valid instruction has not been processed, at block 640 the next valid instruction is fetched. At block 642 NEW-INDEX is incremented.

If the test at decision block 638 indicates that all of the objects have been constructed for the node, the subroutine proceeds to a block 644 and follows the associated pointer to a child node. At block 646 the new object list is returned to the main routine in order to generate the selection list. It will be appreciated that the subroutine 600 for generating the object list associated with each node is performed for each keystroke received from the user. No "searching" of the vocabulary modules is performed as the user enters a new keystroke sequence, since each keystroke merely advances the subroutine one additional level within the vocabulary module tree. Since a search is not performed for each keystroke, the vocabulary module returns the list of objects associated with each node with minimal processing overhead.

It will be appreciated that the relationship between vocabulary module objects and keystroke sequences is an implementation detail of the vocabulary module. When processing the node associated with the current input key sequence, additional child nodes may be traversed to identify candidate objects having a keystroke sequence starting with the entered keystroke sequence, and that occur with a relative frequency greater than a certain threshold. This threshold may be dynamically adjusted based on characteristics of the current node, such as whether it generates enough objects to fill the selection list region 70 on the display. The objects are identified by traversing downward in the vocabulary module tree along valid paths until the objects are identified. Such candidate objects can be identified at the time the database is constructed from the input word list, and the node and instruction corresponding to the completion of a candidate word can be marked in such a way as to enable the system to recognize when a traversal of that node corresponds to the generation of the candidate word. The special marking is required since the same node and instruction may be traversed in processing different input key sequences corresponding to different words after the tree structure has been transformed in the compression process described below. Only enough information need be added to distinguish the candidate word's sequence from other sequences, such as the sequence length or specific key values at known positions in the key sequence. Alternatively, terminal nodes for candidate words may be specially marked in such a way that they are not merged with nodes used for other words as described below. The disambiguating software can then search ahead within a defined neighborhood of the descendants of the current node for these candidate objects, which if found can then be placed in the selection list before all the keystrokes corresponding to the objects are entered. These objects are included in addition to the objects that are directly associated with the input keystroke sequence. Displaying objects associated with longer keystroke sequences in the selection list (referred to as the "look-ahead" feature) allows the user to optionally select the objects immediately, without having to complete the remaining keystrokes to specify the object.

Returning to FIG. 3, at blocks 158–165 the objects found by looking up the keystroke sequence in the vocabulary modules are prioritized and displayed to the user in the selection list 76. To determine the sequence of objects displayed in the selection list, priorities are established between each vocabulary module and also between the returned objects from each vocabulary module.

To prioritize the object lists identified from the various vocabulary modules, at block 158 the mode of operation of the reduced keyboard disambiguating system is examined. As discussed above, in a normal mode of operation the word interpretations are displayed first in the selection list. The object list from a word vocabulary module would therefore be assigned a higher priority than the object list from the other vocabulary modules. Conversely, if the disambiguating system is in the numeric mode of operation, the numeric interpretations would be assigned a higher priority than the other vocabulary modules. The mode of the disambiguating system therefore dictates the priority between vocabulary module object lists. It will be appreciated that in certain modes, the object lists from vocabulary modules may be omitted from the selection list entirely.

Object lists generated from vocabulary modules may contain only a single entry, or they may contain multiple entries. At block 160, the priority between the objects from the same vocabulary module is therefore resolved if the object list contains multiple entries. The objects that match a particular keystroke sequence that are looked-up in a given vocabulary module are also given a priority that determines their relative presentation with respect to each other. As noted above, preferably the default presentation order is by decreasing frequency of use in a representative corpus of usage. The priority data associated with each object is therefore used to order the objects in the selection list. Since the selection list region 70 is limited in the number of entries that may be displayed, objects that fall below a predetermined minimum frequency of use may be omitted from the initial display of the selection list. The omitted objects may be later added to the selection list when the user scrolls beyond the end of the displayed list. The selection list is scrolled automatically so that the currently selected object is always visible. The user may also use dedicated scroll buttons to manually scroll additional objects into view, in which case the currently selected object may scroll out of view. Alternatively, all objects in the selection list may be displayed simultaneously in a "drop-down" list at the user's request.

Many of the properties associated with the presentation of the objects looked-up in a vocabulary module are user-programmable by accessing appropriate system menus. For example, the user can specify the order of individual objects or classes of objects in the selection list region. The user may also set the priority level that determines the priority between vocabulary modules and between the objects identified from each vocabulary module. In this manner, the number of entries presented to the user in the selection list region may be kept to a minimum. Additional entries in the selection list region may always be scrolled into view by repeated presses of the Select key.

After the priorities between the objects have been resolved, at a block 165 a selection list is cconstructed from the identified objects and presented to the user. As a default interpretation of the ambiguous keystroke sequence entered by the user, the first entry in the selection list is provisionally posted and highlighted at the insertion point 88 in the text region 66. The disambiguating software routine then returns to block 150 to wait for the next keystroke.

Returning to decision block 152, if the detected keystroke is the Select key 60, the "yes" branch is taken from decision block 152 to decision block 163, where a test determines if the current selection list is empty. If so, at a block 164, if the OverloadSelect flag is set TRUE, an explicit space is generated and immediately output to the text area. The OverloadSelect flag is a system flag that is set TRUE in systems that do not include an explicit Space key 64, and in which a space character is generated for the first activation of any continuous sequence of activations of the Select key, or if the selection list is empty at the time the Select key is activated. Following this initial processing of the received keystroke, at block 164B the system performs post-processing required for the punctuation key 63 shown in FIG. 5B, and discussed in detail below. Execution then returns to block 150. If at decision block 163 the selection is not empty, the "no" branch is taken to a block 174A. At block 174A, if the OverloadSelect flag is set TRUE, a space is added to the end of each text item in the selection list and at the insertion point. At block 174, the solid-line box around the first entry in the selection list (and also at the insertion point where it has been provisionally posted) is changed to a dotted-line box. At a block 175 shown in FIG. 3, the system then waits to detect the next keystroke entered by the user. Upon receipt of a keystroke, at block 175A the system performs pre-processing required for the punctuation key 63 shown in FIG. 5A, and discussed in detail below. At a decision block 176, a test is made to determine if the next keystroke is the Select key. If the next keystroke is the Select key, at a block 178 the system advances to the next entry in the selection list and marks it as the currently selected item. Following this initial processing of the received keystroke, at block 178B the system performs post-processing required for the punctuation key 63 shown in FIG. 5B, and discussed in detail below. At block 179, the currently selected entry is provisionally displayed in the selection list and at the insertion point with a dotted-line box around the entry. The routine then returns to block 175 to detect the next keystroke entered by the user. It will be appreciated that the loop formed by blocks 175–179 allows the user to select various interpretations of the entered ambiguous keystroke sequence having a lesser frequency of use by depressing the Select key multiple times.

If the next keystroke is not the Select key, from decision block 176 the routine continues to a block 180 where the provisionally displayed entry is selected as the keystroke sequence interpretation and is converted to normal text formatting in the text region. At a block 184, the old keystroke sequence is cleared from the system memory, since the receipt of an ambiguous keystroke following the Select key indicates to the system the start of a new ambiguous sequence. The newly received keystroke is then used to start the new keystroke sequence at block 154. Because the word interpretation having the highest frequency of use is presented as the default choice, the main routine of the disambiguation software allows a user to continuously enter text with a minimum number of instances where additional activation's of the Select key are required.

As noted above, in the normal mode of operation the entries in the selection list 76 corresponding to words are presented first in the list. In other circumstances, it may be desirable to have other keystroke sequence interpretations presented first in the list. For example, in systems where there is not sufficient display area to support the display of a literal selection "list" on the display screen, the set of possible matching objects from the database is stored internally by the software and only the default object or explicitly selected object (following one or more activations of the Select key) is displayed at the insertion point.

In such systems, the object displayed at the insertion point may tend to change significantly with each keystroke added to the input sequence, since the most frequent word corresponding to the new keystroke sequence may bear little or no resemblance to the most frequent word corresponding to the previous input sequence. The result can be that the object displayed at the insertion point can appear "jumpy" to the user, and its constantly changing appearance can be distracting, especially to a new or unfamiliar user. To reduce this "jumpiness" at the insertion point, the system can be configured so that, rather than always displaying the most frequent word object corresponding to the current key sequence, a word or word stem object may be displayed if it corresponds to a longer word or plurality of words with a total frequency that exceeds a threshold. The result of this "stem promotion" is that changes in the word displayed at the insertion point frequently consist of simply appending an additional letter to the text object previously displayed. For example, in typing the frequent word "this", the user presses the four keystrokes TUV, GHI, GHI, PQRS. Without performing stem promotion, the system would display the following sequence of objects (one at a time) at the insertion point: "t", "vi", "ugh", "this". When stem promotion is performed, the system displays: "t", "th", "thi", "this". The result is that a new or unfamiliar user tends to have more confidence that the disambiguating system will correctly interpret his or her keystrokes. The flowchart in FIG. 4 shows how the system determines which object to display at a given node for a given keystroke sequence.

Figure 4:
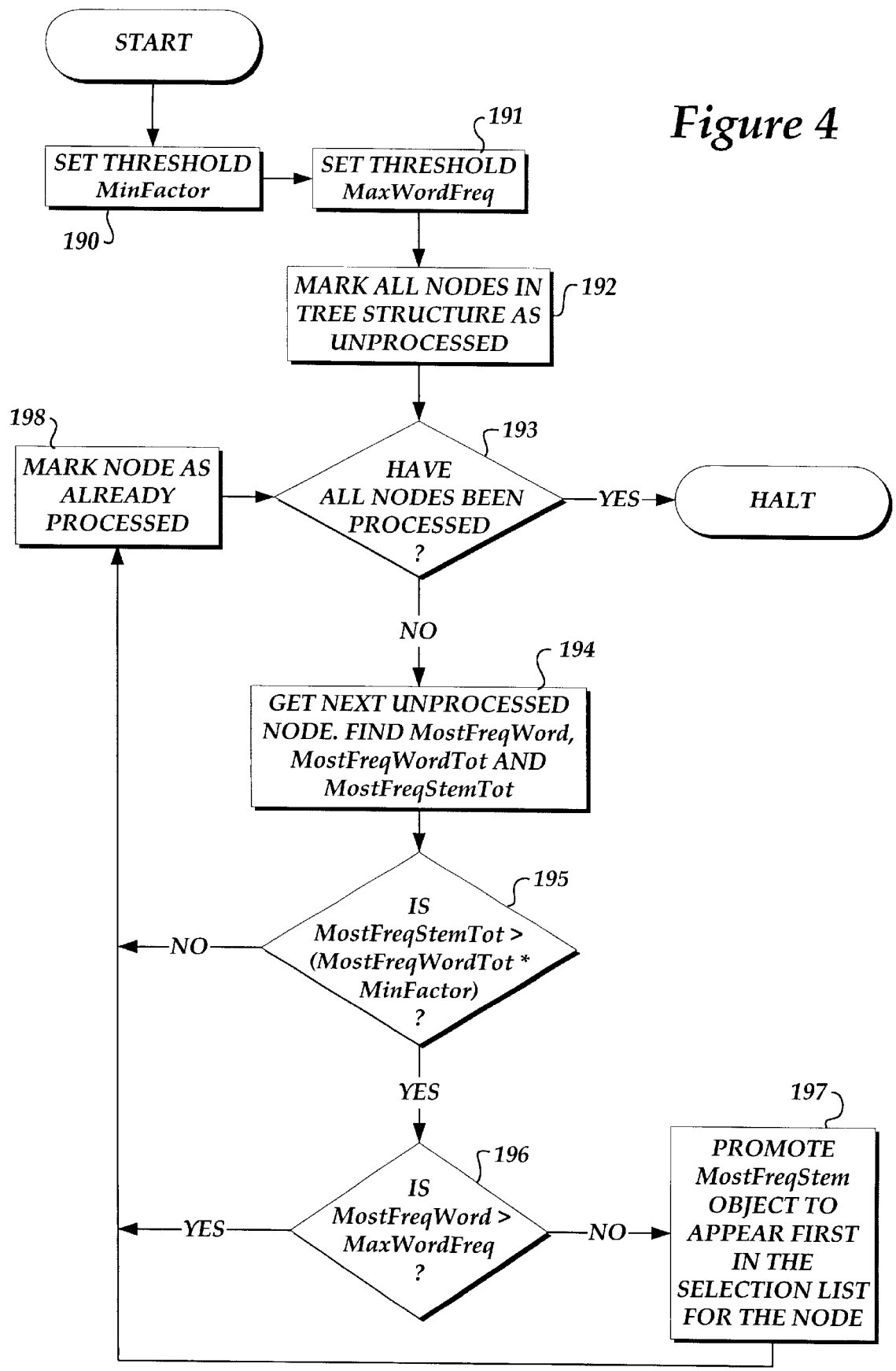
FIG. 4 is a flow chart of a preferred embodiment of software to determine which text object should be used as the default object in each node of a tree data structure for a reduced keyboard disambiguating system.

FIG. 4 is a flow chart of a routine of the software program that generates a database of words in the tree structure of nodes where each node corresponds to an ambiguous keystroke sequence. At each node, a number of word objects are generated corresponding to possible words or word stems that are generated by the keystroke sequence. At a block 190, a threshold "MinFactor" is set. This threshold corresponds to the minimum factor by which the total frequency of a text object must exceed that of the most frequent word object at a node in order to be promoted over that word object (i.e., to be the default object displayed first in the selection list for that node). The total frequency of a word object is the frequency of the word itself plus the sum of the frequencies of all the longer words of which the word is the stem (i.e. corresponds to the initial letters of the longer words). At block 191, a second threshold "MaxWordFreq" is set which corresponds to the maximum relative frequency of a word over which another stem may be promoted. At block 192, all of the nodes in the tree are traversed and marked as unprocessed. At block 193, the routine determines if all nodes of the tree have been processed. If so, the routine halts, otherwise at block 194, the system fetches the next unprocessed node, and determines the frequency of the most frequent word object (MostFreqWord), the total frequency of that word together with all words of which that word is a stem (MostFreqWordTot), and the object for which the total frequency of all words of which that object is a stem is highest among all objects associated with the node (MostFreqStemTot). At block 195, the system tests whether MostFreqStemTot exceeds the value MostFreqWordTot by at least a factor of MinFactor. If not, the default object associated with the node is left unchanged, and the system returns to block 198, where the node is marked as already processed before returning to block 193. If at block 195 MostFreqWordTot is exceeded by at least a factor of MinFactor, then at block 196, the system tests whether the frequency of the current default object associated with the node (MostFreqWord) exceeds the maximum value of a word over which another object may be promoted (MaxWordFreq). If so, the default object associated with the node is left unchanged, and the system returns to block 198. If not, at block 197 the node is modified so that the object associated with MostFreqStemTot is designated as the default object associated with the node before returning to block 198.

The test at block 196 is needed to prevent very common stems from being promoted over common words. For example, the stem "fo" of the word "for" occurs with a very high frequency, so that for reasonable values of MinFactor (e.g., a value of 1.5), the test at block 195 would be satisfied even though the common word "do" also occurs at the same node. The word "do" obviously occurs with a relatively high frequency, and it would be a significant detriment to the efficiency of the disambiguating system if "do" did not appear as the default object for that node.

II. Advanced System Features

1. Disambiguation of Punctuation

FIG. 1 shows one preferred embodiment of the present invention, in which the upper left key of the data keys 56 (the "punctuation key") is associated with the punctuation characters period, hyphen, and apostrophe. All of these characters are commonly used in a number of languages, for example both English and French. Other sets of characters (for example, the characters comma, hyphen, and long dash) may be assigned to the key and disambiguated using the same principles of the approach as the disambiguating system of the present invention. The system uses the context of the keystrokes surrounding a keystroke on the punctuation key 63 to determine which punctuation character is intended. The default behavior of the punctuation key 63 is also modified to handle certain special cases presented by certain languages.

Figure 5A:
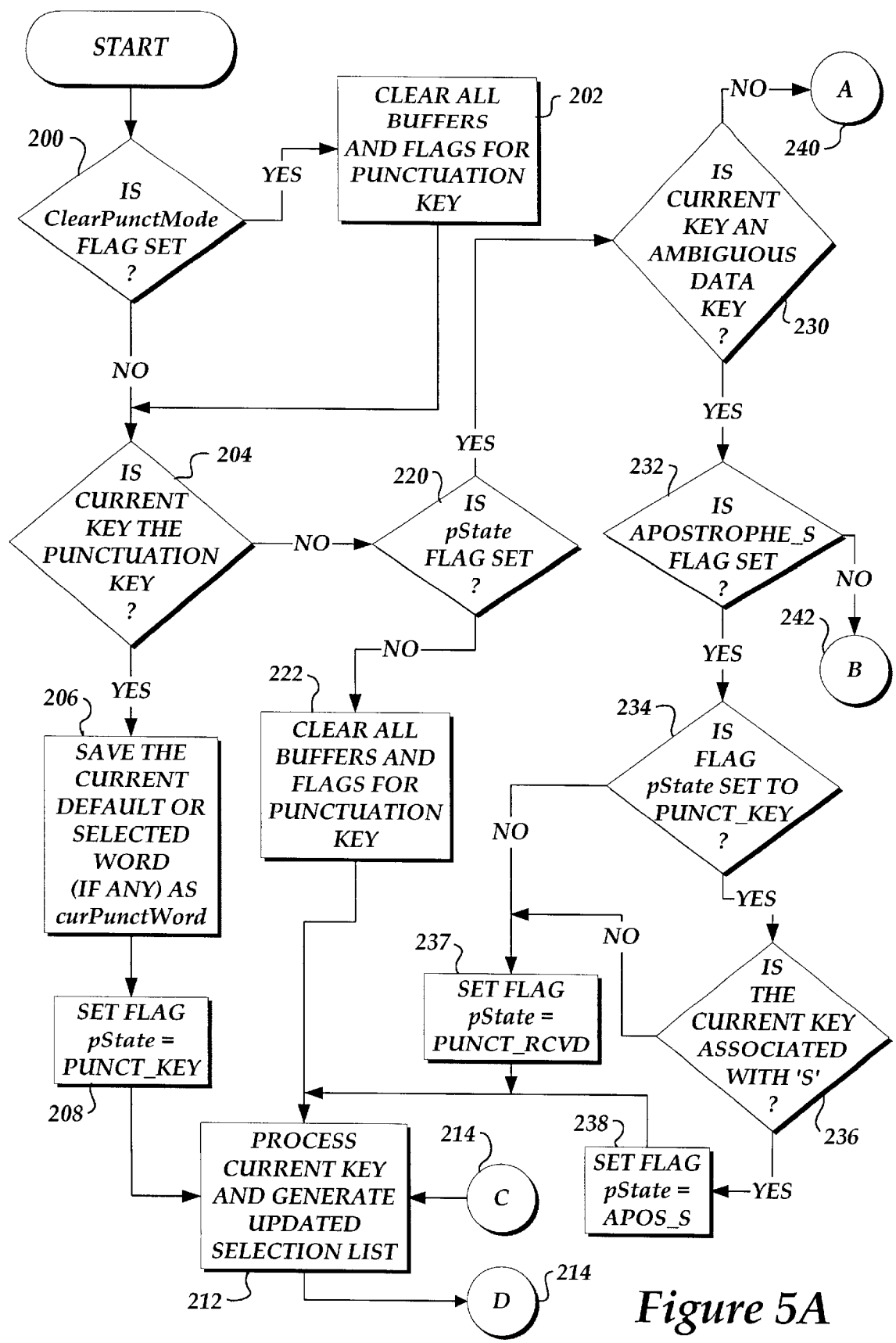
FIGS. 5A–5D show a flow chart of a preferred embodiment of a software process performed with each keystroke to disambiguate the intended punctuation character among a plurality of punctuation characters associated with a key of the reduced keyboard disambiguating system.
Figure 5B:
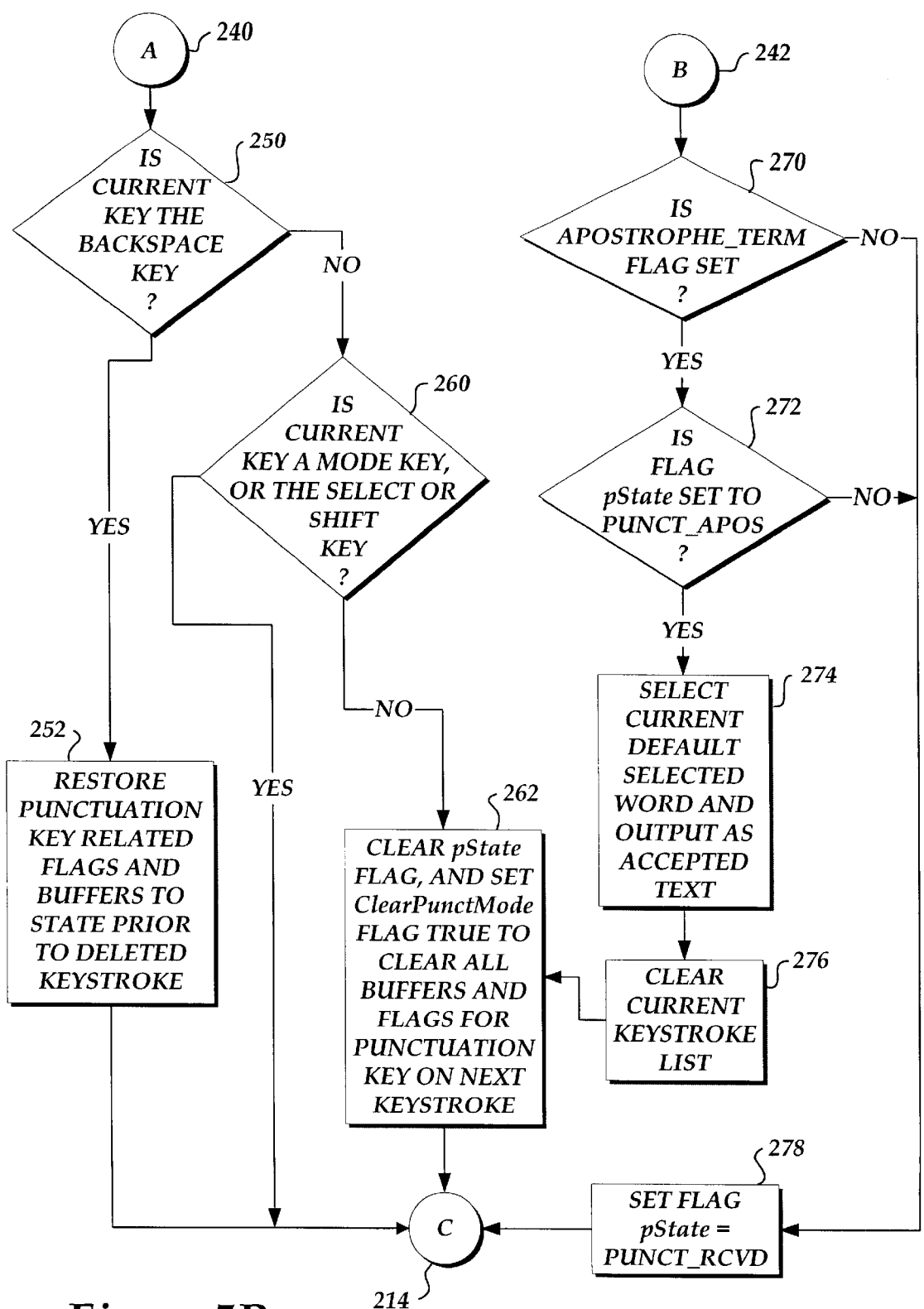
Figure 5C:
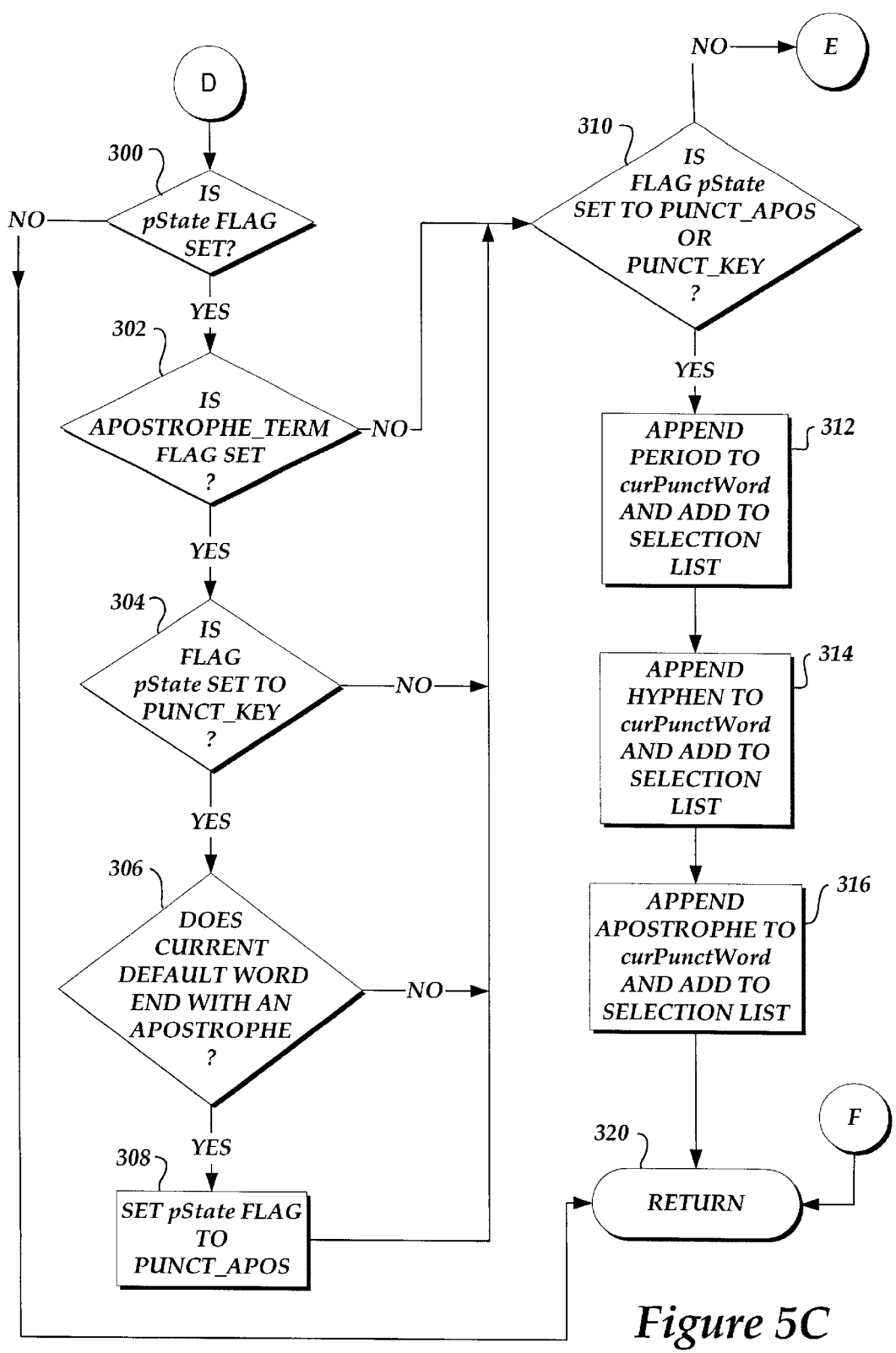
Figure 5D:
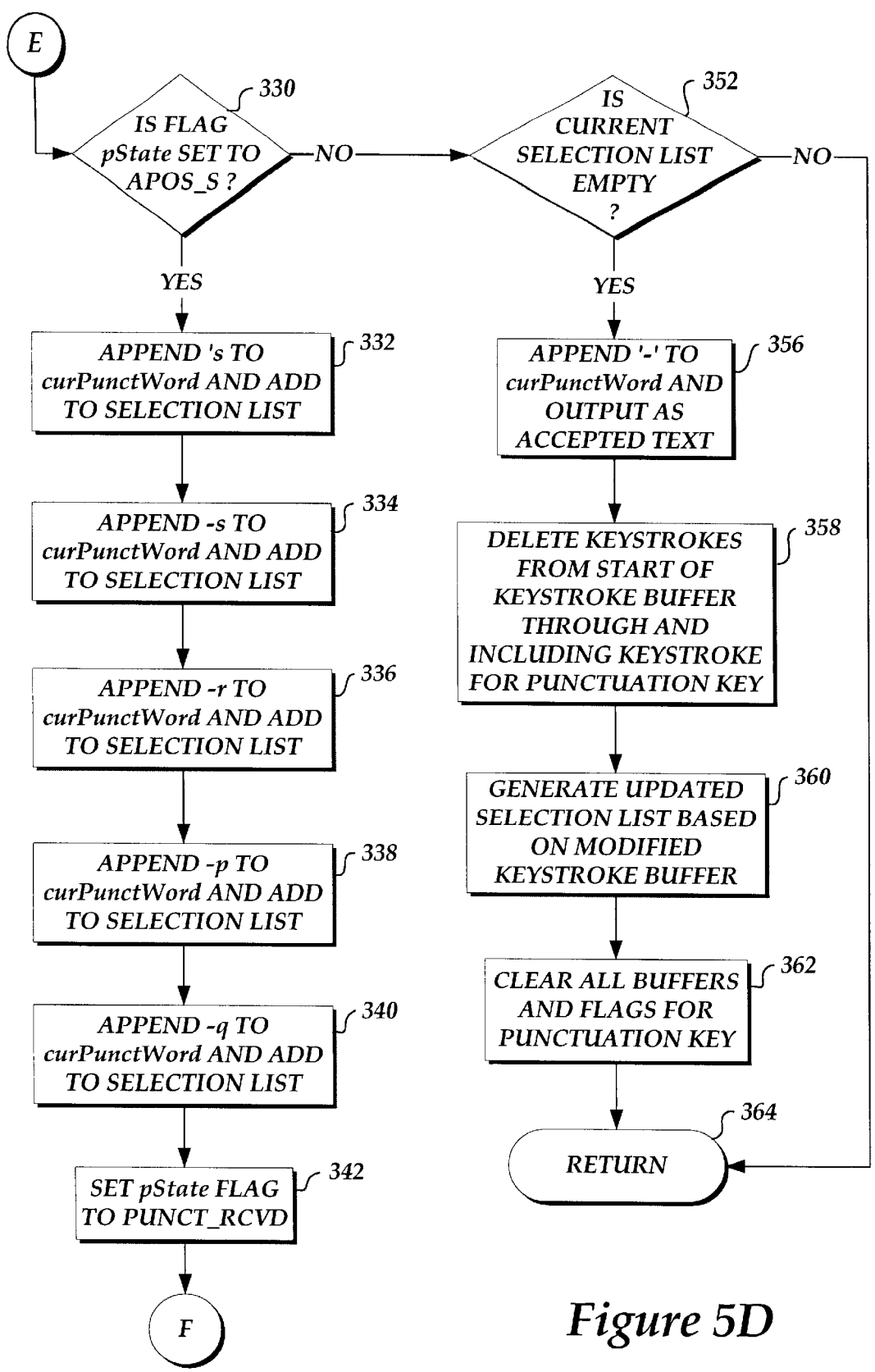

The flowcharts in FIG. 5A and FIG. 5B show how the system determines which character to generate for a given activation of the punctuation key. Different text objects created using different punctuation characters associated with the punctuation key 63 are added to the selection list. The default interpretation of the activation of the punctuation key 63 is determined by which object is added as the first object in the selection list. Alternate interpretations may also be selected by activating the Select key, or by tapping the desired interpretation in a displayed selection list. FIG. 5A shows the routine which processes each keystroke received by the system prior to the normal system processing shown in FIG. 3 in which the system adds the keystroke to the current input keystroke sequence, determines which words correspond to the new input sequence, and generates an updated selection list based on the new sequence. The processing depicted in FIG. 5A occurs at blocks 150A and 175A in FIG. 3. FIG. 5B shows the routine that then post-processes the newly generated selection list. The processing depicted in FIG. 5B occurs at blocks 164B and 178B in FIG. 3. All flags are assumed to have been cleared at system initialization time.

In starting to pre-process each keystroke, at block 200 in FIG. 5A the flag ClearPunctMode is checked. The flag ClearPunctMode is set (at block 262) to indicate that all punctuation key related flags and buffers should be cleared at the start of processing the next keystroke. If at block 200 the flag is found to be set then at block 202 all flags and buffers exclusively used for punctuation key 63 processing are cleared. These same flags and buffers are also cleared at system initialization time. The curPunctWord buffer is used to save the text object to which the punctuation key software will append punctuation characters to create objects that are added to the selection list. The pState flag saves the current state of the punctuation key software and differentiates between the different possible cases for the context in which the punctuation key 63 was activated. If at block 204 the current key being pre-processed is the punctuation key 63, then at block 206 the current default (or explicitly selected object) is saved in the curPunctWord buffer, and at block 208 the flag pState is set to PUNCT_KEY, indicating that the punctuation key 63 was the last key received. Block 212 represents the normal processing of the keystroke as depicted in FIG. 3 starting at block 151 or 176. Execution then continues with the post-processing shown in FIG. 5B, starting from connector D.

If at block 204 the current key is not the punctuation key, then at block 220 if the pState flag is not set, then at block 222 all flags and buffers exclusively used for punctuation key processing are cleared, and normal processing of the keystroke continues at block 212. If at block 220 the pState flag is set to a non-zero value, then at block 230 if the current key is one of the ambiguous data keys 56, then the system proceeds to block 232 test whether the system flag Apostrophe_S is set. The Apostrophe_S flag is set TRUE only for languages such as English where it is common to concatenate an apostrophe followed by the letter 's' to the end of a word (to form a possessive or a contraction with the word "is"). If the Apostrophe_S flag is set TRUE, then if at block 234 the pState flag is found to be set to PUNCT_KEY (showing that the previous key activation was the punctuation key) and if at block 236 the current key is found to be the data key associated with the letter 's' (the PQRS key in FIG. 1), then at block 238 the pState flag is set to APOS_S indicating that the punctuation key 63 has been received and that the special case of an apostrophe followed by 's' has been recognized. If either test (block 234 or block 236) fails, then at block 237 the pState flag is set to PUNCT_RCVD indicating that the punctuation key 63 has been received and the punctuation key processing should be performed, but that no special case currently applies (such as recognizing apostrophe followed by 's'). In either case, after pState is set, normal processing of the keystroke continues at block 212.

If at block 230, the current key is determined not to be an ambiguous data key, then at block 250 the system determines whether the current key is the BackSpace key. If so, then at block 252, all punctuation key related flags and buffers are restored to their states prior to the deleted keystroke, after which normal processing of the keystroke (the BackSpace key) continues (via connector C) at block 212. If at block 250 the current key is not the BackSpace key, then at block 260, a test is performed to determine whether the current key is a MODE key, the Select key or the Shift key (i.e. a key that will not result in the current word being "accepted" and output to the text buffer). If so, normal processing of the keystroke continues (via connector C) at block 212. Otherwise, at block 260 the key is determined to be one that will cause the current word to be accepted, and at block 262 the pState flag is cleared and the ClearPunctMode flag is set so that all punctuation key related flags and buffers will be cleared on receipt of the next keystroke at block 202.

If at block 232, it is determined that the Apostrophe_S flag is not set, then at block 270 the system determines whether the Apostrophe_Term flag is set, and at block 272, whether the pState flag is set to PUNCT_APOS indicating that the punctuation key 63 has been received and that the special case has been recognized of a word ending in an apostrophe having been added to the selection list. The Apostrophe_Term flag is set TRUE for languages such as French where it is common to concatenate various words ending in apostrophe (e.g. 1', d', etc.) with a following word without typing a space between the two words. In such languages, it is very convenient to have the system automatically generate an implicit "Select" in order to enable the user to immediately begin typing the following word without having to explicitly activate the Select key. If the tests at both block 270 and 272 are satisfied, the current default or selected word is accepted and output to the text buffer as if the Select key had been activated. Then at block 276, the current keystroke list is cleared, and execution proceeds to block 262, where the pState flag is cleared and the ClearPunctMode flag is set. On the other hand, if at block 270 the system determines that the Apostrophe_Term flag is not set, or at block 272 that the pState flag is not set to PUNCT_APOS, then at block 278 the pState flag is set to PUNCT_RCVD, and normal processing of the keystroke continues (via connector C) at block 212.

Following the normal processing of a keystroke represented by block 212 in FIG. 5A (and shown in detail in FIG. 3), post-processing is performed as shown in FIG. 5B, starting from connector D. At block 300, if the pState flag is not set, no post-processing is required and the subroutine simply returns in a block 320. Blocks 302, 304, and 306 check whether the Apostrophe_Term flag is set, the pState flag is set to PUNCT_KEY, and the current default word ends with an apostrophe. If all three conditions are met, at block 308 the pState flag is set to PUNCT_APOS, otherwise the system proceeds to block 310 without setting a new value for pState. If at block 310 the pState flag is set to PUNCT_APOS or PUNCT_KEY, then at blocks 312, 314, and 316 the text object saved in the curPunctWord buffer is added to the selection list after appending a period, hyphen, and apostrophe, respectively. If the test at block 310 fails, and if at block 330 pState is found to be set to APOS_S, then at block 332 the text object saved in the curPunctWord buffer is added to the selection list after appending an apostrophe and an 's'. Then at blocks 334, 336, 338, and 340 the text object saved in the curPunctWord buffer is added to the selection list after appending a hyphen followed by each of the letters associated with the PQRS key. The pState flag is then set to PUNCT_RCVD in a block 342.

If at block 330 the pState flag is not set to APOS_S, then at block 352 the system checks whether the current selection list is empty. If not, then one or more objects have been found in the database which explicitly match the current key sequence in the keystroke buffer (which includes at least one activation of the punctuation key). In this case, the subroutine simply returns in a block 364 without changing the contents of the keystroke buffer so that the database object can be spelled if that is the user's intention. Otherwise, as soon as there are no more matching objects in the database, at block 356 the text object saved in the curPunctWord buffer is output as accepted text after appending a hyphen to it. At block 358, keystrokes are deleted from the start of the keystroke buffer up to and including the keystroke for the punctuation key. Then at block 360 the database is queried and an updated selection list is generated based on the modified keystroke buffer. Finally at block 362, all buffers and flags for the punctuation key are cleared prior to returning from the subroutine.

2. Maximizing Performance While Minimizing Storage of Vocabulary Modules

Inherent in the combination of the keystroke to object identification software process of subroutine 620, depicted in FIG. 13 operating on the tree data structure 110 depicted in FIG. 10, lie several novel means to retrieve a larger vocabulary of objects while using less storage for the vocabulary module without increasing the processing time of subroutine 620.

By ordering the symbols in each row of the logical symbol index table 550 of a given vocabulary module according to their frequency of use in the input lexicon, a large majority of the instructions 558 of all nodes 400 in the tree data structure 110 can be made to have their LOGICAL-SYMBOL-INDEX fields 555 equal to one. Similarly, by ordering the instructions 558 of all packets like 406 in all nodes 400 so that the stem and word objects are generated in the object list 440 in decreasing order of their use in the language, a large majority of the instructions 558 of all nodes 400 in the tree structure 110 can be made to have their OBJECT-LIST-INDEX fields 556 equal to one. Thus, much of the data in the tree 110 are redundant. Systematically identifying the redundancies and eliminating them by redirecting the paths linking parent nodes to child nodes and deleting child nodes no longer referenced leads to a highly folded or wrapped data structure containing far fewer nodes, far fewer instructions, and far fewer links than the original tree, yet which still retrieves every object retrievable from the original tree. Furthermore, distinct instances of paths through the original tree whose instructions generate similar objects in the object list 440 are merged into common paths in the folded tree which hence forth function as generalized (as opposed to specific) object constructing rules, enabling the reduced structure to generate far more objects than were originally used to define the tree 110 of a given vocabulary module. For example, an unfolded vocabulary tree generated from a list of 30,000 English words might contain over 78,000 instructions in a preferred embodiment. After folding by a preferred embodiment of the folding process, the modified tree might contain fewer than 29,000 instructions, a number less than the number of word objects the structure is capable of retrieving given the ambiguous keystroke sequences and the retrieval process embodied in a preferred manner in the flow chart of FIG. 12. A remarkable and novel result, since each instruction only alters one object in the object list 430 by appending a single symbol in response to a key press. This is a consequence of the folded tree and software retrieval process re-using common sequences of instructions as general object construction rules.

Figure 9:
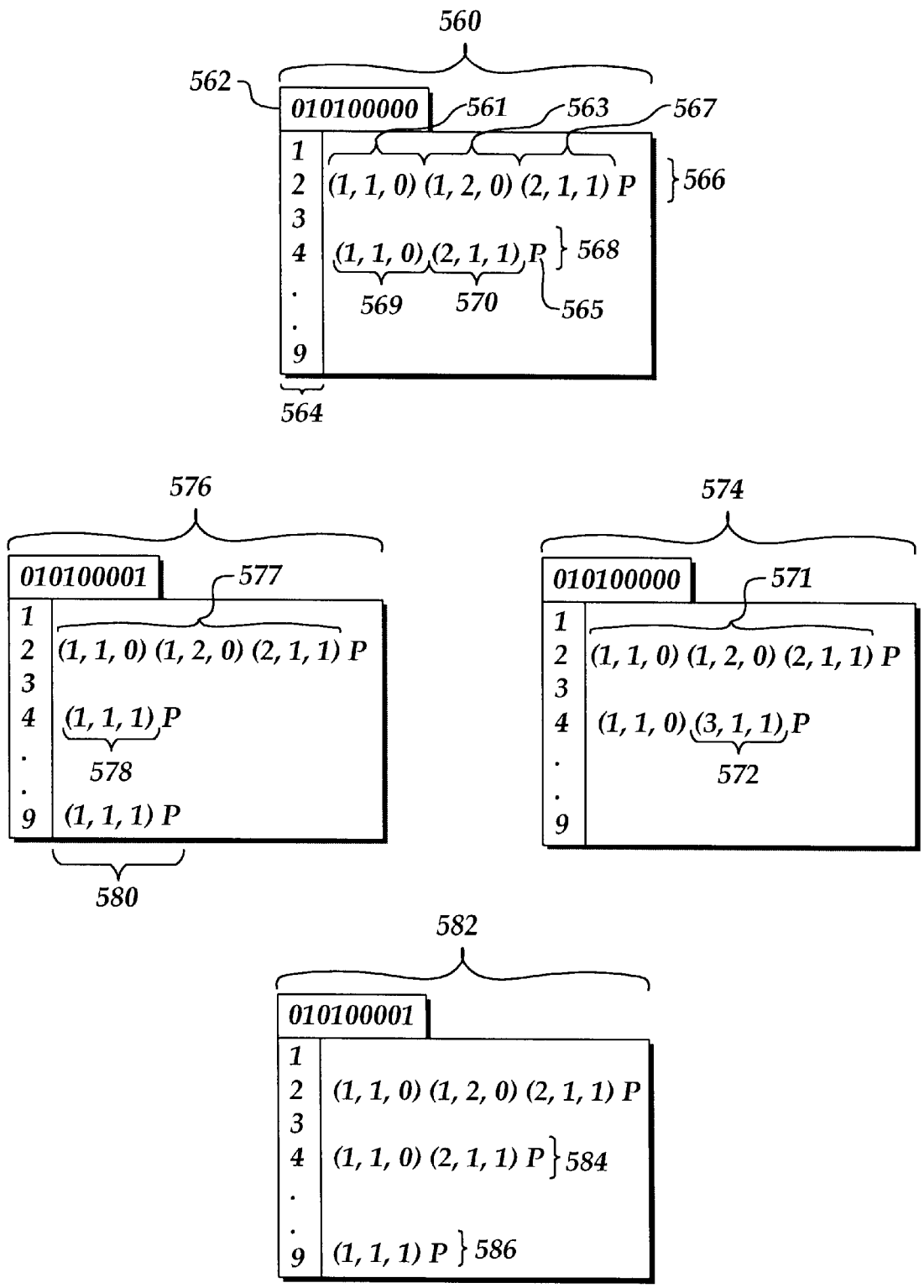
FIG. 9 depicts four examples of possible internal data items in the structure of nodes in a preferred embodiment.

The nodes depicted in FIG. 9 are examples. Node 560 has two valid keys as indicated by the "1"s in its valid keys field 562 "010100000". In a preferred embodiment the positions of the "1"s indicate that the $2^{nd}$ and $4^{th}$ keys are valid paths and have packets of instructions and pointers to child nodes associated with them 566 and 568. Packet 566 contains three instructions "(1,1,0)", "(1,2,0)", and "(2,1,1)" followed by a pointer "P" linking 560 to a child node. If subroutine 600 has processed a list of key strokes leading to node 560, then subroutine 620 were called to process a "2" key, which is the ABC key in a preferred embodiment, the following would happen. Instruction 561 would append the $1^{st}$ logical symbol of key ABC (an "a") to the old object at index 1 to build the new object at index 1. The third field of 561, "0", is the false value of the STOP-FLAG 557, indicating that this is not the last instruction of the current packet, so the next instruction 563 is interpreted. Instruction 563 would append the $1^{st}$ logical symbol of key ABC (an "a") to the old object at index 2 to build the new object at index 2. The index of the new object will be 2 because the indices of the new objects being built are implicit in the order of the instructions themselves, e.g. the $2^{nd}$ instruction always builds the $2^{nd}$ object. The third field of instruction 563, "0", is the false value of the STOP-FLAG 557, so the next instruction 567 is interpreted. Instruction 567 would append the $2^{nd}$ logical symbol of key ABC (a "c") to the old object at index I to build the new object at index 3. The third field of instruction 567, "1", is the true value of the STOP-FLAG 557, indicating that this is the last instruction of the current packet, so execution of subroutine 620 would pass from block 638 to block 644.

It is possible to combine two or more nodes containing different instruction packets 408 into a single node which can serve the same purpose as the multiple nodes separately, which means that certain nodes in a vocabulary tree 110 are redundant in a novel sense. For the purpose of this invention the word "redundant" is used with respect to two nodes in the sense that one node can be dispensed with by the operations of the software processes which are depicted in a preferred embodiment in FIGS. 14–17.

Figure 14:
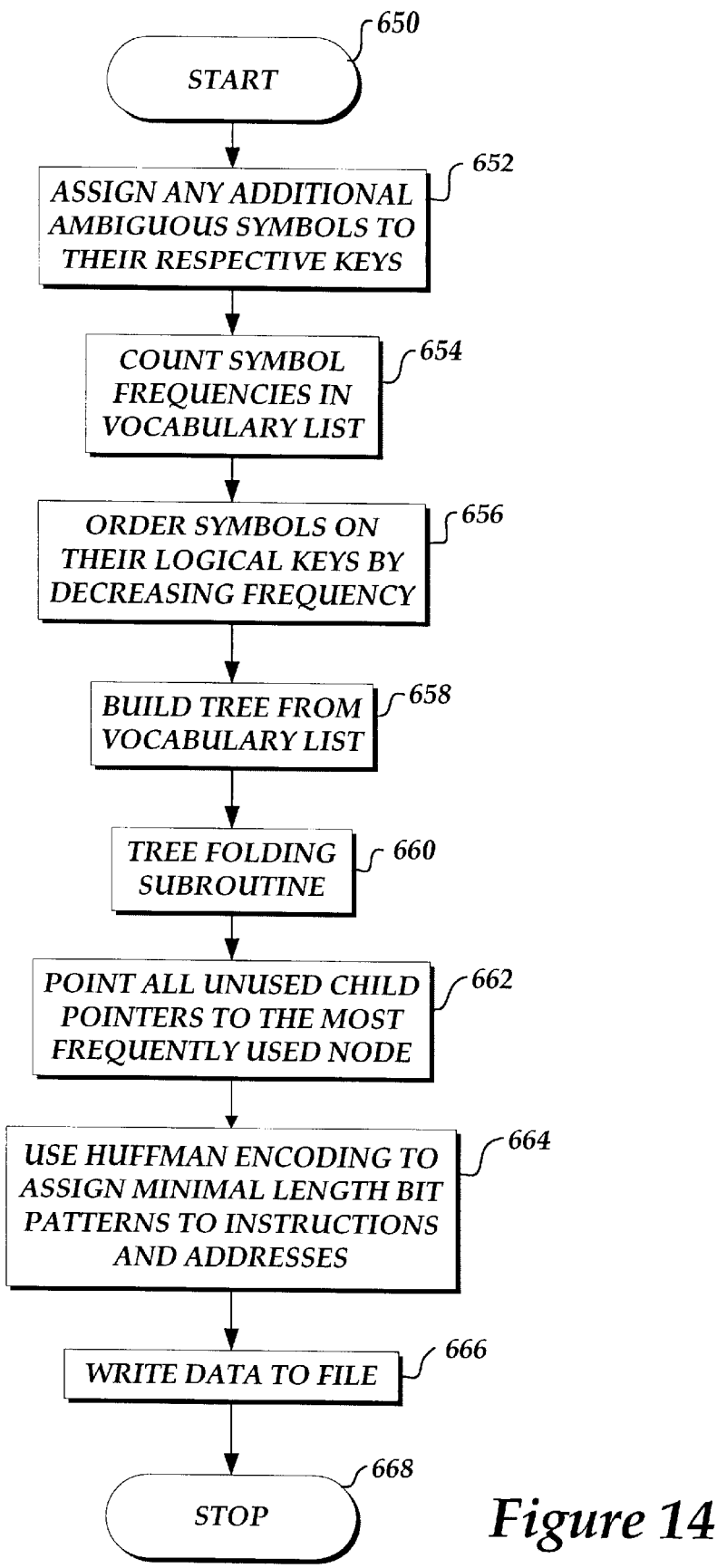
FIG. 14 is a flowchart of a preferred embodiment of a software process for building a folded, compressed vocabulary module.

For example, compare node 560 to node 574 in FIG. 9. The instruction packets 566 and 571 on key 2 agree exactly, but instruction 570 on key 4 of node 560 conflicts with instruction 572 on key 4 of node 574, so neither can do the work of the other, nor can the two nodes be combined into one which would do the work of both. Compare node 560 to node 576. The instruction packets 566 and 577 associated with key 2 on each node agree exactly. Instructions 569 and 578 are different in the settings of their STOP-FLAG fields 557, but that difference does not cause them to conflict. The essential result of the object retrieval process of subroutine 620 in FIG. 14 is the new object list created by executing the set of instructions at a node for a given key. Additional objects can be appended to the end of an object list without detriment to the correct processing of any of that node's children. Thus, no errors would be caused in the processing of the children of node 576 by the execution of an additional instruction after 578. The essence of the process would be disturbed only if the wrong instruction were to execute or if too few instructions were to execute. Similarly, the presence of a valid key on key 9 of node 576 does not conflict with the absence of a valid 9 key in node 560. Therefore, nodes 560 and 576 are redundant and can be merged into a new node 582 which achieves the net effect of both, and functions correctly as a parent node of the children of both. It will be appreciated that the pointers also play a role in defining redundancy. At the last keystroke of sequences in the tree associated with words which do not continue to form the stems of longer words, the pointers in the valid key packets 408 have a special value, NULL, in a preferred embodiment to indicate that there are no further children. Such nodes are called "terminal nodes." For two nodes with child nodes on valid keys in common to both nodes, the respective child nodes must be redundant for their parent nodes to be redundant, and so on to the nodes descending from the children, until terminal nodes are reached, or until there are no more descendants on valid keys sequences common to the nodes being compared.

FIGS. 14 to 17 depict flow charts of preferred embodiments of software processes for the compression and folding of vocabulary module trees similar to tree 110 shown in FIG. 10. FIG. 14 is a flowchart of preferred embodiment of a software process to build a compressed vocabulary module. In block 652 a lexicon is scanned to identify any necessary additional ambiguous symbols other than those appearing on the physical keys, such as in FIG. 6 for a French vocabulary module. In blocks 654–656 the symbols are assigned their logical indices on their respective keys in decreasing order of their frequency of use in the input lexicon, as in the example of FIG. 7. Given a lexicon of objects with frequencies, it will be obvious to someone skilled in the art how block 658 builds a vocabulary tree of the form 110. In block 660, redundant nodes are identified and merged together to minimize duplication of data and, hence, turn isolated instruction sequences associated with single objects into generalized rules for retrieving multiple objects. This process is shown in detail in FIG. 15. Block 662 identifies all the remaining NULL pointers from terminal nodes and changes them to point to the node with the largest number of parents, thus increasing the number of rules in the module. It will be appreciated that other rules could apply to assigning child nodes to the NULL pointers, and that such rules could be applied dynamically at the time of object retrieval, based on factors related to the key strokes being processed. In block 664, the remaining instances of each unique instruction 558 and pointer 404a are counted so that they may be encoded as unique patterns of bits with shorter bit patterns being assigned to higher frequency instructions and addresses to conserve space. In a preferred embodiment of the present invention, Huffman coding is used to assign minimal length bit patterns to instructions and addresses. It will be appreciated that Huffman coding techniques are well-known in the art, and thus, need not be discussed in more detail herein. Furthermore, nodes which are child nodes of multiple parent nodes may be stored in special orderings to facilitate their rapid retrieval and minimize the number of bits required to address them. Finally, the data generated as described above is written to a file in block 666.

In choosing instructions 558 to describe objects to be stored while building the tree at block 658, it will be appreciated that when objects are words or stems of words, their character sequences contain additional data which may be used advantageously to increase the redundancy of the nodes in tree 110. For example, not all pairs of letters in the English language are equally common, e.g. "s" is commonly paired with "t". The statistics of letter pairs, or bigrams, can be used to predict the most likely next letter in an object from the preceding letter. With such predictions the logical ordering of the ambiguous symbols in the logical symbol index table 550 can be dynamically altered to further optimize the use of the first position. The predictions can be extended to letter triplets, trigrams, and generally to n-grams.

Figure 15:
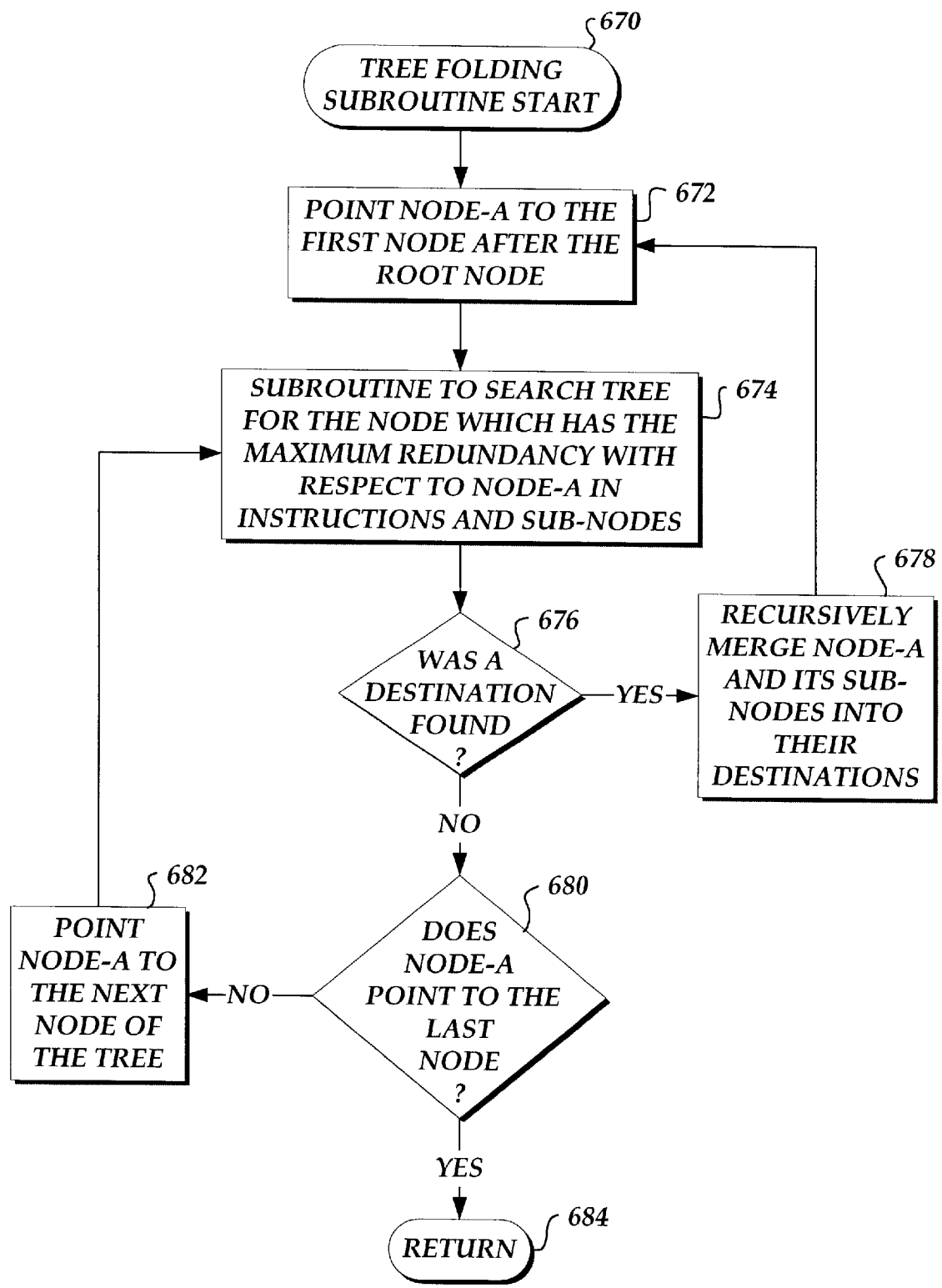
FIG. 15 is a flowchart of a preferred embodiment of a software process for folding the tree data structure of a vocabulary module.

FIG. 15 is a flowchart of a preferred embodiment of a software process to fold the tree 110 of a vocabulary module. Block 670 is entered from block 660 of the flowchart of FIG. 14. Block 672 initializes the process to begin with the first node of tree 110 of FIG. 10 after the root node 111. Block 674 calls subroutine 690 depicted in a preferred embodiment in the flowchart of FIG. 16 to locate a node, if any, which is maximally redundant with the current node. If a destination node is found, decision block 676 directs the process to block 678 where the redundant node(s) are merged together, eliminating duplicate data from the tree subsuming multiple, individual instances of instructions into shared sequences, which are general rules for associating keystroke sequences to objects. If decision block 676 fails, then decision block 680 tests whether the process is done. If there are more nodes to process, the flow advances to block 682 to identify another node.

Figure 16:
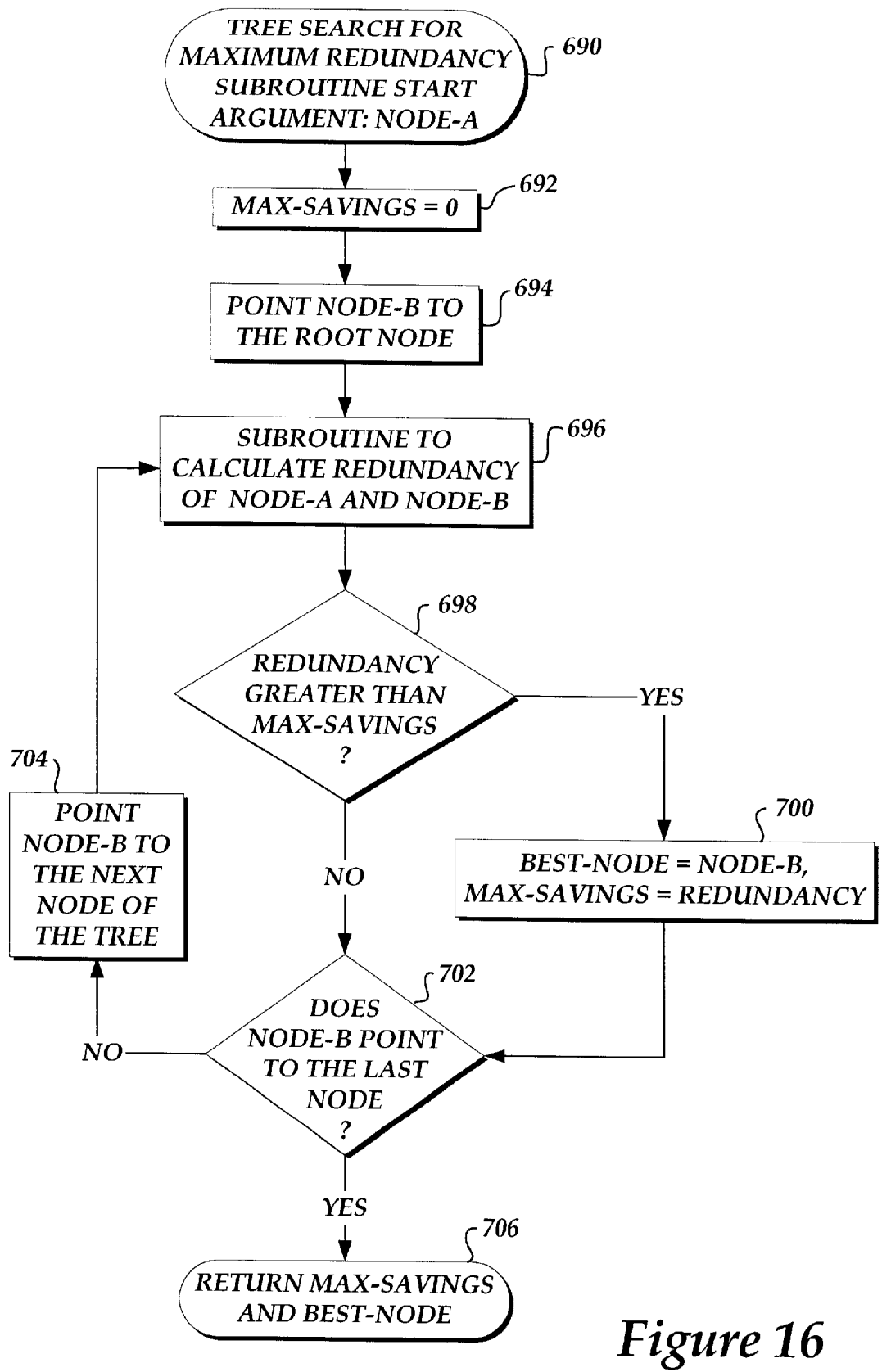
FIG. 16 is a flowchart of a preferred embodiment of a software process for locating a second node in a the tree of a vocabulary module which has the greatest redundancy in comparison to a given node.

FIG. 16 is a flowchart of a preferred embodiment of a software process to find in a tree 110 a node with the highest degree of redundancy with respect to a given node. Block 690 is entered from block 674 of the flowchart of FIG. 15. Block 692 initializes a placeholder MAX-SAVINGS for the measured redundancy Block 694 initializes the process to start at the root node 111 of tree 110 of FIG. 10. Block 696 calls subroutine 710 depicted in a flow chart of a preferred embodiment in FIG. 17 to compute the redundancy of the given node with respect to the current node. Decision block 698 tests whether a degree of redundancy greater than MAX-SAVINGS was reported. If so, block 700 records the identity BEST-NODE of the node provisionally found to be most redundant with respect to the given node and the reported measure of redundancy as MAX-SAVINGS. Decision block 702 tests whether all nodes have been evaluated. If not, flow continues to block 704, which advances from the current node to the next node. From block 704, flow returns to block 696. If the result of the test at decision block 702 is that the last node has been evaluated, then block 706 returns the identity of the node most redundant, if at all, to the given node to block 674 of subroutine 670 of FIG. 15.

Figure 17A:
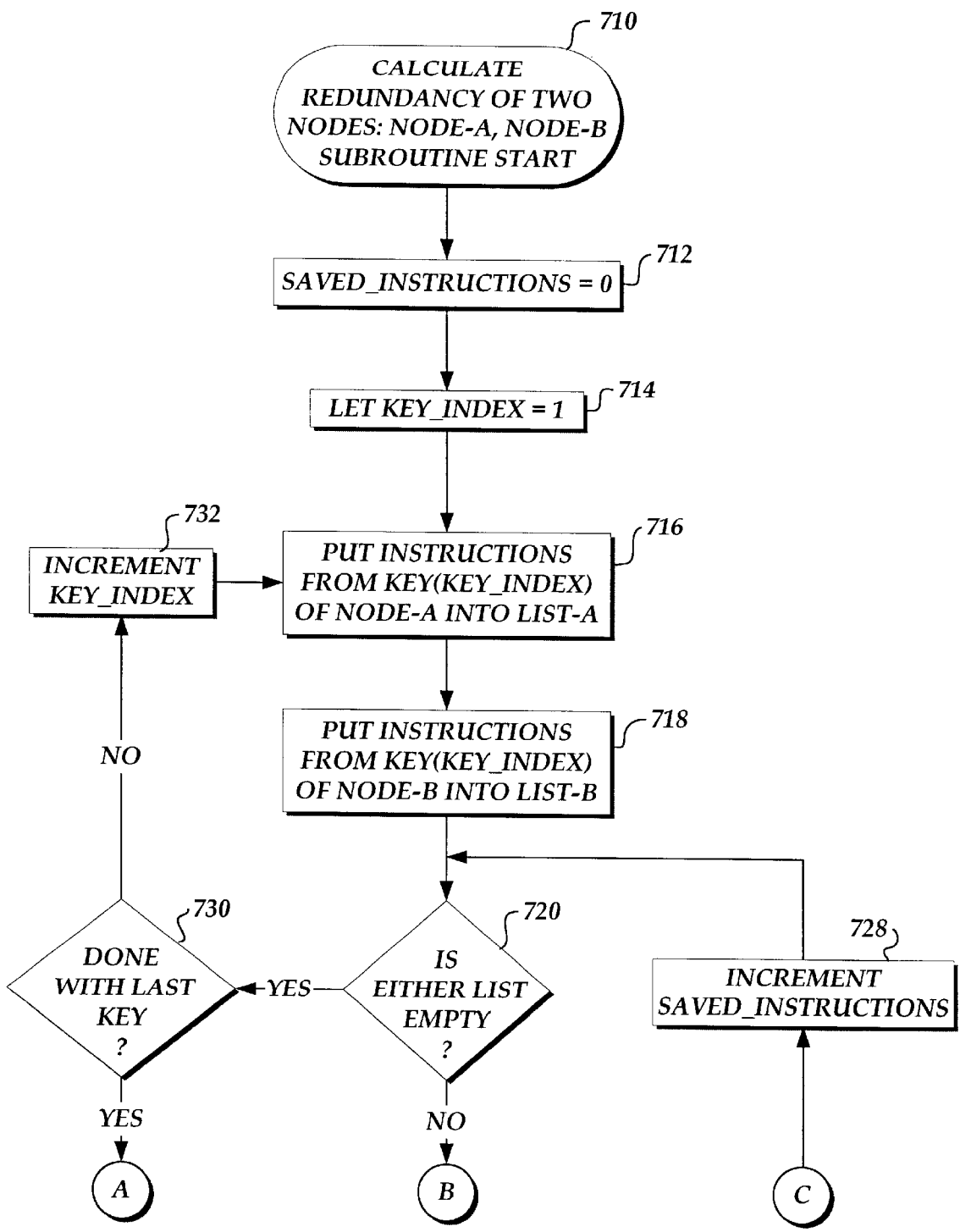
FIGS. 17A and 17B collectively depict the flowchart of a preferred embodiment of a software process for computing the redundancy between two nodes of a tree in a vocabulary module.
Figure 17B:
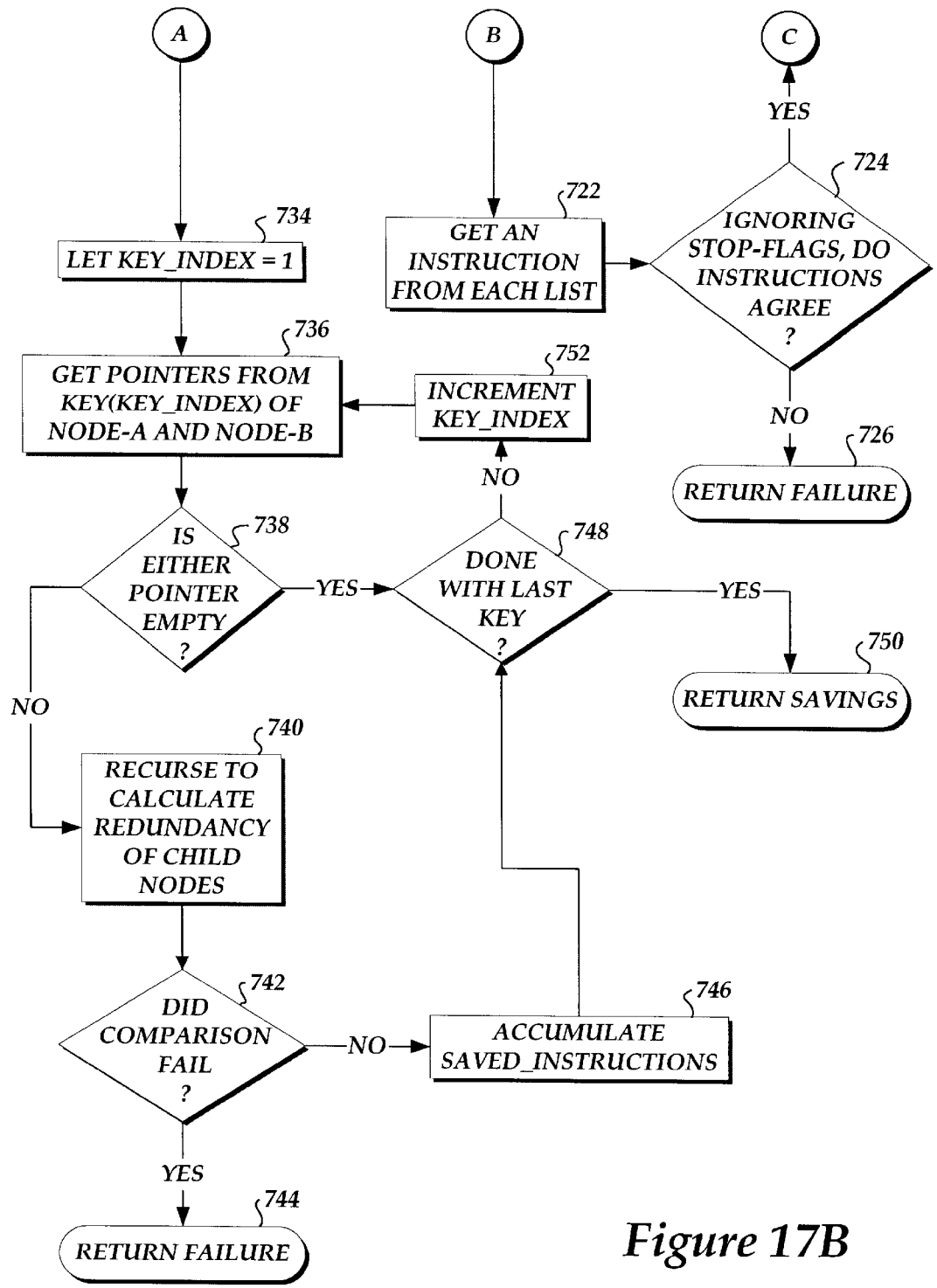

FIG. 17 is a flowchart of a preferred embodiment of a software process to compute the numerical redundancy between two specified nodes. Block 710 is entered from block 696 of the flowchart of subroutine 690 of FIG. 16. Block 712 initializes a count of duplicate instructions. Block 714 initializes KEY-INDEX to 1. Block 716 reads the instruction packets 406 associated with key KEY-INDEX from the first of two nodes 400 specified as parameters to the subroutine and puts them in a temporary list, LIST-A. If key KEY-INDEX is not a valid key, no instructions are read. Block 718 reads the instruction packets 406 associated with key KEY-INDEX from the second of two nodes 400 specified as parameters to the subroutine and puts them in a temporary list, LIST-B. If key KEY-INDEX is not a valid key, no instructions are read. Decision block 720 determines whether either LIST-A or LIST-B is empty. If not, block 722 fetches one instruction from both LIST-A and LIST-B, reducing the number of instructions remaining in each by one. Decision block 724 test, whether the instructions are the same in their LOGICAL-SYMBOL-INDEX and OBJECT-LIST-INDEX fields. If not, a failure code for no redundancy is returned in a block 726 to block 696 of subroutine 690. If the decision of block 724 is yes, then block 728 increments the count SAVED-INSTRUCTIONS. Control passes again to block 720. If the decision block 720 tests TRUE, control passes to decision block 730, which tests whether the two nodes have been compared with respect to all possible keys. If not, block 732 increments KEY-INDEX, and control passes to block 716. If the decision at block 730 is positive, control passes to block 734 to reset KEY-INDEX to 1. Block 736 examines the pointers associated with key KEY-INDEX of the two nodes. Decision block 738 tests whether either pointer is empty (NULL), which would be the case for a pointer in a terminal node or for any key which is not valid. If neither pointer is empty, control passes to block 740, which uses subroutine 710 recursively to test whether the child nodes pointed to by the two non-empty pointers are redundant. The result of block 740 is tested at decision block 742. If the two child nodes were found not to be redundant, a failure code is returned in a block 744. Otherwise, the two children are found to be redundant with a certain numerical score which is accumulated by block 746. Decision block 748 tests whether the pointers associated with the last key (key 9 in the preferred embodiment) have been tested. If not, block 752 increments KEY-INDEX and passes control to block 736. If the test at block 748 determines that all pointers have been checked, then the accumulated numerical measure of redundancy of the two nodes originally identified when the subroutine was entered at block 710 is returned.

It will be appreciated that the calculation of numerical values of redundancy may be weighted to take into account additional factors such as the number of branches present at each node and the number of parents which point to a node as a child. It will be appreciated that if two nodes are not redundant because of the ordering of instructions associated with a certain key, the order of instructions associated with low frequency words in the input lexicon could be reordered without impacting the priority of instructions associated with higher frequency objects, thus increasing the redundancy of the tree.

III. Representative System Operation

Figure 18A:
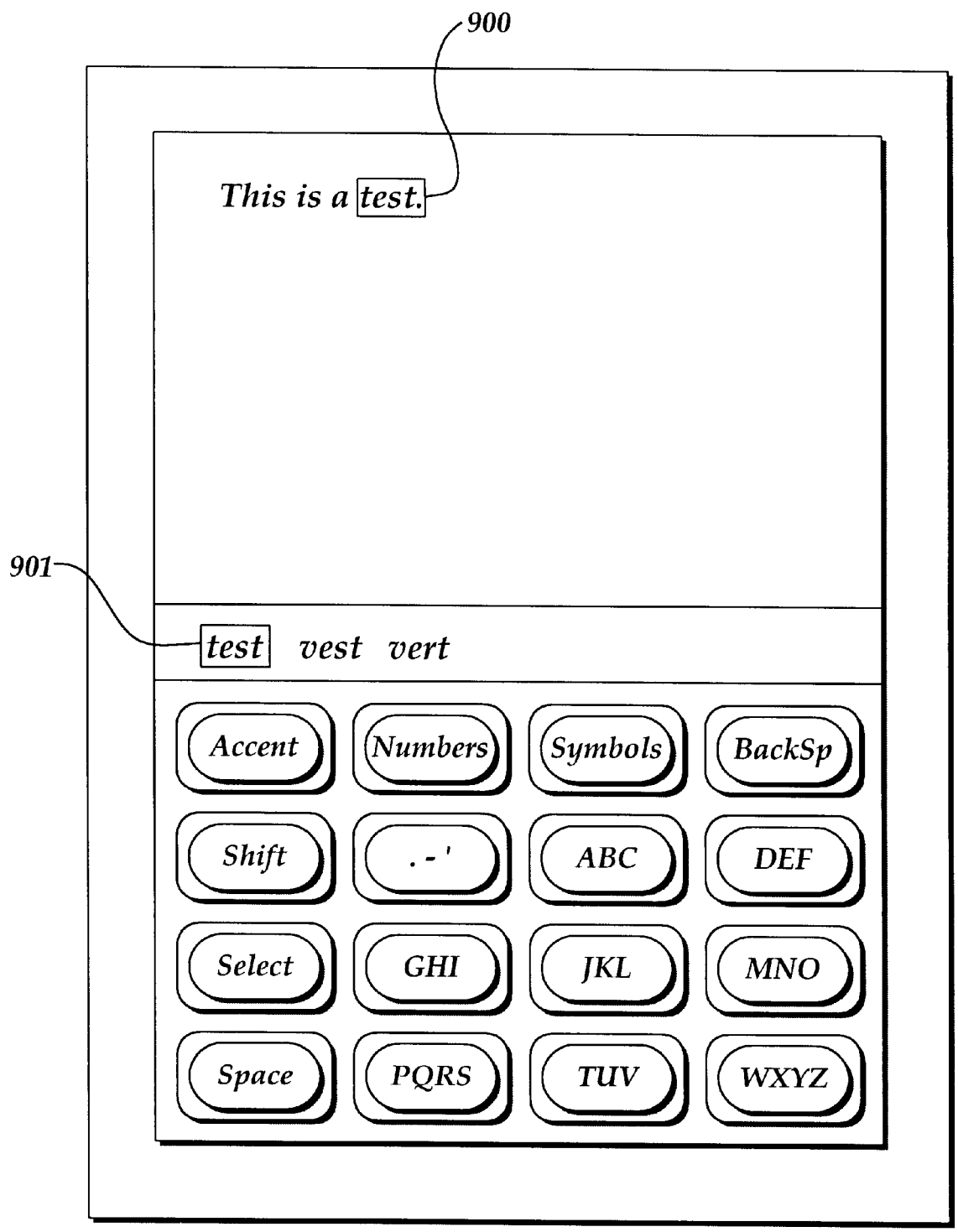
FIGS. 18A–18K are schematic views of the preferred embodiment of the reduced keyboard disambiguating system during representative use.

FIGS. 18A through 18K depict the display 53 of the portable computer 52 during representative use of the reduced keyboard disambiguating system. After turning on the power of the portable computer, the text region 66 and selection list region 70 are empty. In FIG. 18A, the user has typed the phrase "This is a test". The vocabulary module has identified the most likely interpretation of the sequence of the last four keystrokes TUV, DEF, PQRS, TUV as the word "test" and has provisionally posted this interpretation at the insertion point 900 and also placed this word first in the selection list as the default interpretation 901. This first entry in the selection list has been drawn with a solid-line box around it (indicating that it is the implicitly selected object), and it has also been provisionally posted in the text region at insertion point 900 with a solid-line box drawn around it. The vocabulary module has also identified the word interpretation "vest" and the stem interpretation "vert", and placed these interpretations in the selection list. The punctuation key processing software shown in FIG. 5A and 5B has saved the text object "test" in its curPunctWord buffer.

Figure 18B:
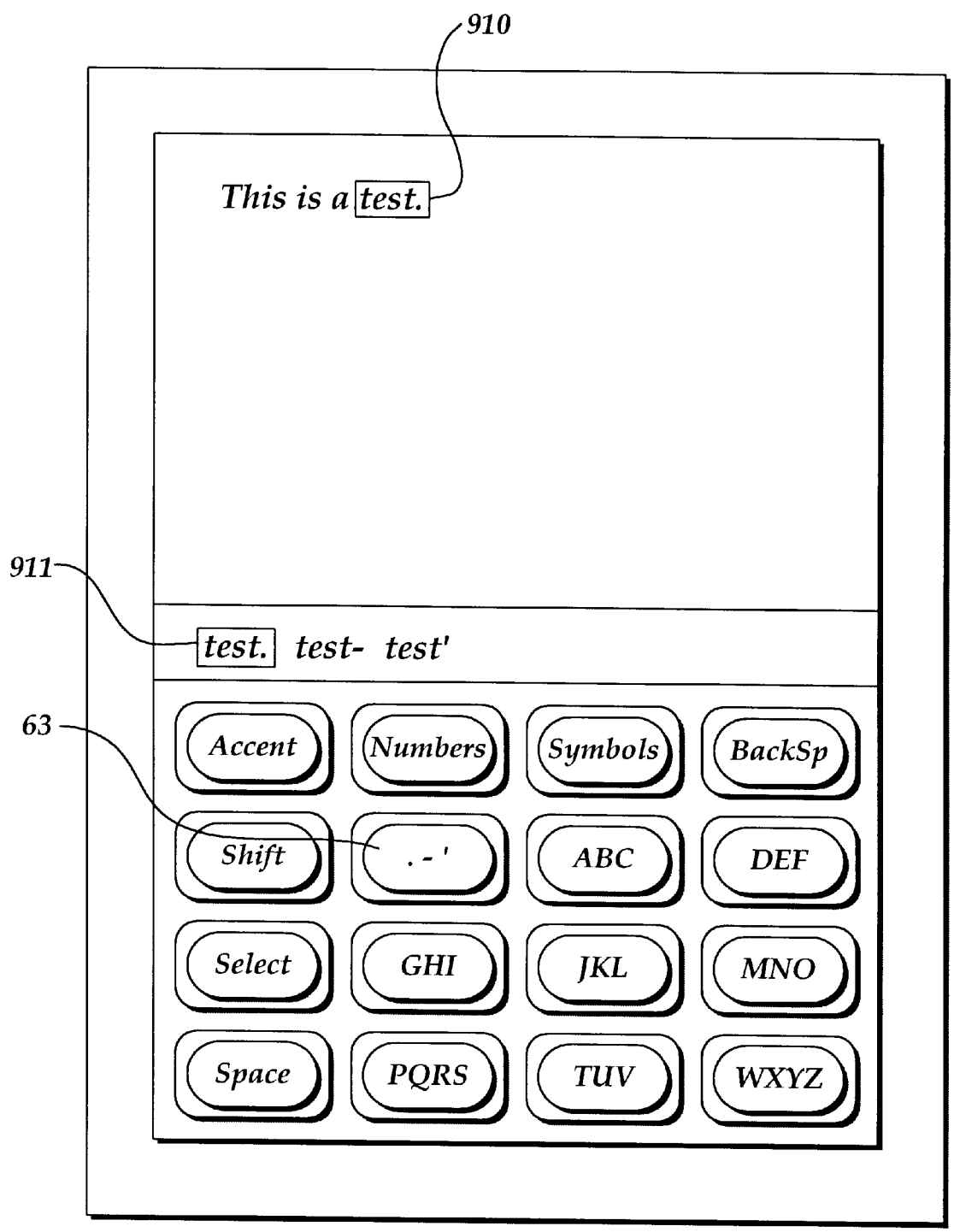

In FIG. 18B, the user has subsequently pressed the . -' punctuation key 63. No object in the database matches the keystroke sequence of the four keys TUV, DEF, PQRS, TUV followed by the punctuation key 63. Thus, the only text objects appearing in the selection list are those added by the punctuation key processing software, consisting of the curPunctWord "test" with an appended period 911, hyphen 913, and apostrophe 914. The resulting default selection list object is "test." 911, which is also provisionally posted in the text region at insertion point 910.

Figure 18C:
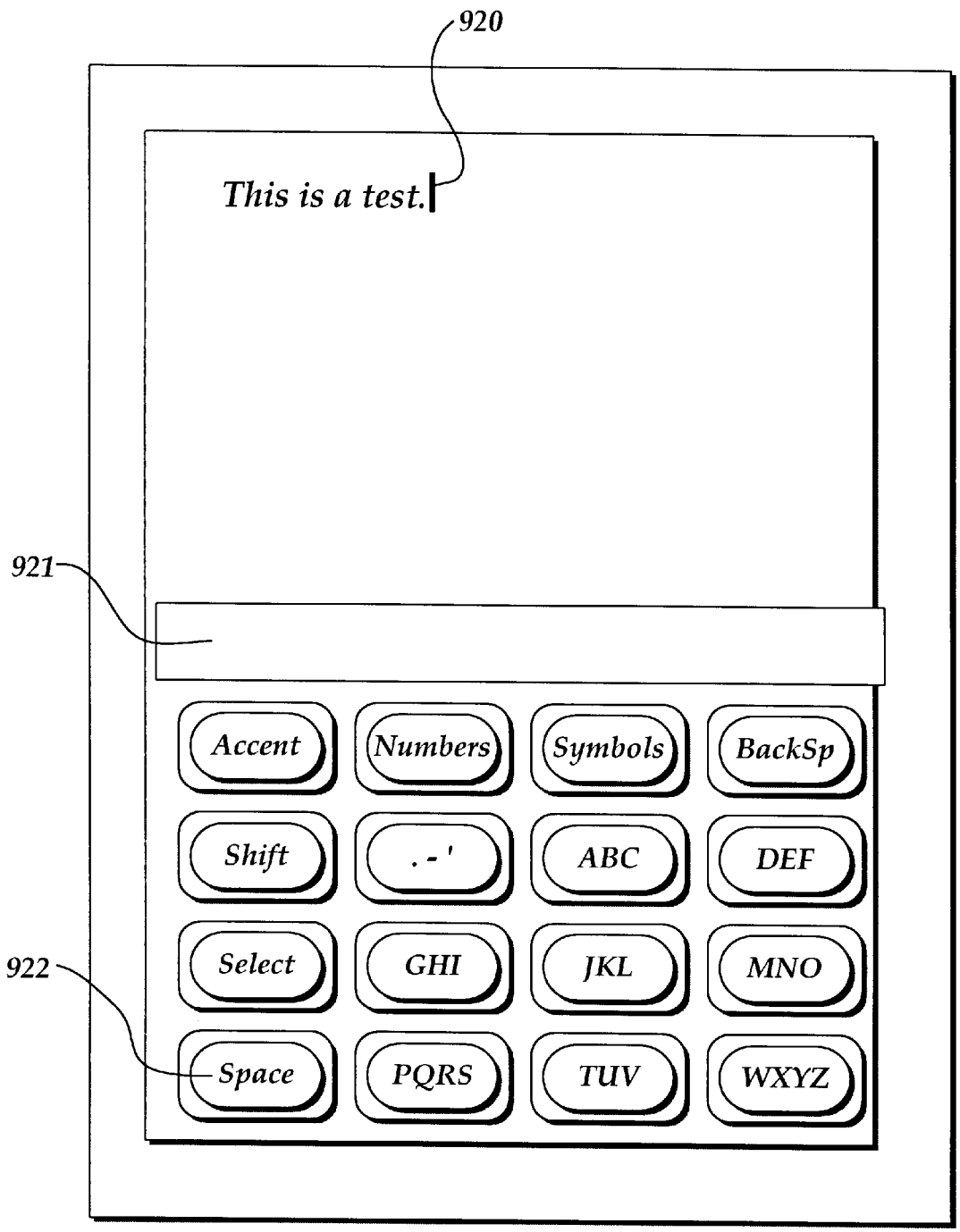

In FIG. 18C, the user has subsequently pressed the Space key 922. This has generated an explicit space character, which has terminated the current keystroke sequence, and caused the system to accept the provisionally posted text "test." A following space has also been output, after which the system cursor 920 appears. The keystroke buffer is now empty, and thus the current selection list 921 is also empty. This exemplifies one of the default behaviors of the punctuation key 63—when activated prior to an activation of the Space (or Select) key, in the absence of a match with an object in the database containing a corresponding punctuation character, the previous default text object is output with an appended period.

Figure 18D:
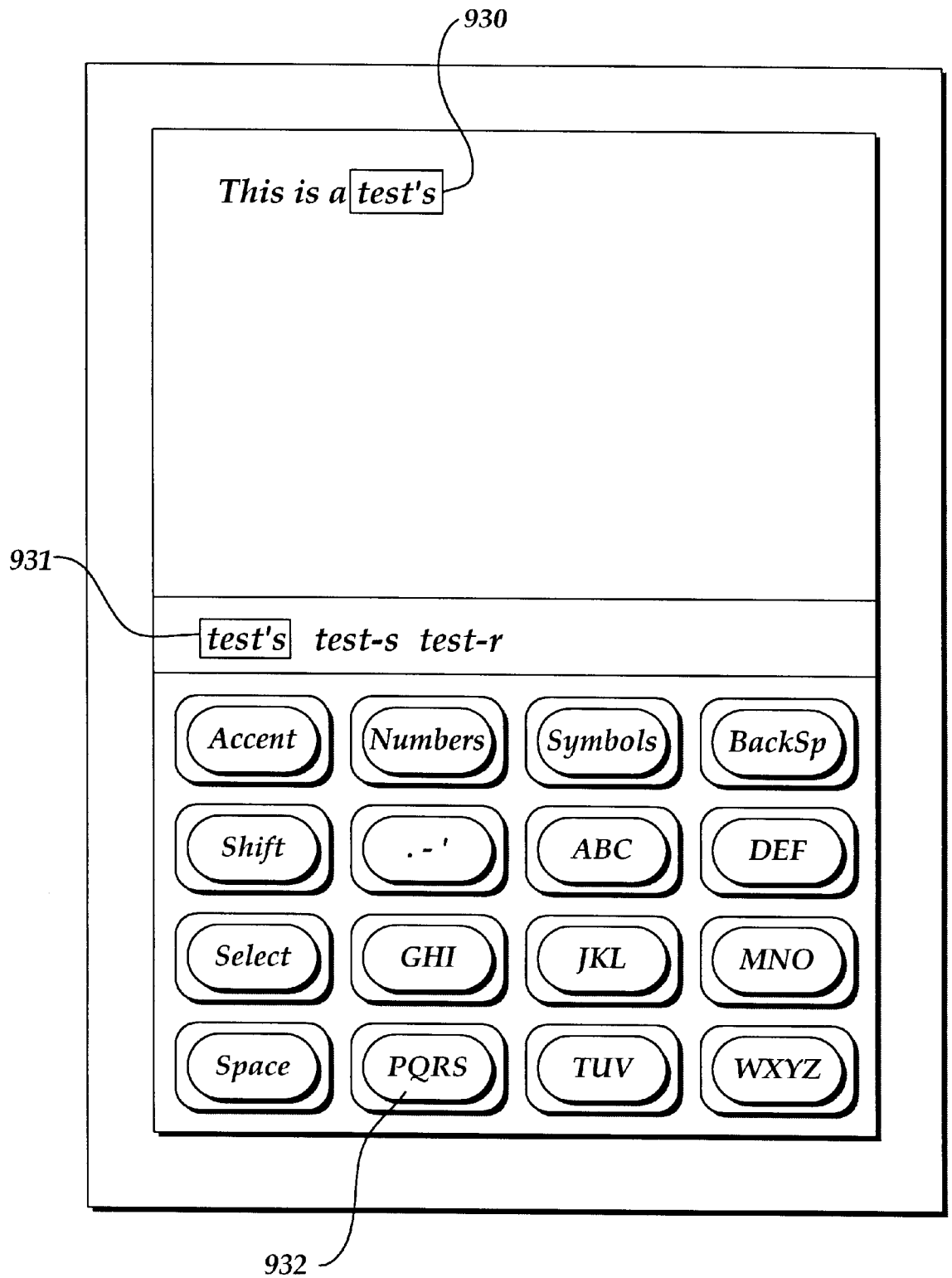

In the case of a system designed for the English language (in which the flag Apostrophe_S is set TRUE), FIG. 18D shows the result that follows FIG. 18B when the user presses the PQRS key 932. This triggers the processing shown in blocks 332 through 342 of FIG. 5B, and results in the punctuation key processing software adding the objects "test's", "test-s", "test-r", "test-p" and "test-q" to the selection list in that order. Thus, the resulting default selection list object is "test's" 931, which is also provisionally posted in the text region at insertion point 930.

Figure 18E:
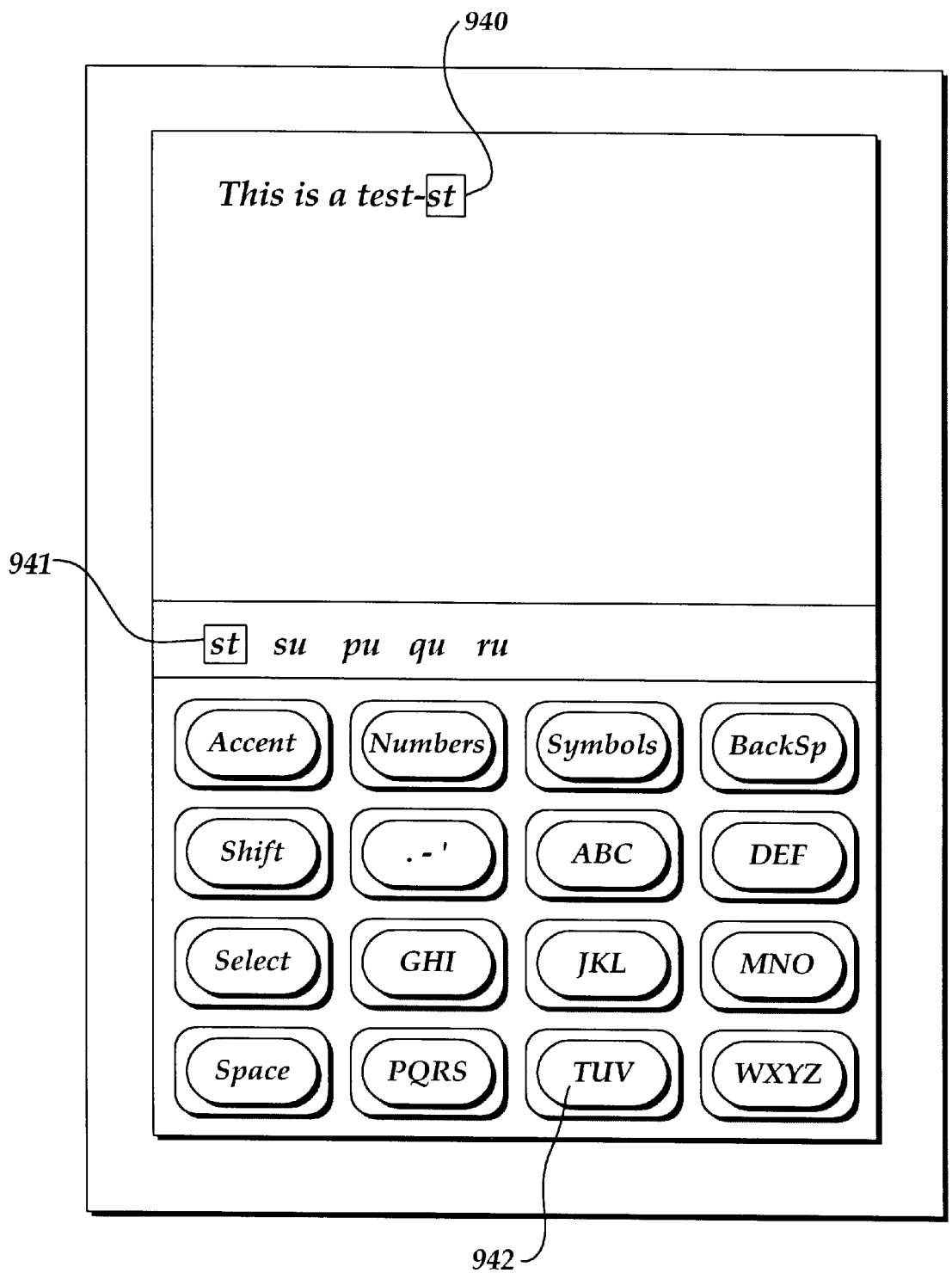

FIG. 18E shows the result that follows FIG. 18D when the user presses the TUV key 932 (with the idea of typing the hyphenated word "test-run". This triggers the processing shown in blocks 332 through 340 of FIG. 5B, and results in the punctuation key processing software causing the text object "test-" to be output as accepted text, and the keystroke buffer to be modified to contain only the last two keystrokes PQRS and TUV. Querying the database (at block 360 in FIG. 5B) based on these two keystrokes results in the selection list shown in FIG. 18E. The text object "st" is the most frequent and thus appears as the default selection list object "st" 941, and is also provisionally posted in the text region at insertion point 940.

Figure 18F:
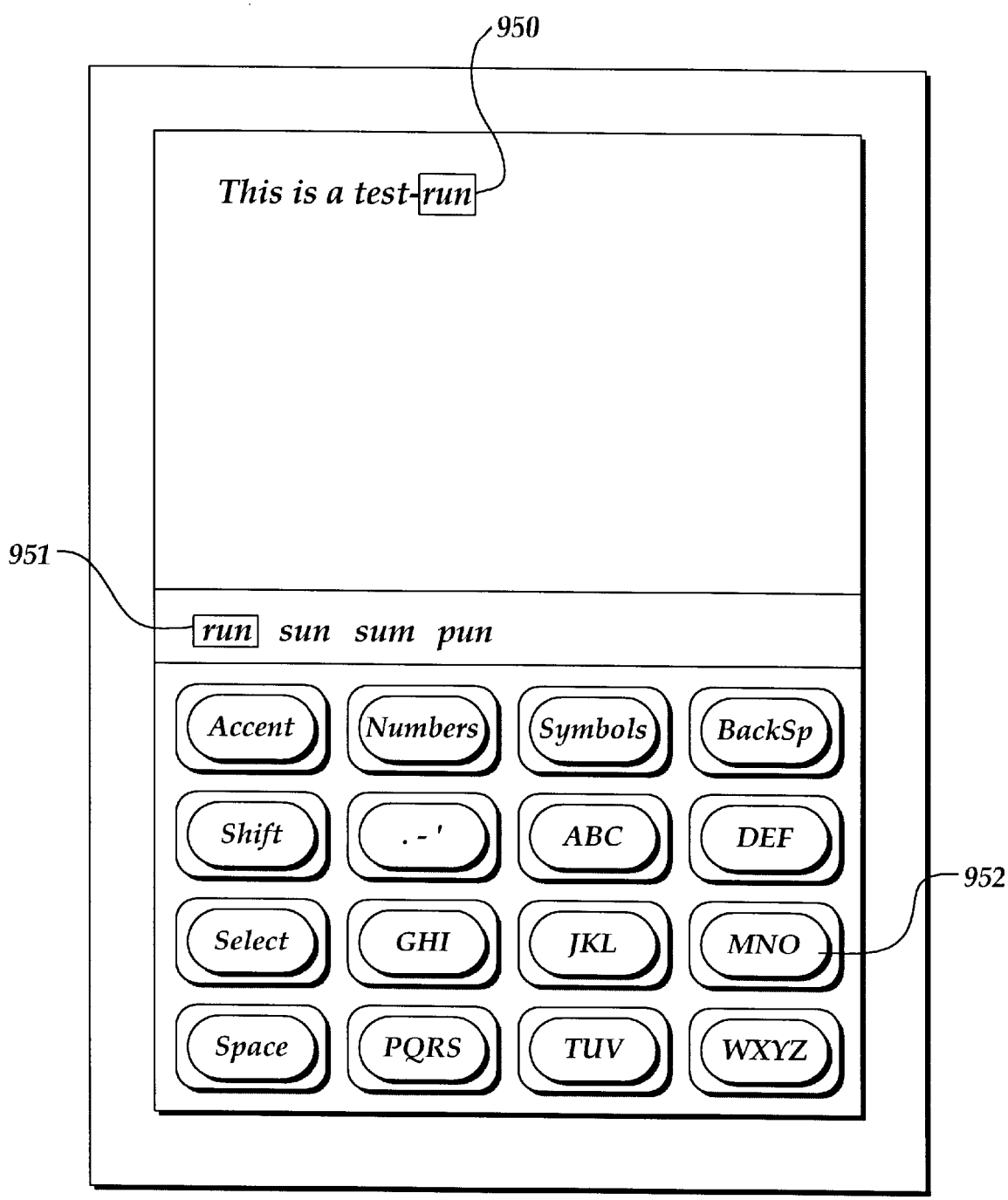

FIG. 18F shows the result that follows FIG. 18E when the user presses the MNO key 952 to finish typing the hyphenated word "test-run". No special punctuation key processing occurs since all flags were cleared at block 362 of FIG. 5B in processing the previous keystroke. Thus the system simply processes the current key sequence PQRS, TUV, MNO. Querying the database based on these three keystrokes results in the selection list shown in FIG. 18F. The text object "run" is the most frequent and thus appears as the default selection list object "run" 951, and is also provisionally posted in the text region at insertion point 950.

Figure 18G:
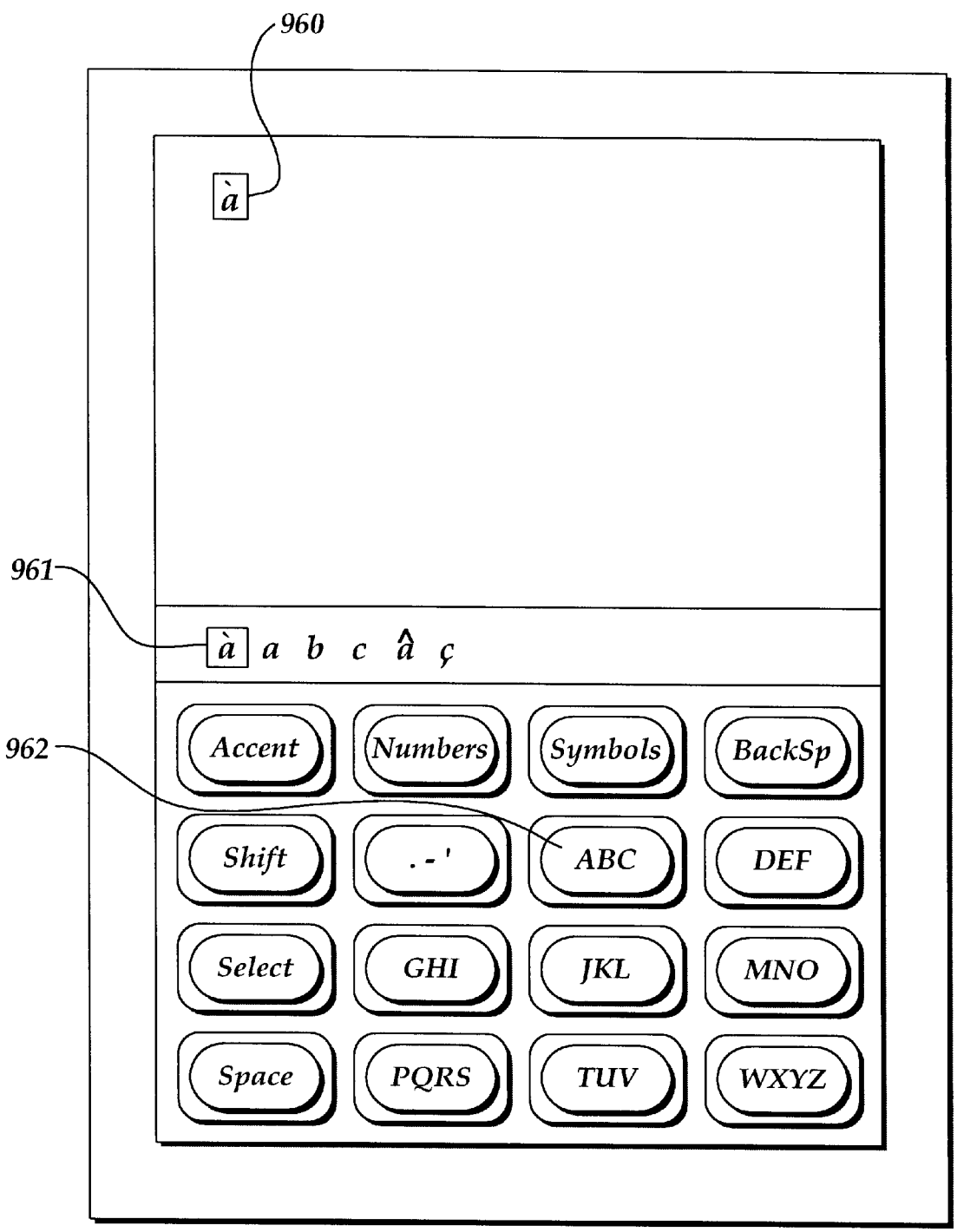

FIGS. 18G through 18K show an example for a system designed for the French language (in which the flag Apostrophe_Term is set TRUE). In this example, the user types the text object "c'est" which actually consists of the word "c'" concatenated with the word "est". FIG. 18G shows the result when the user presses the ABC key 962. The selection list shows the single character objects associated with the ABC key for the French language, including the accented characters à, â, and ç. No special punctuation key processing occurs since all punctuation key related flags have been previously cleared. The system simply processes the current single-key sequence ABC. Querying the database based on these this keystroke results in the selection list shown in FIG. 18G. The text object "à" is the most frequent and appears as the default selection list object "à" 961, and is also provisionally posted in the text region at insertion point 960.

Figure 18H:
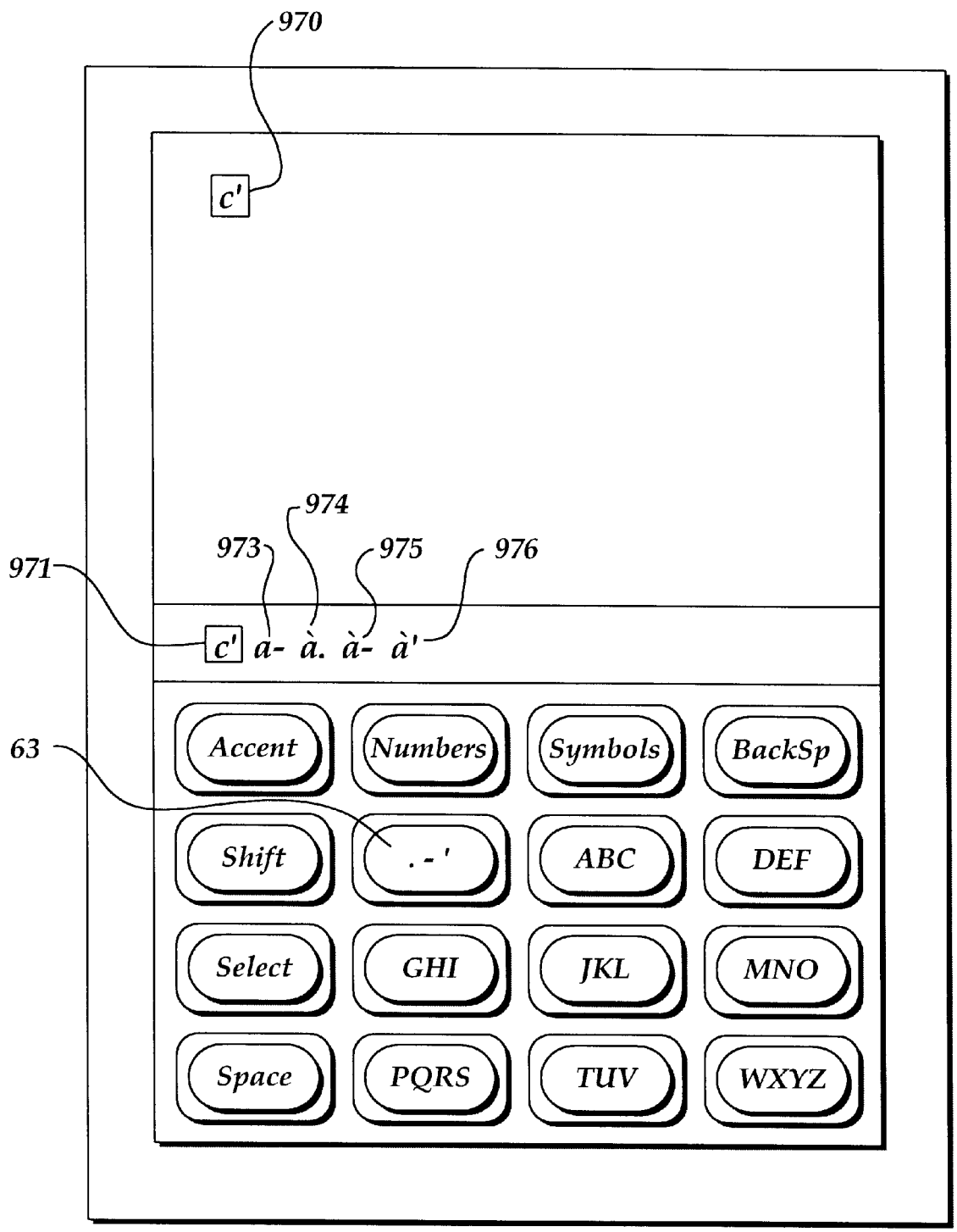

In FIG. 18H, the user has subsequently pressed the .-' punctuation key 63. The objects "c'" and "a-" are stored in the database, and are added to the selection list at blocks 156 through 160 in FIG. 3 after querying the database, so that the resulting default selection list object is "c'" 971. Consequently, each of the tests at blocks 300 through 306 in FIG. 5B succeed, and the pState flag is set to PUNCT_APOS in block 308. Following the objects "c'" 971 and "a-" 973 in the selection list, the punctuation key processing software (at blocks 312, 314, and 316 in FIG. 5B) adds the objects "à.", "à-", and "à'" consisting of the curPunctWord "à" with an appended period 974, hyphen 975, and apostrophe 976. The resulting default selection list object is "c'" 971, which is also provisionally posted in the text region at insertion point 970.

Figure 18I:
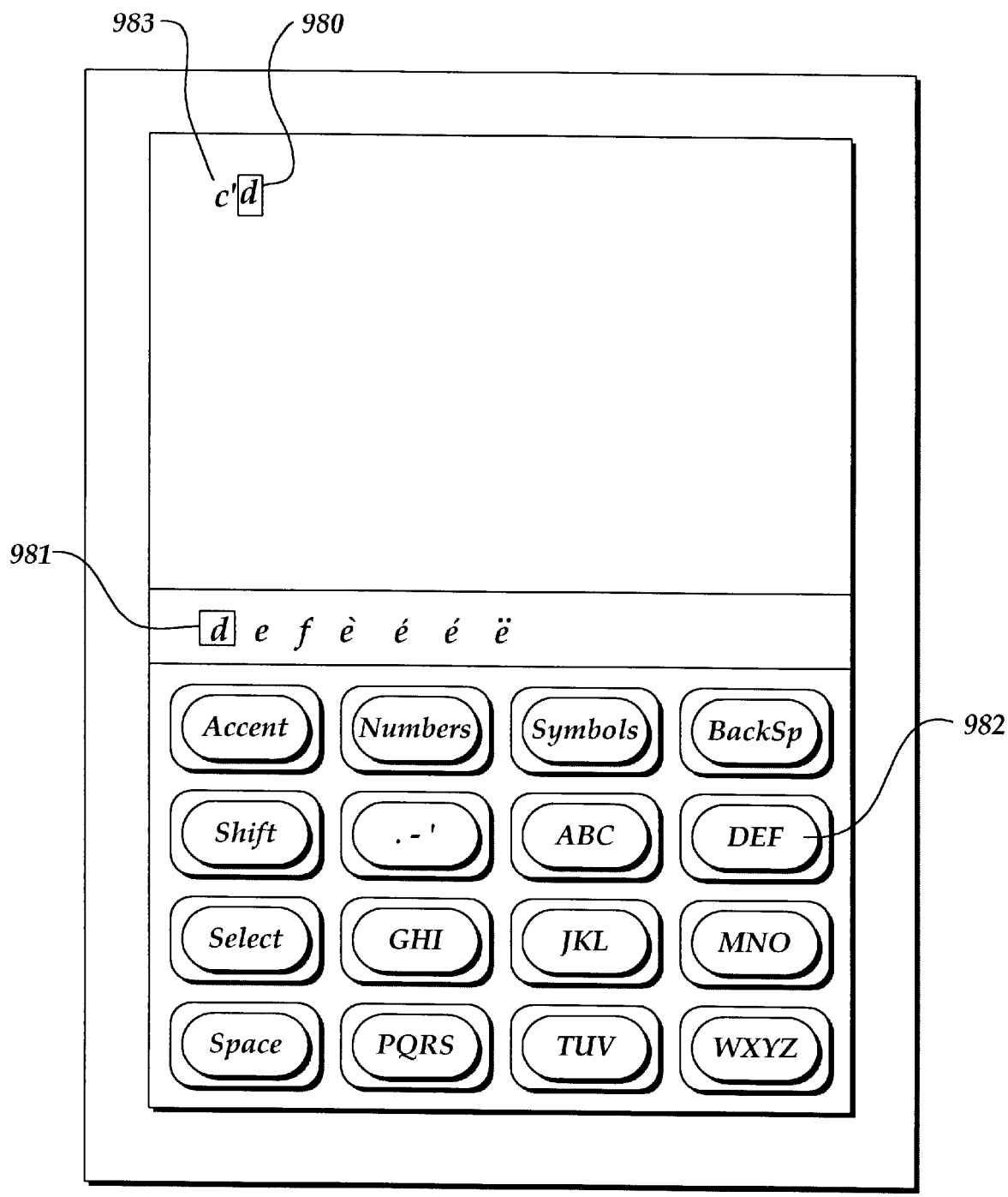

In FIG. 18I, the user has subsequently pressed the DEF key 982. Since the pState flag was set to PUNCT_APOS as a result of processing the previous keystroke in FIG. 18H, the punctuation key processing software executes blocks 274, 276, and 262 in FIG. 5A. The current default selection list object "c'" is output as accepted text 983, the current keystroke buffer is cleared, and the system simply processes the resulting single-key sequence DEF as a result of adding the current keystroke DEF to the cleared keystroke buffer. Querying the database based on these this keystroke results in the selection list shown in FIG. 18I. The text object "d" is the most frequent and appears as the default selection list object "d" 981, and is also provisionally posted in the text region at insertion point 980.

Figure 18J:
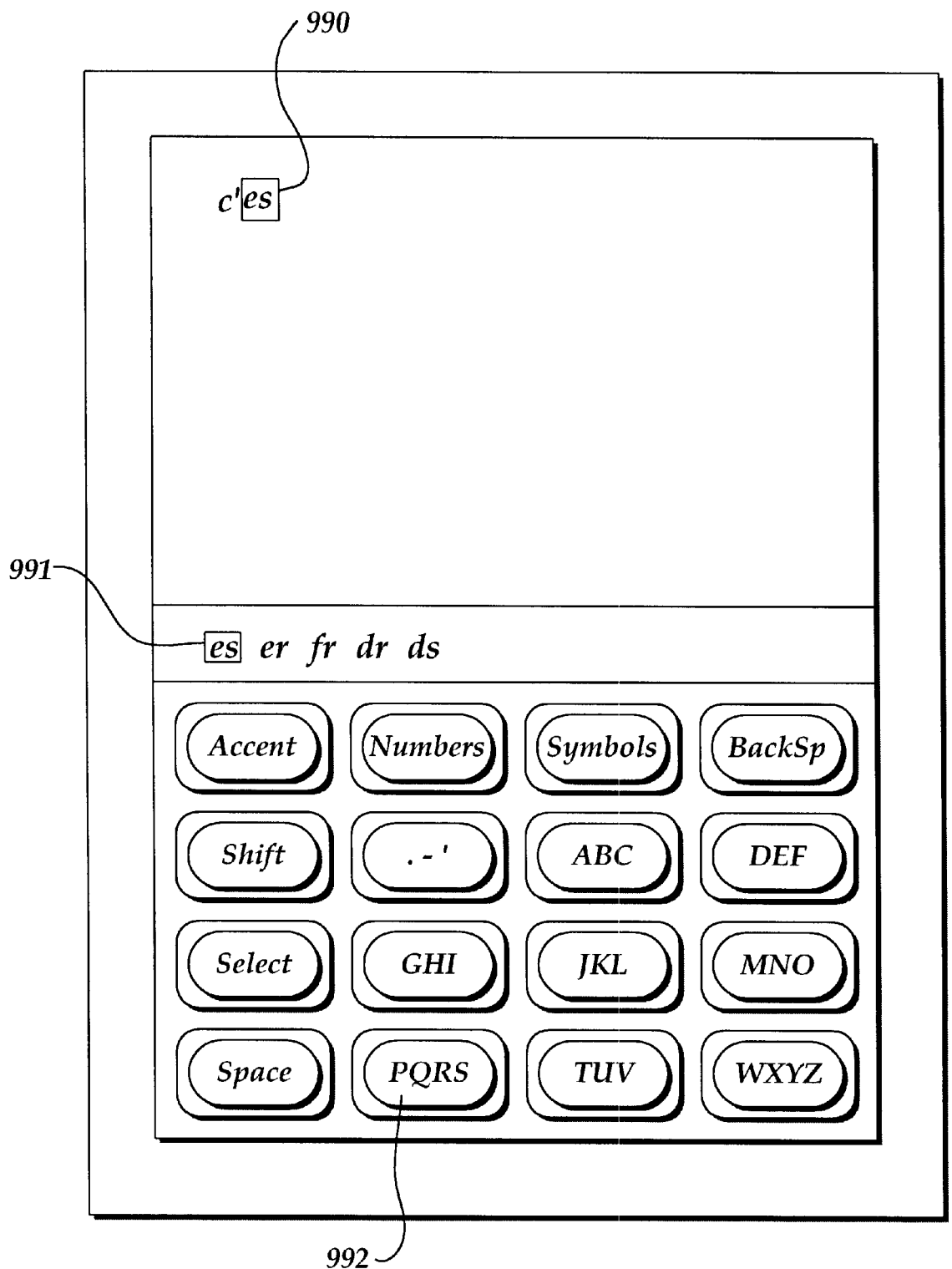
Figure 18K:
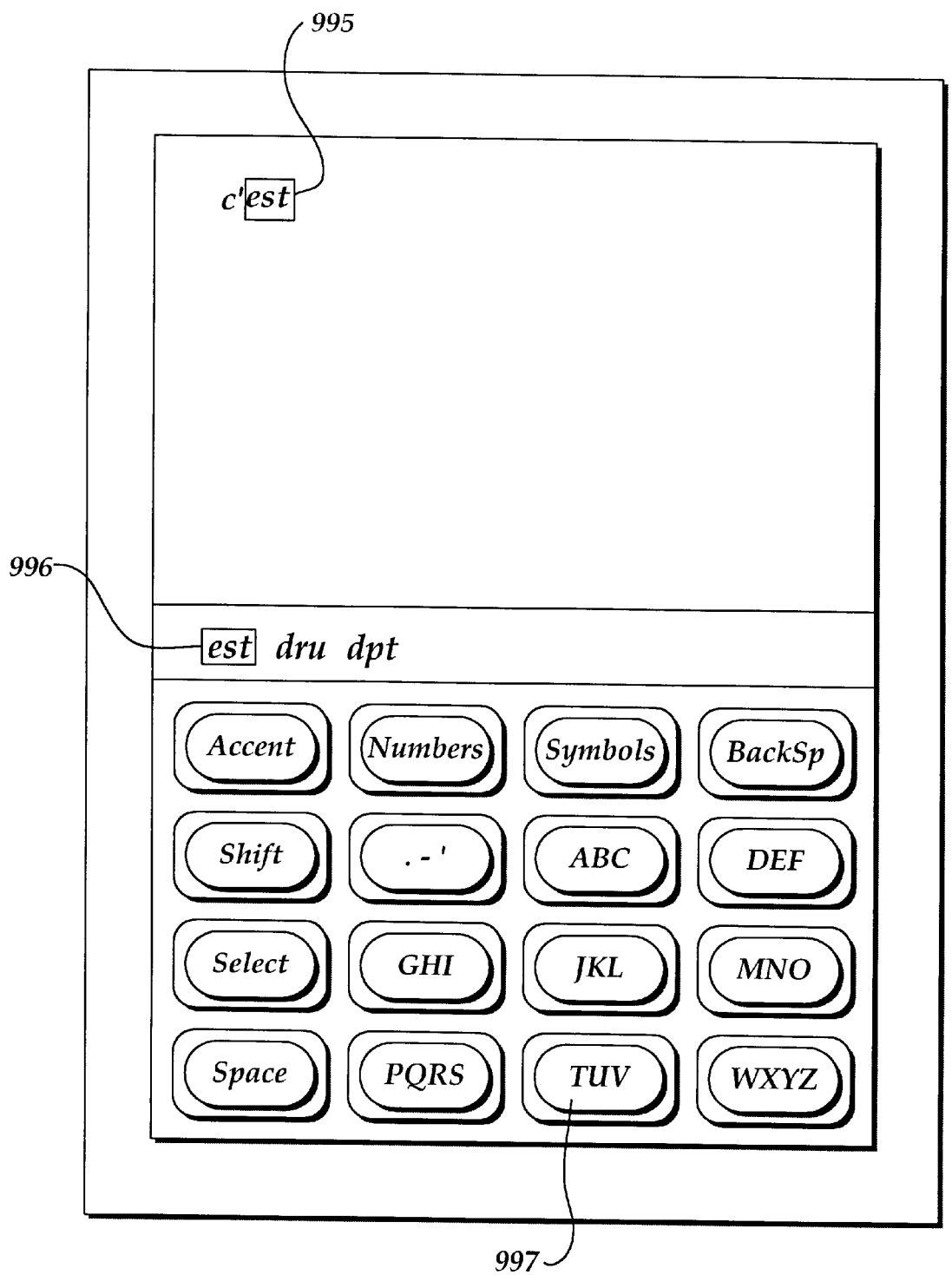

FIGS. 18J and 18K show the results that follow FIG. 18I when the user presses the PQRS key 992 (in 18J) and TUV key 997 (in 18K) to finish typing the word "est". No special punctuation key processing occurs since the ClearPunctMode flag was set at block 262 of FIG. 5A in processing the previous keystroke, so that all buffers and flags for the punctuation key were cleared at block 202 of FIG. 5A. Thus the system simply processes the current key sequence DEF, PQRS, TUV. Querying the database based on these three keystrokes results in the selection list shown in FIG. 18K. The text object "est" is the most frequent and thus appears as the default selection list object "est" 996, and is also provisionally posted in the text region at insertion point 995.

The French language contains a number of very frequently used particles, prepositions, and pronouns such as le, ne, ce, de, me, se, je, que, tu and te that, when preceding a word that begins with a vowel, change their final vowel into an apostrophe and are typed with no space before the following word. Without the behavior supported by the punctuation key 63 shown in the preceding example, this frequent concatenation of word objects would otherwise require the user to make an additional key activation of the Select key in order to terminate the first word object (c' in the example shown) prior to typing the second object (est). Thus the ability of the punctuation key 63 to support automatic concatenation to word objects that end in an apostrophe significantly increases the efficiency and natural feel of the system for the languages such as French.

While the preferred embodiment of the invention has been illustrated and described, it will be appreciated that various changes can be made therein without departing from the spirit and scope of the invention. For example, those skilled in the art will appreciate that the keyboard 54 of the reduced keyboard disambiguating system may have as few as three or as many as twenty data keys. The disambiguation technique disclosed herein is equally applicable to keyboards of different sizes. The specific characters associated with the punctuation key 63 may be changed. For example, those skilled in the art will appreciate that the period could be replaced by the comma for certain applications. Furthermore, the specific selections of which punctuation character is generated in different surrounding keystroke contexts could also be altered. For example, two successive activations of the punctuation key 63 followed by a could result in generating an Em Dash "—", while three successive activations would generate an ellipsis ". . . ".

Those skilled in the art will also recognize that additional vocabulary modules can be enabled within the computer, for example vocabulary modules containing legal terms, medical terms, and foreign language terms. Via a system menu, the user can configure the system so that the additional vocabulary words can be caused to appear first or last in the list of possible words, with special coloration or highlighting. Consequently, within the scope of the appended claims, it will be appreciated that the invention can be practiced otherwise than as specifically described herein.

The embodiments of the invention in which an exclusive property or privilege is claimed are defined as follows:

1. A disambiguating system for disambiguating ambiguous input sequences entered by a user, the disambiguating system comprising:
   (a) a user input device having a plurality of inputs, each of the plurality of inputs associated with a plurality of characters, wherein an input sequence has a textual interpretation that is ambiguous due to the plurality of characters associated with each input;
   (b) a memory containing data used to construct a plurality of objects, each of the plurality of objects having a numerical index and being associated with an input sequence and a relative frequency of use, all objects being stored in the memory in a tree structure comprised of a plurality of parent and child nodes, each node being associated with an input sequence and with one or more objects, with each parent node having a base input sequence, the plurality of nodes being connected by a plurality of paths, each of the plurality of paths linking a parent node associated with a base input sequence with a child node associated with the base input sequence of the parent node and an additional input; and wherein the objects associated with a child node are based on the objects associated with the corresponding parent node to which the child node is linked and are constructed using a code pre-stored in memory to modify objects associated with the corresponding parent node, the code used to construct objects associated with a child node modifying objects associated with the corresponding parent node and comprising a specification of a numerical index of the object associated with the corresponding parent node and a specification of a numerical index of one of the characters associated with the additional input linking the parent node to the child node; said memory tree structure being arranged to eliminate redundant parent nodes, two parent nodes of the tree being redundant in the event that all codes associated with a given input sequence that are present in both of the two parent nodes are identical in that the codes occur in the same sequence and specify the same numerical object index and the same numerical character index and, further, for all inputs for which child nodes are linked to each of the two parent nodes said child nodes are also redundant in the same recursive sense, one of said redundant parent nodes being omitted from the tree structure in memory and the remaining redundant parent node being augmented by any codes and links to child nodes that were present only in the omitted redundant parent node, all links from any parent node of which the omitted parent node is a child being re-written as links to the remaining redundant parent node;
   (c) a display to depict system output to the user; and
   (d) a processor coupled to the user input device, memory and display, the processor:
      (i) identifying from the one or more objects in the memory associated with each generated input sequence at least one candidate object with the highest frequency of use, the candidate object being a word object when at least one word object is associated with the generated input sequence and being a word stem object when no word object is associated with the generated input sequence; and
      (ii) generating an output signal causing the display to display the at least one identified candidate object associated with each generated input sequence as a textual interpretation of the generated input sequence.

2. The system of claim 1, in which one or more characters which include special diacritic marks are associated with the same input with which the corresponding character without special diacritic marks is associated.

3. The system of claim 2, in which the one or more characters which include special diacritic marks do not appear on the input associated with the corresponding character without special diacritic marks.

4. The system of claim 1, wherein the at least one identified candidate object with the highest frequency of use that is displayed as a textual interpretation of the generated input sequence is a word stem object when the frequency of use of said word stem object exceeds by a predetermined factor the highest frequency of use associated with any word object associated with the generated input sequence, and where said highest frequency of use associated with any word object associated with the generated input sequence does not exceed a predetermined threshold.

5. The system of claim 1, wherein the at least one object with the highest frequency of use that is provisionally displayed as a textual interpretation of the generated input sequence is confirmed for output as the textual interpretation of the generated input sequence upon entry of any input that results in the unambiguous generation of one or more characters, wherein said one or more unambiguous characters are output immediately following the output of said confirmed textual interpretation.

6. The system of claim 1, wherein the code used to construct objects associated with a child node by modifying objects associated with the corresponding parent node further includes a specification of whether the code is the final code of the sequence of codes which create objects associated with the child node.

7. The system of claim 1, wherein the number and identity of additional inputs which correspond to child nodes linked to a parent node is indicated in the parent node by a field of valid key bits that indicate the number and identity of said child nodes.

8. The system of claim 7, wherein each set of one or more codes used to create the objects associated with a child node is immediately followed by a pointer to said child node, and wherein the one or more sets of one or more codes and following pointer are placed sequentially in memory within the parent node in the same order as the valid key bits that indicate the number and identity of said child nodes.

9. The system of claim 1, wherein the sequence of codes which create objects associated with a child node are ordered in memory such that objects are created in a sequence that is sorted with respect to the frequency of use of said objects.

10. The system of claim 1, wherein the indices of the characters associated with each input are assigned sequentially to the characters in descending order of the frequency of occurrence of the characters in word objects in memory.

11. The system of claim 10, wherein the code used to construct objects associated with a child node by modifying objects associated with the corresponding parent node also includes a specification of an object type associated with the constructed object associated with the child node.

12. The system of claim 11, wherein the object type that is specified includes information regarding the part of speech of the constructed object.

13. The system of claim 11, wherein the object type that is specified includes information regarding the capitalization of the constructed object.

14. The system of claim 11, wherein the object type that is specified includes information regarding inflectional endings and suffixes that may be appended to the constructed object.

15. The system of claim 11, wherein the object type that is specified includes a code that uniquely identifies the constructed object among the objects in memory.

16. The system of claim 11, wherein the object type that is specified includes information regarding the frequency of use of the constructed object.

17. The system of claim 11, wherein the object type that is specified includes information regarding whether the constructed object is a completed word.

18. The system of claim 9, wherein the indices of the characters associated with each input include indices that are assigned to a string comprising a plurality of characters.

19. The system of claim 1, wherein the indices of the characters associated with each input are assigned sequentially to the characters in descending order of the frequency of occurrence of the characters following the immediately preceding character in the object associated with the corresponding parent node to which the indexed character is appended to form an object associated with the child node.

20. The system of claim 1, wherein one or more codes that are associated with a given input and are present in both of said redundant parent nodes are defined as being identical when the codes specify the same numerical object index and the same numerical character index, even when said codes occur in a different sequence in the two redundant parent nodes.

21. The system of claim 1, wherein one or more codes used to construct objects associated with child nodes by modifying objects associated with the corresponding parent node also include a specification of an object type associated with the constructed object associated with the child node, and wherein two codes are defined as being identical when they specify the same numerical object index and the same numerical character index and when at most one of the two codes specifies an object type, wherein the code that is present in the remaining redundant parent node that is augmented by any codes and links to child nodes that were present only in the omitted redundant parent node includes the specification of said object type.

22. The system of claim 21, wherein the object type that is specified includes information to distinguish the input sequence corresponding to the constructed object from other input sequences that utilize the node.

23. The system of claim 1, wherein two parent nodes of the tree are defined as redundant only when all codes associated with a given input are present in both of said redundant parent nodes and are identical in that the codes occur in the same sequence and specify the same numerical object index and the same numerical character index, and further in that for all inputs for which child nodes are linked to each of the two redundant parent nodes said child nodes are also redundant in the same recursive sense.

24. The system of claim 23, wherein one or more codes that are associated with a given input and are present in both of said redundant parent nodes are defined as being identical when the codes specify the same numerical object index and the same numerical character index, even when said codes occur in a different sequence in the two redundant parent nodes.

25. A disambiguating system for disambiguating ambiguous input sequences entered by a user, the disambiguating system comprising:
(a) a user input device having a plurality of inputs, each of the plurality of inputs associated with a plurality of characters, an input sequence being generated each time an input is selected by manipulating the user input device, wherein the generated input sequence corresponds to the sequence of inputs that have been selected, and the generated input sequence has a textual interpretation that is ambiguous due to the plurality of characters associated with each input, at least one of the plurality of inputs being an ambiguous punctuation input associated with a plurality of punctuation characters, the input device having at least one unambiguous selection input for generating an unambiguous output, an input sequence being terminated when the user manipulates the user input to any unambiguous input;
(b) a memory containing a plurality of objects, each of the plurality of objects being associated with an input sequence, each of the plurality of objects in the memory being further associated with a frequency of use;
(c) a display to depict system output to the user; and
(d) a processor coupled to the user input device, memory and display, said processor comprising:
(i) an identifying component for identifying from the plurality of objects in the memory at least one object associated with each generated input sequence and having the highest frequency of use;
(ii) an output component for displaying at least one of the identified objects associated with each generated input sequence as a textual interpretation of the generated input sequence, wherein the objects associated with each input sequence are displayed in order of decreasing frequency of use; and
(iii) a selection component for selecting one of the identified objects for entry into a text entry display location upon detecting one or more manipulations of the user input device to an unambiguous selection input;
wherein the processor, detects the selection of the ambiguous punctuation input, appends it to an input sequence, and provisionally outputs the associated textual interpretation of the input sequence which is terminated by one of the associated punctuation characters of the ambiguous punctuation input, and upon detection of a next input that is a member of a first set of designated inputs that is associated with the output of a character distinct from said provisionally output punctuation character, confirms the previously output punctuation character, and, alternatively, upon detection of a next input that is a member of one of one or more alternate sets of designated inputs, wherein each of said one or more alternate sets of designated inputs is associated with the output of a next character that is distinct from said provisionally output punctuation character, replaces the previously output punctuation character with another of the plurality of punctuation characters associated with the ambiguous punctuation input with the replacing punctuation character being determined by the alternate set of designated inputs of which said next input is a member.

26. The system of claim 25, wherein the ambiguous punctuation input is associated with a period, a hyphen, and an apostrophe.

27. The system of claim 25, wherein the processor, upon detecting the selection of the ambiguous punctuation input and appending said ambiguous punctuation input to the current generated input sequence to form a sequence that is not associated with any object in memory, accepts the provisionally displayed object with the highest frequency of use associated with the generated input sequence prior to detecting the selection of the ambiguous punctuation input, provisionally outputs the default punctuation character associated with the ambiguous punctuation input, and establishes a new generated input sequence of length one comprising the ambiguous punctuation input.

28. The system of claim 25, wherein the processor, upon detecting an occurrence of the ambiguous punctuation input in the generated input sequence, generates a sequence of alternate textual interpretations which may be selected by the manipulation of the user input device to an unambiguous selection input one or more times, wherein the first of said sequence of alternate textual interpretations is generated by appending one of the punctuation characters associated with the ambiguous punctuation input to the object with the highest frequency of use associated with the sequence of inputs in the generated input sequence that were input preceding the ambiguous punctuation input, followed by appending the object with the highest frequency of use associated with the sequence of inputs in the generated input sequence that was input following the ambiguous punctuation input, followed by other combinations of objects which include objects with progressively lower frequencies of use that are associated with the sequence of inputs in the generated input sequence that were input preceding the ambiguous punctuation input, and also objects with progressively lower frequencies of use associated with the sequence of inputs in the generated input sequence that was input following the ambiguous punctuation input, such that the created objects are created in descending order of the combined frequency ranking of said two objects.

29. The system of claim 25, wherein the processor, upon detecting the selection of a sequence of one or more ambiguous input followed by a first selection of an unambiguous selection input, selects the object having a highest frequency of use and outputs said selected text object and a single following space to the display, and wherein upon detecting each subsequent repeated successive selection of an unambiguous selection input selects an object having the next lower frequency of use from the identified objects, and replaces the previously output text object in its display position preceding the previously output single space with each said successively selected text object.

30. The system of claim 25, wherein the processor, upon detecting the selection of the ambiguous punctuation input and appending the ambiguous punctuation input to the current generated input sequence to form a sequence that is associated with a completed word object in memory with a highest frequency of use that ends with a punctuation character associated with said ambiguous punctuation input, and upon detecting the selection of a next input wherein said next input is an ambiguous input associated with one or more alphabetic letters, confirms the output of said completed word object as the textual interpretation of the current generated input sequence including the selection of the ambiguous punctuation input, and starts a new generated input sequence comprising said next ambiguous input.

31. The system of claim 25, wherein the composition of said first set and said one or more alternate sets of designated inputs is determined with respect to whether there exists in said memory one or more objects associated with said input sequence including the appended ambiguous punctuation input.

32. The system of claim 31, wherein the processor, upon detecting the selection of the ambiguous punctuation input and appending said ambiguous punctuation input to the current generated input sequence to form a sequence that is not associated with any object in memory corresponding to a completed word, provisionally outputs one of the associated punctuation characters, and wherein the processor, upon detecting the selection of a next input wherein said next input is an ambiguous input associated with one or more alphabetic letters but not associated with the letter 's', changes the previously output punctuation character to a hyphen, confirms the provisionally output textual interpretation of the current generated input sequence prior to the selection of the ambiguous punctuation input, and starts a new generated input sequence comprising said next ambiguous input, and wherein the processor, upon detecting the selection of a next input wherein said next input is an ambiguous input associated with one or more alphabetic letters including the letter 'is', confirms the provisionally output textual interpretation of the current generated input sequence prior to the selection of the ambiguous punctuation input and starts a new generated input sequence comprising said next ambiguous input and replaces the previously output punctuation character with an apostrophe and provisionally appends the letter 's' as the textual interpretation of said new generated input sequence, and wherein the processor, upon detecting the selection of a yet another next input wherein said next input is an ambiguous input associated with one or more alphabetic letters, replaces the previously output apostrophe with a hyphen, and starts a new generated input sequence comprising said ambiguous input associated with one or more alphabetic letters including the letter 's' followed by said yet another next ambiguous input, and outputs the object in memory associated with said newly started input sequence following said hyphen, and wherein the processor, upon detecting the selection of a next input wherein said next input is not associated with one or more alphabetic letters, confirms the previously output punctuation character.

33. The system of claim 25, wherein the composition of said first set and said one or more alternate sets of designated inputs is determined with respect to whether there exists in said memory one or more objects associated with the input sequence including the appended ambiguous punctuation input and further appending said next input when said next input is an ambiguous input.

34. The system of claim 25, wherein the composition of said first set and said one or more alternate sets of designated inputs is determined with respect to whether there exists in memory one or more objects associated with an input sequence beginning with the selection of the ambiguous punctuation input and appending said next input when said next input is an ambiguous input.

35. A method for disambiguating ambiguous input sequences, the method comprising:
  (a) generating an input sequence from a plurality of inputs, each of the plurality of inputs associated with a plurality of characters, the generated input sequence having a textual interpretation that is ambiguous due to the plurality of characters associated with each input;
  (b) storing data used to construct a plurality of objects, each of the plurality of objects associated with an input sequence and a relative frequency of use, wherein each of the plurality of objects includes completed word objects, word stem objects comprising a sequence of the initial characters of a yet uncompleted word object, and objects that are both a completed word and a stem of a word, and wherein all word and stem objects are stored in a tree structure comprised of a plurality of nodes, each node associated with an input sequence and with one or more objects, and wherein the plurality of nodes are connected by a plurality of paths, each of the plurality of paths linking a parent node associated with a base input sequence with a child node associated with the base input sequence of the parent node and an additional input; and wherein the objects associated with a child node are based on the objects associated with the corresponding parent node to which the child node is linked; and wherein the objects associated with a child node are constructed using a code pre-stored in memory to modify objects associated with the corresponding parent node; and wherein the code used to construct objects associated with a child node by modifying objects associated with the corresponding parent node comprises a specification of the numerical index of the object associated with the corresponding parent node and a specification of the numerical index of one of the characters associated with the additional input linking the parent node to the child node;

(c) identifying from the one or more objects associated with each generated input sequence at least one candidate object with the highest frequency of use, wherein said candidate object is a word object when at least one word object is associated with the generated input sequence, and wherein said candidate object is a word stem object when no word object is associated with the generated input sequence; and (d) displaying the at least one identified candidate object associated with each generated input sequence as a textual interpretation of the generated input sequence;

wherein two parent nodes of the tree structure are defined as being redundant in the event that all codes associated with a given input are present in both of said redundant parent nodes and are identical in that the codes occur in the same sequence and specify the same numerical object index and the same numerical character index, and further that all inputs for which child nodes are linked to each of said parent nodes said child nodes are also redundant in the same recursive sense, and wherein one of said redundant parent nodes is omitted from the tree structure in memory and the remaining redundant parent node is augmented by any codes and links to child nodes that were present only in the omitted redundant parent node, and all links from any parent node of which the omitted parent node is a child are re-written as links to the remaining redundant parent node.

36. The method of claim 35, wherein the at least one identified candidate object with the highest frequency of use that is displayed as a textual interpretation of the generated input sequence is a word stem object when the frequency of use of said word stem object exceeds by a predetermined factor the highest frequency of use associated with any word object associated with the generated input sequence, and where said highest frequency of use associated with any word object associated with the generated input sequence does not exceed a predetermined threshold.

37. The method of claim 35, wherein the at least one object with the highest frequency of use that is provisionally displayed as a textual interpretation of the generated input sequence is confirmed for output as the textual interpretation of the generated input sequence upon entry of any input that results in the unambiguous generation of one or more characters, wherein said one or more unambiguous characters are output immediately following the output of said object with the highest frequency of use.

38. The method of claim 35, wherein the code used to construct objects associated with a child node by modifying objects associated with the corresponding parent node further includes a specification of whether the code is the final code of the sequence of codes which create objects associated with the child node.

39. The method of claim 35, wherein the number and identity of additional inputs which correspond to child nodes linked to a parent node is indicated in the parent node by a field of valid key bits that indicate the number and identity of said child nodes.

40. The method of claim 39, wherein each set of one or more codes used to create the objects associated with a child node is immediately followed by a pointer to said child node, and wherein the one or more sets of one or more codes and following pointer are placed sequentially in memory within the parent node in the same order as the valid key bits that indicate the number and identity of said child nodes.

41. The method of claim 35, wherein the sequence of codes which create objects associated with a child node are ordered in memory such that objects are created in a sequence that is sorted with respect to the frequency of use of said objects.

42. The method of claim 35, wherein the indices of the characters associated with each input are assigned sequentially to the characters in descending order of the frequency of occurrence of the characters in word objects in memory.

43. The method of claim 42, wherein the code used to construct objects associated with a child node by modifying objects associated with the corresponding parent node also includes a specification of an object type associated with the constructed object associated with the child node.

44. The method of claim 43, wherein the object type that is specified includes a code that uniquely identifies the constructed object among the objects in memory.

45. The method of claim 43, wherein the object type that is specified includes information regarding the frequency of use of the constructed object.

46. The method of claim 43, wherein the object type that is specified includes information regarding whether the constructed object is a completed word.

47. The method of claim 35, wherein the indices of the characters associated with each input include indices that are assigned to a string comprising a plurality of characters.

48. The method of claim 35, wherein the indices of the characters associated with each input are assigned sequentially to the characters in descending order of the frequency of occurrence of the characters following the immediately preceding character in the object associated with the corresponding parent node to which the indexed character is appended to form an object associated with the child node.

49. The method of claim 35, wherein one or more codes that are associated with a given input and are present in both of said redundant parent nodes are defined as being identical when the codes specify the same numerical object index and the same numerical character index, even when said codes occur in a different sequence in the two redundant parent nodes.

50. The method of claim 35, wherein one or more codes used to construct objects associated with child nodes by modifying objects associated with the corresponding parent node also include a specification of an object type associated with the constructed object associated with the child node, and wherein two codes are defined as being identical when they specify the same numerical object index and the same numerical character index and when at most one of the two codes specifies an object type, wherein the code that is present in the remaining redundant parent node that is augmented by any codes and links to child nodes that were present only in the omitted redundant parent node includes the specification of said object type.

51. The method of claim 50, wherein the object type that is specified includes information to distinguish the input sequence corresponding to the constructed object from other input sequences that utilize the node.

52. The method of claim 35, wherein two parent nodes of the tree are defined as redundant only when all codes associated with a given input are present in both of said redundant parent nodes and are identical in that the codes occur in the same sequence and specify the same numerical object index and the same numerical character index, and further in that for all inputs for which child nodes are linked to each of the two redundant parent nodes said child nodes are also redundant in the same recursive sense.

53. The method of claim 52, wherein one or more codes that are associated with a given input and are present in both of said redundant parent nodes are defined as being identical when the codes specify the same numerical object index and the same numerical character index, even when said codes occur in a different sequence in the two redundant parent nodes.

54. A computer-readable medium having computer-executable components for disambiguating ambiguous input sequences, the computer-executable components comprising:

(a) a user input component for processing input sequences consisting of one or more inputs, at least a portion of the inputs being associated with a plurality of characters, at least a portion of the input sequences having a textual interpretation that is ambiguous due to the plurality of characters associated with the inputs;

(b) a storage component containing data used to construct a plurality of objects, each of the plurality of objects associated with an input sequence and a relative frequency of use, wherein each of the plurality of objects include completed word objects, word stem objects comprising a sequence of the initial characters of a yet uncompleted word object, and objects that are both a completed word and a stem of a word, all word and stem objects being stored in a tree structure comprised of a plurality of parent and child nodes, each node being associated with an input sequence and with one or more objects, the plurality of nodes being connected by a plurality of paths, each of the parent nodes having a base input sequence, each of the plurality of paths linking a parent node with a child node associated with the base input sequence of the parent node and an additional input, the objects associated with a child node being based on the objects associated with the parent node to which the child node is linked; the objects associated with a child node being constructed using an executable stored code to modify objects associated with the corresponding parent node; the executable stored code modifying objects associated with the corresponding parent node and comprising a specification of the numerical index of the object associated with the corresponding parent node and a specification of the numerical index of one of the characters associated with the additional input linking the parent node to the child node, two parent nodes of the tree structure being considered redundant when all codes associated with a given input are present in both of said parent nodes and are identical in that the codes occur in the same sequence and specify the same numerical object index and the same numerical character index and all inputs linking child nodes to the two parent nodes are also redundant in the same recursive sense, said data stored in said storage component including executable code for omitting one of said redundant parent nodes from the tree structure in memory and for augmenting the remaining redundant parent node with any codes and links to child nodes that were present only in the omitted redundant parent node, and executable code for re-writing all links from the omitted parent node to a parent of the omitted parent node as links to the remaining redundant parent node;

(c) an identifying component for identifying from the one or more objects associated with each input sequence at least one candidate object with the highest frequency of use, wherein said candidate object is a word object when at least one word object is associated with the input sequence, and wherein said candidate object is a word stem object when no word object is associated with the input sequence; and (d) an output component for displaying the at least one identified candidate object associated with each input sequence as a textual interpretation of the input sequence.

55. The computer-readable medium of claim 54, wherein the at least one identified candidate object with the highest frequency of use that is displayed as a textual interpretation of the generated input sequence is a word stem object when the frequency of use of said word stem object exceeds by a predetermined factor the highest frequency of use associated with any word object associated with the generated input sequence, and where said highest frequency of use associated with any word object associated with the generated input sequence does not exceed a predetermined threshold.

56. The computer-readable medium of claim 54, wherein the at least one object with the highest frequency of use that is provisionally displayed as a textual interpretation of the generated input sequence is confirmed for output as the textual interpretation of the generated input sequence upon entry of any input that results in the unambiguous generation of one or more characters, wherein said one or more unambiguous characters are output immediately following the provisional display of said object said at least one object with the highest frequency of use as said textual interpretation.

57. The computer-readable medium of claim 54, wherein the code used to construct objects associated with a child node by modifying objects associated with the corresponding parent node further includes a specification of whether the code is the final code of the sequence of codes which create objects associated with the child node.

58. The computer-readable medium of claim 54, wherein the number and identity of additional inputs which correspond to child nodes linked to a parent node is indicated in the parent node by a field of valid key bits that indicate the number and identity of said child nodes.

59. The computer-readable medium of claim 58, wherein each set of one or more codes used to create the objects associated with a child node is immediately followed by a pointer to said child node, and wherein the one or more sets of one or more codes and following pointer are placed sequentially in memory within the parent node in the same order as the valid key bits that indicate the number and identity of said child nodes.

60. The computer-readable medium of claim 54, wherein the sequence of codes which create objects associated with a child node are ordered in memory such that objects are created in a sequence that is sorted with respect to the frequency of use of said objects.

61. The computer-readable medium of claim 54, wherein the indices of the characters associated with each input are assigned sequentially to the characters in descending order of the frequency of occurrence of the characters in word objects in memory.

62. The computer-readable medium of claim 61, wherein the code used to construct objects associated with a child node by modifying objects associated with the corresponding parent node also includes a specification of an object type associated with the constructed object associated with the child node.

63. The computer-readable medium of claim 62, wherein the object type that is specified includes a code that uniquely identifies the constructed object among the objects in memory.

64. The computer-readable medium of claim 62, wherein the object type that is specified includes information regarding the frequency of use of the constructed object.

65. The computer-readable medium of claim 62, wherein the object type that is specified includes information regarding whether the constructed object is a completed word.

66. The computer-readable medium of claim 54, wherein the indices of the characters associated with each input include indices that are assigned to a string comprising a plurality of characters.

67. The computer-readable medium of claim 54, wherein the indices of the characters associated with each input are assigned sequentially to the characters in descending order of the frequency of occurrence of the characters following the immediately preceding character in the object associated with the corresponding parent node to which the indexed character is appended to form an object associated with the child node.

68. The computer-readable medium of claim 54, wherein one or more codes that are associated with a given input and are present in both of said redundant parent nodes are defined as being identical when the codes specify the same numerical object index and the same numerical character index, even when said codes occur in a different sequence in the two redundant parent nodes.

69. The computer-readable medium of claim 54, wherein one or more codes used to construct objects associated with child nodes by modifying objects associated with the corresponding parent node also include a specification of an object type associated with the constructed object associated with the child node, and wherein two codes are defined as being identical when they specify the same numerical object index and the same numerical character index and when at most one of the two codes specifies an object type, wherein the code that is present in the remaining redundant parent node that is augmented by any codes and links to child nodes that were present only in the omitted redundant parent node includes the specification of said object type.

70. The computer-readable medium of claim 69, wherein the object type that is specified includes information to distinguish the input sequence corresponding to the constructed object from other input sequences that utilize the node.

71. The computer-readable medium of claim 54, wherein two parent nodes of the tree are defined as redundant only when all codes associated with a given input are present in both of said redundant parent nodes and are identical in that the codes occur in the same sequence and specify the same numerical object index and the same numerical character index, and further in that for all inputs for which child nodes are linked to each of the two redundant parent nodes said child nodes are also redundant in the same recursive sense.

72. The computer-readable medium of claim 71, wherein one or more codes that are associated with a given input and are present in both of said redundant parent nodes are defined as being identical when the codes specify the same numerical object index and the same numerical character index, even when said codes occur in a different sequence in the two redundant parent nodes.

73. A method for disambiguating ambiguous input sequences entered by a user, the method comprising
    (a) generating an input sequence from a plurality of inputs, each of the plurality of inputs associated with a plurality of characters, the generated input sequence having a textual interpretation that is ambiguous due to the plurality of characters associated with each input;
    (b) storing a plurality of objects, each of the plurality of objects comprising a sequence of characters associated with an input sequence and a frequency of use;
    (c) identifying from the plurality of objects at least one object associated with each generated input sequence and having a highest frequency of use;
    (d) displaying at least one of the identified objects having a highest frequency of use associated with each generated input sequence as a textual interpretation of the generated input sequence, wherein the objects associated with each input sequence are displayed in order of decreasing frequency of use;
    (e) selecting one of the identified objects as the textual interpretation of the generated input sequence upon detecting one or more selections of an unambiguous selection input;
wherein:
    (i) upon detection of the selection of an ambiguous punctuation input, the step of selecting one of the identified objects provisionally selects one of the punctuation characters associated with the selected ambiguous punctuation input;
    (ii) upon detection of the selection of the next input following the selection of the ambiguous punctuation input, the provisionally selected punctuation character is confirmed if said next input is a member of a first set of designated inputs, wherein each of said first set of designated inputs is associated with the output of a next character distinct from said provisionally selected punctuation character; and
    (iii) upon detection of the selection of said next input following the selection of the ambiguous punctuation input, the provisionally selected punctuation character is replaced with another of the plurality of punctuation characters associated with the ambiguous punctuation input, if said next input is a member of one of one or more alternate sets of designated inputs, wherein each of said one or more alternate sets of designated inputs is associated with the output of a next character distinct from said provisionally punctuation character and wherein the replacing punctuation character is determined by the alternate set of designated inputs of which said next input is a member.

74. The method of claim 73, further comprising:
    (a) upon detection of the selection of the ambiguous punctuation input and appending said ambiguous punctuation input to the current generated input sequence to form a sequence that is not associated with any object in memory that corresponds to a completed word, provisionally outputting one of the associated punctuation characters, and
    (b) upon detection of the selection of a next input wherein said next input is an ambiguous input associated with one or more alphabetic letters but not associated with the letter 's';

(i) changing the previously output punctuation character to a hyphen;
  (ii) confirming the provisionally output textual interpretation of the current generated input sequence prior to the selection of the ambiguous punctuation input; and
  (iii) starting a new generated input sequence comprising said next ambiguous input; and
(c) upon detection of the selection of a next input wherein said next input is an ambiguous input associated with one or more alphabetic letters including the letter 's',
  (i) confirming the provisionally output textual interpretation of the current generated input sequence prior to the selection of the ambiguous punctuation input;
  (ii) starting a new generated input sequence comprising said next ambiguous input;
  (iii) replacing the previously output punctuation character with an apostrophe and provisionally appending the letter 's' as the textual interpretation of said new generated input sequence; and
  (iv) upon detection of the selection of a yet another next input wherein said next input is an ambiguous input associated with one or more alphabetic letters, replacing the previously output apostrophe with a hyphen, and starting a new generated input sequence comprising said ambiguous input associated with one or more alphabetic letters including the letter 's' followed by said yet another next ambiguous input, and outputting the object in memory associated with said newly started input sequence following said hyphen, and
(d) upon detection of the selection of a next input wherein said next input is not associated with one or more alphabetic letters, confirming the previously output punctuation character.

75. The method of claim 73, further comprising:
upon detection of the selection of the ambiguous punctuation input and appending said ambiguous punctuation input to the current generated input sequence to form a sequence that is not associated with any object in memory,
(a) accepting the provisionally displayed object with the highest frequency of use associated with the generated input sequence prior to detecting the selection of the ambiguous punctuation input;
(b) provisionally outputting the default punctuation character associated with the ambiguous punctuation input; and
(c) establishing a new generated input sequence of length one comprising the ambiguous punctuation input.

76. The method of claim 73, further comprising: upon detection of an occurrence of the ambiguous punctuation input in the generated input sequence,
(a) generating a sequence of alternate textual interpretations which may be selected by the manipulation of the user input device to an unambiguous selection input one or more times, wherein the first of said sequence of alternate textual interpretations is generated by appending one of the punctuation characters associated with the ambiguous punctuation input to the object with the highest frequency of use associated with the sequence of inputs in the generated input sequence that were input preceding the ambiguous punctuation input, followed by appending the object with the highest frequency of use associated with the sequence of inputs in the generated input sequence that was input following the ambiguous punctuation input, followed by other combinations of objects which include objects with progressively lower frequencies of use that are associated with the sequence of inputs in the generated input sequence that were input preceding the ambiguous punctuation input, and also objects with progressively lower frequencies of use associated with the sequence of inputs in the generated input sequence that was input following the ambiguous punctuation input, such that the created objects are created in descending order of the combined frequency ranking of said two objects; and
(b) selecting one of these alternate textual interpretations upon detecting the manipulation of the user input device to said unambiguous selection input one or more times.

77. The method of claim 73, further comprising:
(a) upon detection of the selection of a sequence of one or more ambiguous inputs followed by a first selection of an unambiguous selection input, selecting the object having a highest frequency of use and outputs said selected text object and a single following space to the display; and
(b) upon detection of each subsequent repeated successive selection of an unambiguous selection input,
  (i) selecting an object having the next lower frequency of use from the identified objects; and
  (ii) replacing the previously output text object in its display position preceding the previously output single space with each said successively selected text object.

78. The method of claim 73, further comprising
upon detection of the selection of the ambiguous punctuation input and appending the ambiguous punctuation input to the current generated input sequence to form a sequence that is associated with a completed word object in memory with a highest frequency of use that ends with a punctuation character associated with said ambiguous punctuation input, and upon detection of the selection of a next input wherein said next input is an ambiguous input associated with one or more alphabetic letters, punctuation input to the current generated input sequence to form a sequence that is not associated with any object in memory, the output component accepts the provisionally displayed object with the highest frequency of use associated with the generated input sequence prior to detection of the selection of the ambiguous punctuation input, provisionally outputs the default punctuation character associated with the ambiguous punctuation input, and establishes a new generated input sequence of length one comprising the ambiguous punctuation input.

79. The method of claim 73, wherein the composition of said first set and said one or more alternate sets of designated inputs is determined with respect to whether there exists in said memory one or more objects associated with said input sequence including the appended ambiguous punctuation input.

80. The method of claim 73, wherein the composition of said first set and said one or more alternate sets of designated inputs is determined with respect to whether there exists in said memory one or more objects associated with the input sequence including the appended ambiguous punctuation input and further appending said next input when said next input is an ambiguous input.

81. The method of claim 73, wherein the composition of said first set and said one or more alternate sets of designated inputs is determined with respect to whether there exists in memory one or more objects associated with an input sequence beginning with the selection of the ambiguous punctuation input and appending said next input when said next input is an ambiguous input.

82. A computer-readable medium having computer-executable components for disambiguating ambiguous input sequences, the computer-executable components comprising:

(a) a user input component for processing generated input sequences including a plurality of inputs, at least a portion of the plurality of inputs being associated with a plurality of characters, at least a portion of the generated input sequences having a textual interpretation that is ambiguous due to the portion of the plurality of inputs that are associated with a plurality of characters, at least one of the plurality of inputs being an ambiguous punctuation input associated with a plurality of punctuation characters, at least one of the plurality of inputs including an unambiguous selection input for generating an unambiguous output, an input sequence being terminated when an unambiguous input is selected;

(b) a storage component for storing a plurality of objects, each of the plurality of objects being associated with an input sequence and a frequency of use;

(c) an identifying component for identifying from the plurality of objects at least one object associated with each generated input sequence and having a highest frequency of use;

(d) an output component for displaying at least one of the identified objects associated with each generated input sequence as a textual interpretation of the generated input sequence, wherein the objects associated with each input sequence are displayed in order of decreasing frequency of use; and (e) a selection component for selecting one of the identified objects as the textual interpretation of the generated input sequence upon detecting one or more selections of an unambiguous selection input;

wherein:

(i) upon detection of the selection of said ambiguous punctuation input, one of the associated punctuation characters is provisionally selected by said selection component;

(ii) upon detection of the selection of a next input, the provisionally selected punctuation character is confirmed in the event said next input is a member of a first set of designated inputs, wherein each of said first set of designated inputs is associated with the output of a next character distinct from said provisionally output punctuation character; and (iii) upon detection of the selection of said next input, the provisionally selected punctuation character is replaced with another of the plurality of punctuation characters associated with the ambiguous punctuation input in the event said next input is a member of one or more alternate sets of designated inputs wherein each of said one or more alternate sets of designated inputs is associated with the output of a next character distinct from said provisionally output punctuation character, with the replacing punctuation character being determined by the alternate set of designated inputs of which said next input is a member.

83. The computer-readable medium of claim 82, wherein:

(a) upon detection of the selection of the ambiguous punctuation input and appending said ambiguous punctuation input to the current generated input sequence to form a sequence that is not associated with any object in the storage component corresponding to a completed word, the output component provisionally outputs one of the associated punctuation characters;

(b) upon detection of the selection of a next input wherein said next input is an ambiguous input associated with one or more alphabetic letters but not associated with the letter 's', the output component changes the previously output punctuation character to a hyphen, confirms the provisionally output textual interpretation of the current generated input sequence prior to the selection of the ambiguous punctuation input, and starts a new generated input sequence comprising said next ambiguous input;

(c) upon detection of the selection of a next input wherein said next input is an ambiguous input associated with one or more alphabetic letters including the letter 's', the output component confirms the provisionally output textual interpretation of the current generated input sequence prior to the selection of the ambiguous punctuation input, starts a new generated input sequence comprising said next ambiguous input, replaces the previously output punctuation character with an apostrophe and provisionally appends the letter 's' as the textual interpretation of said new generated input sequence, and wherein, upon the input component detecting the selection of a yet another next input wherein said next input is an ambiguous input associated with one or more alphabetic letters, the output component replaces the previously output apostrophe with a hyphen, and the input component starts a new generated input sequence comprising said ambiguous input associated with one or more alphabetic letters including the letter 's' followed by said yet another next ambiguous input, and the output component outputs the object identified by the identifying component as being associated with said newly started input sequence following said hyphen; and (d) upon detection of the selection of a next input wherein said next input is not associated with one or more alphabetic letters, the output component confirms the previously output punctuation character.

84. The computer-readable medium of claim 82, wherein upon detection of the selection of the ambiguous punctuation input and appending said ambiguous punctuation input to the current generated input sequence to form a sequence that is not associated with any object in the storage component, the output component accepts the provisionally displayed object with the highest frequency of use associated with the generated input sequence prior to detection of the selection of the ambiguous punctuation input, provisionally outputs the default punctuation character associated with the ambiguous punctuation input, and establishes a new generated input sequence of length one comprising the ambiguous punctuation input.

85. The computer-readable medium of claim 82, wherein upon detection of an occurrence of the ambiguous punctuation input in the generated input sequence:

(a) the output component generates a sequence of alternate textual interpretations which may be selected by the selection of the unambiguous selection input one or more times, wherein the first of said sequence of alternate textual interpretations is generated by appending one of the punctuation characters associated with the ambiguous punctuation input to the object with the highest frequency of use associated with the sequence of inputs in the generated input sequence that were input preceding the ambiguous punctuation input, followed by appending the object with the highest frequency of use associated with the sequence of inputs in the generated input sequence that was input following the ambiguous punctuation input, followed by other combinations of objects which include objects with progressively lower frequencies of use that are associated with the sequence of inputs in the generated input sequence that were input preceding the ambiguous punctuation input, and also objects with progressively lower frequencies of use associated with the sequence of inputs in the generated input sequence that was input following the ambiguous punctuation input, such that the created objects are created in descending order of the combined frequency ranking of said two objects; and (b) the selection component selects one of these alternate textual interpretations upon detecting the manipulation of the user input device to an unambiguous selection input one or more times.

86. The computer-readable medium of claim 82, wherein:

(a) upon detection of the selection of a sequence of one or more ambiguous inputs followed by a first selection of an unambiguous selection input, the selection component selects the object having a highest frequency of use and the output component outputs said selected text object and a single following space to the display; and (b) upon detection of each subsequent repeated successive selection of an unambiguous selection input, the selection component selects an object having the next lower frequency of use from the identified objects, and the output component replaces the previously output text object in its display position preceding the previously output single space with each said successively selected text object.

87. The computer-readable medium of claim 82, wherein upon detection of the selection of the ambiguous punctuation input and appending the ambiguous punctuation input to the current generated input sequence to form a sequence that is associated with a completed word object in the storage component with a highest frequency of use that ends with a punctuation character associated with said ambiguous punctuation input, and upon detecting the selection of a next input wherein said next input is an ambiguous input associated with one or more alphabetic letters, the output component confirms the output of said completed word object as the textual interpretation of the current generated input sequence including the selection of the ambiguous punctuation input, and starts a new generated input sequence comprising said next ambiguous input.

88. The computer-readable medium of claim 82 having computer-executable components for disambiguating ambiguous input sequences, said computer-executable components further characterized in that:

the composition of said first set and said one or more alternate sets of designated inputs is determined with respect to whether there exists in said storage component one or more objects associated with said input sequence including the appended ambiguous punctuation input.

89. The computer-readable medium of claim 82 having computer-executable components for disambiguating ambiguous input sequences, said computer-executable components further characterized in that:

the composition of said first set and said one or more alternate sets of designated inputs is determined with respect to whether there exists in said storage component one or more objects associated with the input sequence including the appended ambiguous punctuation input and further appending said next input when said next input is an ambiguous input.

90. The computer-readable medium of claim 82 having computer-executable components for disambiguating ambiguous input sequences, said computer-executable components further characterized in that:

the composition of said first set and said one or more alternate sets of designated inputs is determined with respect to whether there exists in the storage component one or more objects associated with an input sequence beginning with the selection of the ambiguous punctuation input and appending said next input when said next input is an ambiguous input.

* * * * *

UNITED STATES PATENT AND TRADEMARK OFFICE
CERTIFICATE OF CORRECTION

PATENT NO.     : 6,307,548 B1
DATED          : October 23, 2001
INVENTOR(S)    : E.P. Flinchem et al.

It is certified that error appears in the above-identified patent and that said Letters Patent is hereby corrected as shown below:

Column 32,
Line 34, "node is indicated" should read -- node are indicated --
Line 45, "child node are" should read -- child node is --

Column 33,
Line 10, "claim 9," should read -- claim 1, --

Column 34,
Line 45, delete second occurrence of "of one"

Column 36,
Line 14, "the letter 'is'," should read -- the letter 's', --

Column 38,
Line 6, "a parent node is" should read -- a parent node are --

Column 40,
Line 50, "a parent node is" should read -- a parent node are --

Column 42,
Line 48, delete second occurrence of "of one"
Line 63, "tion characters, and" should read -- tion characters; --

UNITED STATES PATENT AND TRADEMARK OFFICE
CERTIFICATE OF CORRECTION

PATENT NO. : 6,307,548 B1
DATED : October 23, 2001
INVENTOR(S) : E.P. Flinchem et al.

It is certified that error appears in the above-identified patent and that said Letters Patent is hereby corrected as shown below:

<u>Column 44,</u>
Lines 42-52, "punctuation input to the current generated input sequence to form a sequence that is not associated with any object in memory, the output component accepts the provisionally displayed object with the highest frequency of use associated with the generated input sequence prior to detection of the selection of the ambiguous punctuation input, provisionally outputs the defalt punctuation character associated with the ambiguous punctuation input, and establishes a new generated input sequence of length one comprising the ambiguous punctuation input."
should read
 -- (a) confirming the output of said completed word object as the textual interpretation of the current generated input sequence including the selection of the ambiguous punctuation input; and
    (b) starting a new generated input sequence comprising said next ambiguous input. --

Signed and Sealed this

Twenty-third Day of July, 2002

*Attest:*

*Attesting Officer*

JAMES E. ROGAN
*Director of the United States Patent and Trademark Office*